US012595190B1

(12) United States Patent
Kim et al.

(10) Patent No.: US 12,595,190 B1
(45) Date of Patent: Apr. 7, 2026

(54) WATER FILTER AND HOME APPLIANCE HAVING SAME

(71) Applicant: LG ELECTRONICS INC., Seoul (KR)

(72) Inventors: Jongpil Kim, Seoul (KR); Seonghee Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 19/048,066

(22) Filed: Feb. 7, 2025

(30) Foreign Application Priority Data

Oct. 8, 2024 (KR) ........................ 10-2024-0136574

(51) Int. Cl.
*C02F 1/00* (2023.01)
*C02F 103/02* (2006.01)

(52) U.S. Cl.
CPC .......... *C02F 1/003* (2013.01); *C02F 2103/02* (2013.01); *C02F 2201/004* (2013.01); *C02F 2201/007* (2013.01); *C02F 2307/12* (2013.01)

(58) Field of Classification Search
CPC ...... B01D 27/08; B01D 35/30; B01D 35/306; B01D 2201/302; B01D 2201/304; B01D 2201/305; B01D 2201/4061; B01D 2201/36; B01D 2201/52; C02F 1/003; C02F 2201/004; C02F 2201/002; C02F 2201/006; C02F 2307/10; C02F 2307/12
See application file for complete search history.

(56) References Cited

U.S. PATENT DOCUMENTS

| | | | |
|---|---|---|---|
| 6,048,454 A | 4/2000 | Jenkins | |
| 10,010,820 B1 | 7/2018 | Kruckenberg et al. | |
| 11,712,645 B2 | 8/2023 | Astle et al. | |
| 2018/0369728 A1 * | 12/2018 | You ........................ | C02F 1/003 |

(Continued)

FOREIGN PATENT DOCUMENTS

| | | |
|---|---|---|
| CA | 2 880 601 | 6/2019 |
| EP | 1 970 113 | 9/2008 |

(Continued)

OTHER PUBLICATIONS

CN 107485902 and English translation (Year: 2017).*

(Continued)

*Primary Examiner* — Benjamin M Kurtz
(74) *Attorney, Agent, or Firm* — KED & ASSOCIATES, LLP

(57) ABSTRACT

The present disclosure relates to a water filter and a home appliance having the same, and as a water filter according to an embodiment of the present disclosure, a water filter detachably coupled to a head connected to a water supply source includes a housing having an upper opening formed therein that is open upward; a filter cover provided in the housing to shield the upper opening and having a water inlet part into which water flows and a water outlet part from which water is discharged; a filter member accommodated in the housing and for purifying water; and a seal ring provided between the housing and the filter cover and which seals the space between the housing and the filter cover when the housing rotates, in which the housing rotates relative to the filter cover and the filter member when coupled with the head.

11 Claims, 56 Drawing Sheets

(56)  References Cited

U.S. PATENT DOCUMENTS

| | | | |
|---|---|---|---|
| 2021/0023485 A1* | 1/2021 | Pi ........................... | B01D 29/15 |
| 2021/0138376 A1* | 5/2021 | Annamalai ........ | B01D 46/0005 |

FOREIGN PATENT DOCUMENTS

| | | | |
|---|---|---|---|
| EP | 2 206 543 | 7/2010 | |
| WO | WO-2023172431 A1 * | 9/2023 | ........... B01D 36/001 |

OTHER PUBLICATIONS

CN 111544950 and English translation (Year: 2020).*
CN 115155131 and English translation (Year: 2022).*
European Search Report dated Dec. 18, 2025 issued in Application No. 25187139.8.

* cited by examiner

FIG. 28

WATER FILTER AND HOME APPLIANCE HAVING SAME

CROSS-REFERENCE TO RELATED APPLICATION(S)

This application claims priority under 35 U.S.C. § 119 to Korean Application No. 10-2024-0136574 filed on Oct. 8, 2024, whose entire disclosure(s) is/are hereby incorporated by reference.

BACKGROUND

1. Field

The present disclosure relates to a water filter and a home appliance having the same.

2. Background

In addition, these filter devices require periodic replacement to maintain water purification performance, and can be configured to have an easy-to-replace structure so that the user can easily replace them at any time desired.

In general, the filter device may include a head provided on a flow path through which water flows, and a filter detachably coupled to the head and having a built-in filter member for purification. According to the type of the filter member, the filter device may have various purification performances, and the filter device may be configured by a coupling of a plurality of filters having different types of filter members.

Meanwhile, the filter device may have a structure that is convenient for mounting and separation, and in particular, various structures are being developed in which incorrect mounting is prevented and accurate mounting is induced by the coupled structure of the head and the filter.

In addition, a filter device is being developed that switches the internal flow path of the head by rotating the filter during the process of attaching and detaching the filter to the head, thereby preventing water leakage even when the filter is separated.

However, in such filter devices, there is a problem that the internal flow path structure of the head for switching the flow path is complicated. In addition, if the flow path is switched repeatedly, the durability of the head is reduced, and this causes a problem of water leakage.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein:

FIG. 28 is a longitudinal cross-sectional view illustrating a state the head and filter are separated;

DETAILED DESCRIPTION

Figure 1:
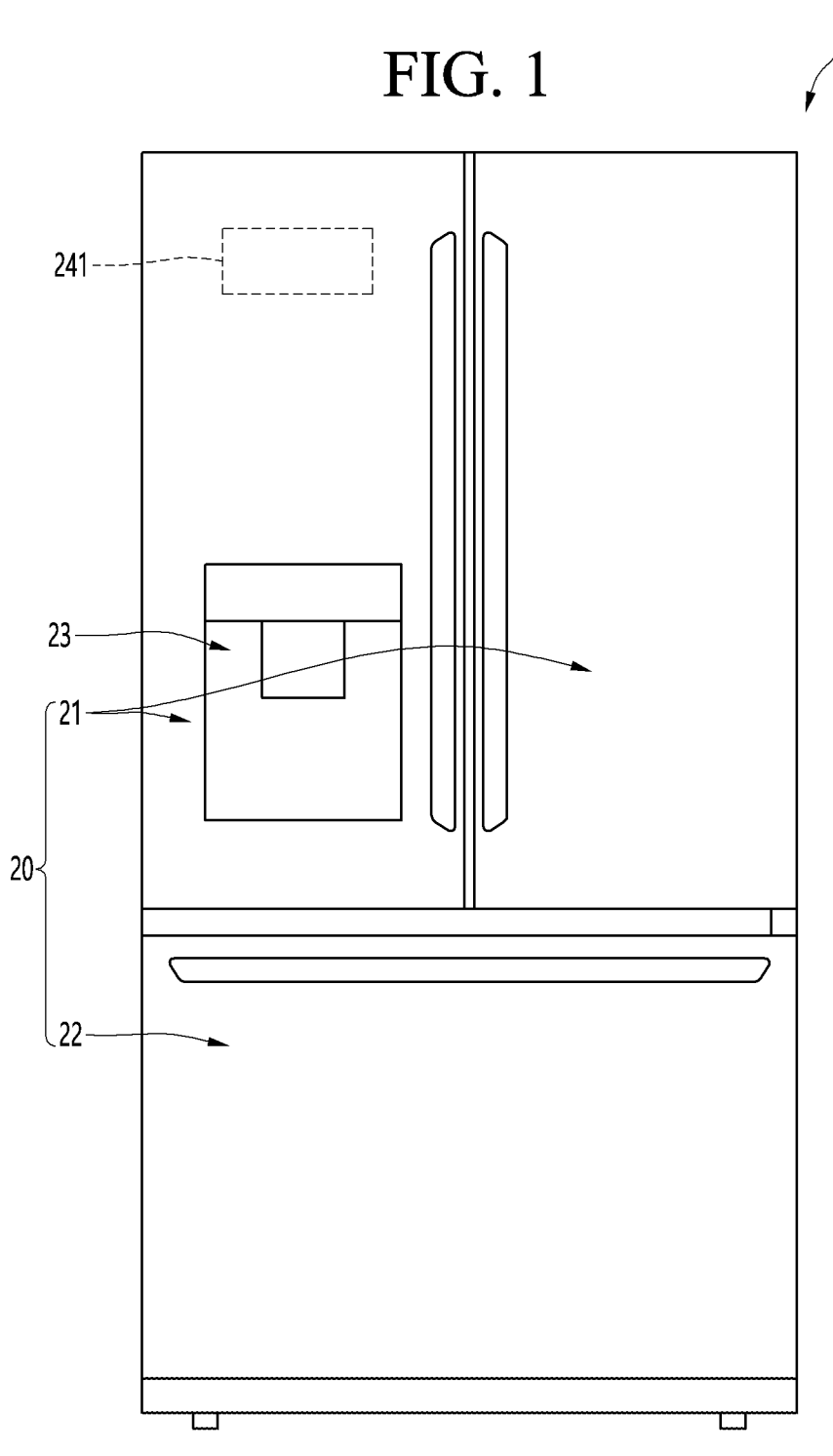
FIG. 1 is a front view illustrating a refrigerator according to the first embodiment of the present disclosure.

Hereinafter, specific embodiments of the present disclosure will be described in detail with reference to the drawings. However, the present disclosure is not limited to the embodiments in which the idea of the present disclosure is presented, and other regressive disclosures or other embodiments included within the scope of the idea of the present disclosure can be easily proposed by adding, changing, deleting, or the like other components.

Before the explanation, the direction is defined. In the embodiment of the present disclosure, the direction toward the head in FIG. 3 may be referred to as an upper direction, the direction toward the filter may be referred to as a lower direction, the direction toward the mounting member may be referred to as a rear direction, and the direction away from the mounting member may be referred to as a front direction. In addition, the direction toward the center of the filter and the head may be referred to as an inner direction, and the direction away from the center may be referred to as an outer direction.

To readily understand the following detailed and expansive description, a brief explanation is provided relative to FIGS. 28-32. As shown, to insert a filter 60 into a head 50, at least an upper housing 62 is rotated into the head 50 while the filter cover 66 having water inlet 663 and water outlet 664 is moved linearly. In other words, at least the upper housing 62 is rotatable around the filter cover 66. If the lower housing 61 is fixed to the upper housing, the housing 600 is rotatable relative to the filter cover as the filter 60 is inserted into the head 50. Further, if the filter member 63 is maintained stationary with the filter cover 66, the housing 600 rotates relative to the filter cover 66 and the filter member 63.

In addition, although the embodiment of the present disclosure has been described using a refrigerator as an example among many home appliances, it should be noted in advance that the filter according to the embodiment of the present disclosure can be applied to various home appliances requiring purified water, such as water purifiers and ice makers, without being limited in structure and shape.

Figure 2:
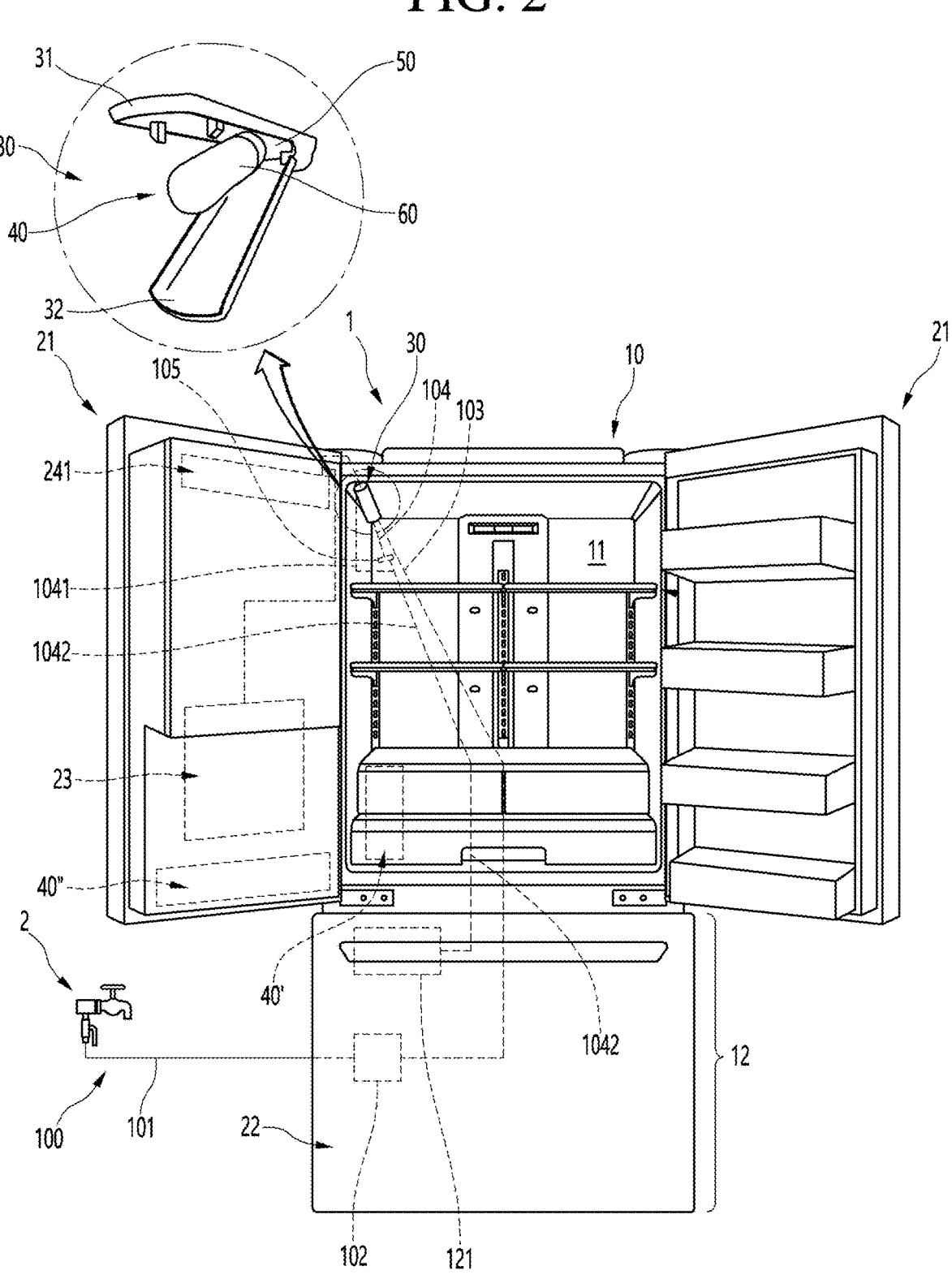
FIG. 2 is a view illustrating the flow path structure for supplying water to the refrigerator.

FIG. 1 is a front view illustrating a refrigerator according to the first embodiment of the present disclosure, and FIG. 2 is a view illustrating the flow path structure for supplying water to the refrigerator.

As illustrated, a refrigerator 1 according to an embodiment of the present disclosure may have an outer appearance formed by a cabinet 10 forming a storage space and a door 20 for opening and closing the storage space of the cabinet 10.

The storage space may include a refrigerating compartment 11 positioned at the upper part of the cabinet 10 and a freezing compartment 12 positioned at the lower part of the cabinet 10.

The door 20 may include a refrigerating compartment door 21 and a freezing chamber door 22 that independently open and close the refrigerating compartment 12 and freezing compartment 13, respectively. The refrigerating compartment doors 21 may be provided in pairs on the left and right sides, and may be configured to open and close the refrigerating compartment 11 by rotation.

In addition, the freezing chamber door 22 may have a structure like a drawer and may be configured to open and close the freezing compartment 12 by being pulled in and out.

According to the disposition of the storage space and the type and shape of the refrigerator that opens and closes the storage space, an embodiment of the present disclosure may have various structures, and for convenience of explanation and understanding, the embodiment of the present disclosure will be described based on a refrigerator in which the refrigerating compartment is disposed above the freezing compartment and is opened and closed by a pair of doors.

A dispenser 23 and an ice maker 241 may be provided on one of the pair of refrigerating compartment doors 21. The ice maker 241 may be provided inside the refrigerating compartment 11 or in the freezing compartment 12 rather than on the refrigerator door.

The dispenser 23 is provided on the front surface of the refrigerating compartment door 21 and can be configured to allow a user to operate it from the outside to dispense water or ice. In addition, an ice making compartment 24 is provided above the dispenser 23. The ice making compartment 24 is an insulated space where ice is made and stored, and the ice maker 241 is accommodated inside thereof and can be configured to be opened and closed by a separate door.

In addition, an ice maker 121 may be provided inside the freezing compartment 12. When the freezing compartment door 12 is opened, access to the ice maker 121 is possible, and ice made in the ice maker 121 can be taken out.

In order to distinguish the ice maker 121 provided in the freezing compartment 12 from the ice maker 241 provided in the refrigerating compartment door 21, the ice maker 241 provided in the refrigerating compartment 11 may be referred to as a first ice maker 241, and the ice maker 121 provided in the freezing compartment 12 may be referred to as a second ice maker 121.

The refrigerator 1 may be equipped with a filter assembly 40 for purifying water supplied from an external water supply source 2. For example, the water supply source 2 may be a tap water source. In addition, the water supply source 2 may be a container storing water, such as a water tank.

The filter assembly 40 can be connected to a water device that uses purified water. The water device can include an ice maker that makes ice, a dispenser that dispenses purified water, or the like. In addition, the water device and filter assembly 40 can be used in other home appliances such as a water purifier rather than a refrigerator.

For example, water supplied from the water supply source 2 may be purified by the filter assembly 40 and then dispensed to the dispenser 23 or supplied to the ice maker 241, 121. In addition, the water supply source 2, the filter assembly 40, the dispenser 23, and the ice maker 241, 121 may be connected by a water supply flow path 100.

In detail, the water supply flow path 100 may include a connection pipe 101 connected to the water supply source 2 and a water supply valve 102 inside the cabinet 10. For example, the water supply valve 102 may be provided inside a machine room where a compressor and a condenser are disposed. In addition, the water supply valve 102 may be provided with a flow rate sensor to adjust and control the flow rate of water supplied to the refrigerator 1.

The water supply flow path 100 may include a water inlet pipe 103 and a water outlet pipe 104. The water inlet pipe 103 may be configured to connect the water supply valve 102 and the filter assembly 40 to supply water to the filter assembly 40. The water outlet pipe 104 may be connected to the filter assembly 40 and the dispenser 23 or the ice maker 241, 121 to supply purified water. The water inlet pipe 103 and the water outlet pipe 104 may be configured by connecting a plurality of pipes by fittings.

In addition, the water outlet pipe 104 may be branched by a branch valve 105. For example, the water outlet pipe 104 may include a first water outlet pipe 1041 that supplies purified water to the dispenser 23 and the first ice maker 141, and a second water outlet pipe 1042 that supplies purified water to the second ice maker 121.

Meanwhile, the filter assembly 40 may be provided in the refrigerating compartment 11. For example, the filter assembly 40 may be provided at a corner of one of the left and right sides of the upper surface of the refrigerating compartment 11. As another example, the filter assembly 40' may be provided between storage members such as drawers or shelves of the refrigerating compartment 11 or at a rear part covered by the storage members. As another example, the filter assembly 40" may be provided in the refrigerating compartment door 21.

Meanwhile, the filter assembly 40 may be configured to facilitate replacement of the filter 60 in which substantial water purification is performed. For example, the refrigerating compartment 11 may be equipped with a filter device 30. The filter device 30 may be configured to be accessible when the refrigerating compartment door 21 is opened.

The filter device 30 may include a case 31 and a cover 32. The case 31 may be provided on the upper surface of the cabinet 10. In addition, the case 31 may form a space in which a filter assembly 40 is disposed inside. The cover 32 may open and close the case 31 by rotation. The filter assembly 40 may be exposed to the outside by opening the cover 32. The filter assembly 40 may include a filter 60 and a head 50. In addition, when the cover 32 is opened, the filter 60 may be exposed forward to be easily detachable. The filter 60 may be referred to as a water filter for water purification, and will be referred to as a filter hereinafter for convenience of explanation.

Below, the structure of the filter assembly 40 is described in more detail with reference to the drawings.

Figure 3:
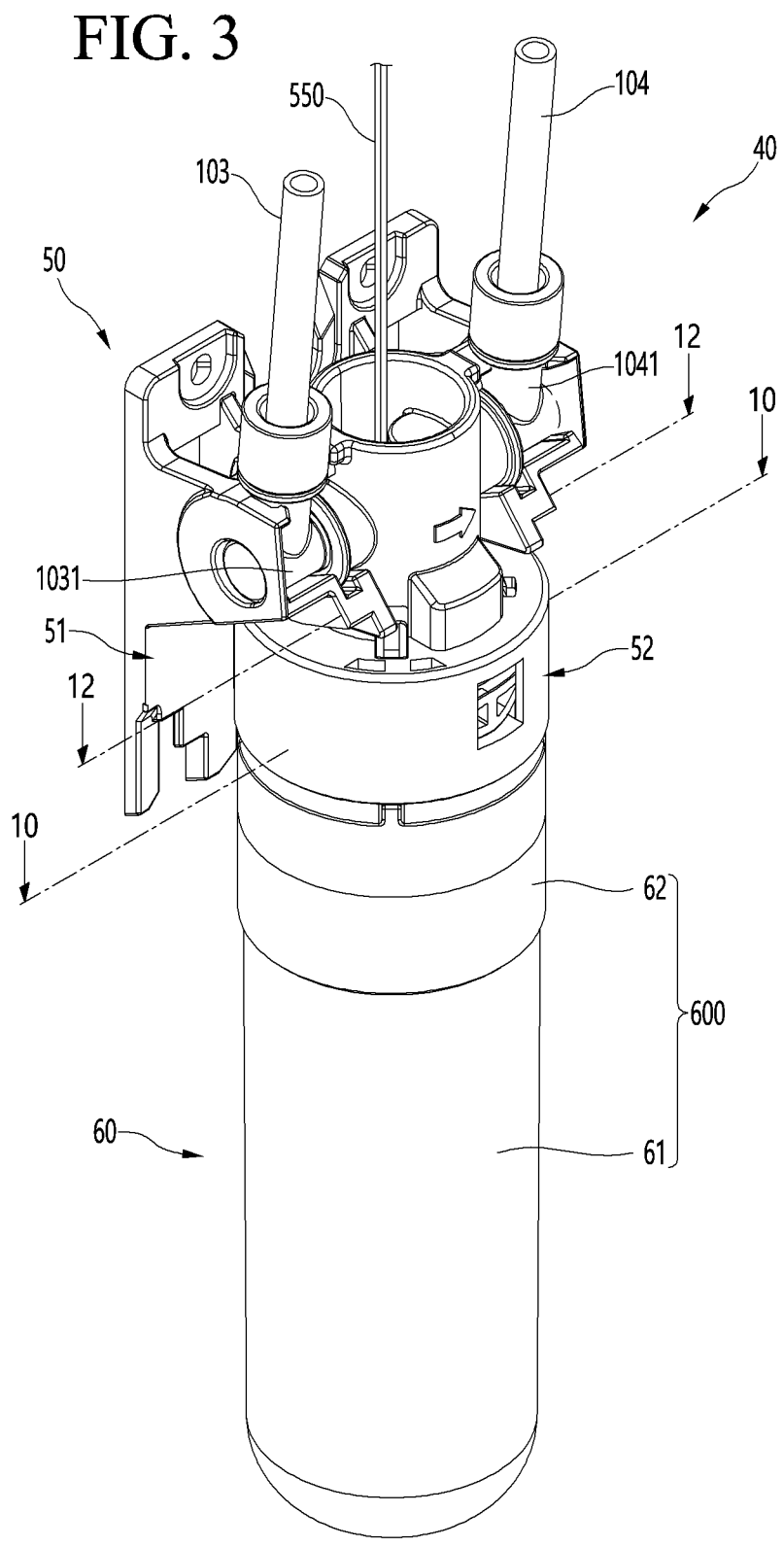
FIG. 3 is a perspective view illustrating a state where a filter of a filter assembly according to the first embodiment of the present disclosure is coupled to the head.
Figure 4:
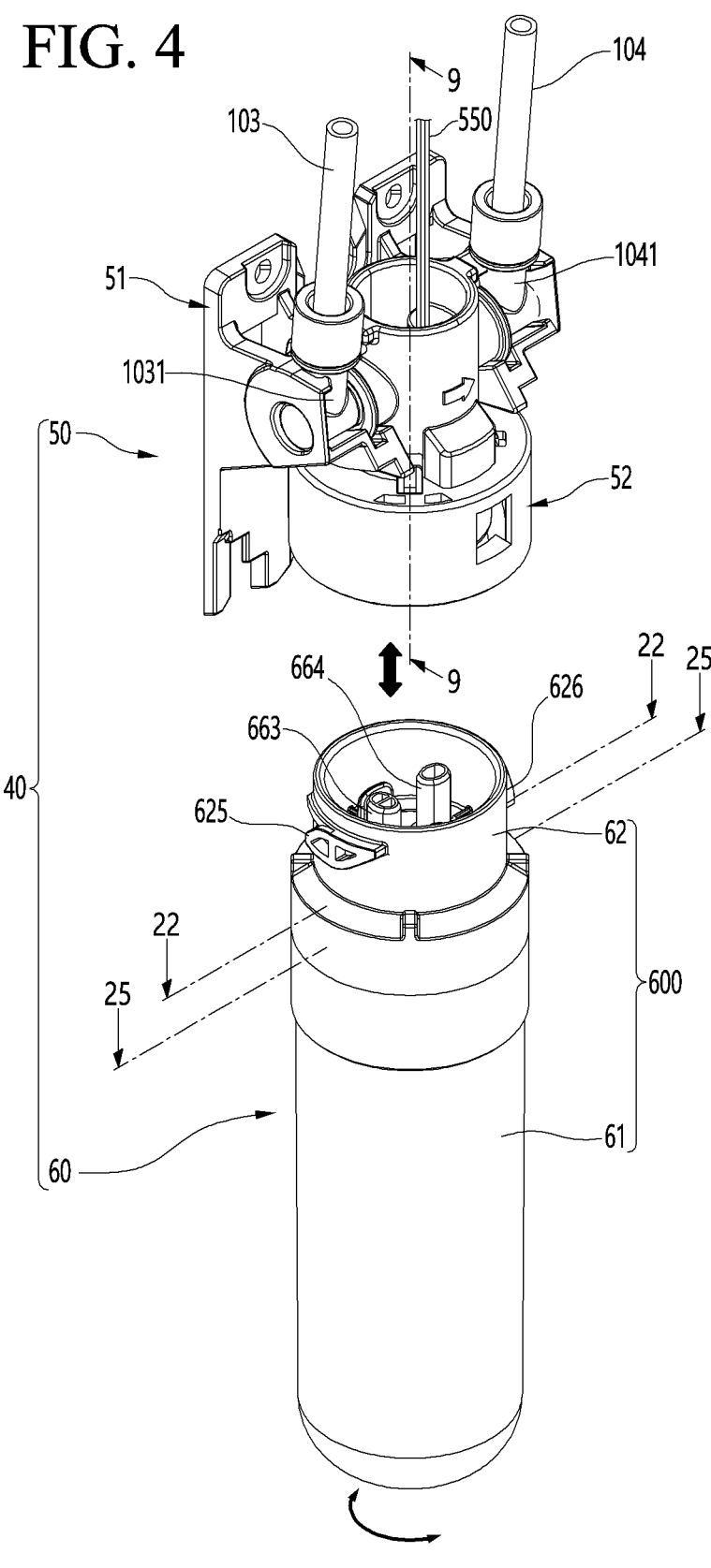
FIG. 4 is an exploded perspective view illustrating a state where the filter is separated from the head.

FIG. 3 is a perspective view illustrating a state where a filter of a filter assembly according to the first embodiment of the present disclosure is coupled to the head, and FIG. 4 is an exploded perspective view illustrating a state where the filter is separated from the head.

As illustrated, the filter assembly 40 may include a head 50 for mounting the filter assembly 40 and a filter 60 detachably mounted on the head 50.

For example, the head 50 may include a mounting member 51 and a head body 52. The mounting member 51 is for mounting the filter assembly 40, and a fixing member such as a screw may be fastened to fix the filter assembly 40 to a target location. For example, the mounting member 51 may be fixed to one side of the refrigerating compartment 11. Meanwhile, when a structure for mounting the head 50 is provided in the refrigerator 1, the mounting member 51 may be omitted, and the head 50 may be configured with the head body 52. In other words, the head body 52 may mean the head 50.

In addition, the head body 52 can be rotatably mounted on the mounting member 51. The head body 52 can be rotated with respect to the mounting member 51 while the filter 60 is mounted, thereby making it easier to attach or detach the filter 60.

The water inlet pipe 103 and the water outlet pipe 104 may be connected to both sides of the head body 52. The water inlet pipe 103 and the water outlet pipe 104 may be connected to the head body 52 by a water inlet pipe fitting 1031 and a water outlet pipe fitting 1041, respectively. Accordingly, water flowing in through the water inlet pipe fitting 1031 from the water inlet pipe 103 may pass through the head body 52 and be supplied to the filter 60, and water purified in the filter 60 may pass through the head body 52 and be discharged to the water outlet pipe 104 through the water outlet pipe fitting 1041.

The filter 60 may include a housing 600 forming an outer appearance. In addition, the housing 600 may be detachably mounted on the head body 52. In addition, the housing 600 may accommodate a filter member 63 (in FIG. 14) for purified water inside. For example, the housing 600 may include an upper housing 62 and a lower housing 61, and the filter member 63 may be accommodated inside the upper housing 62 and the lower housing 61.

The upper end of the filter 60 can be inserted into the opened lower surface of the head 50 and coupled with the head 50. For example, a guide protrusion 625, 626 for coupling with the head 50 may be formed on the outer surface of the upper housing 62. The upper housing 62 is inserted into the interior of the head body 52, and the guide protrusion 625, 626 can be moved while rotating along the inner surface of the head body 52. In other words, the housing 600 can be rotated during the process of being inserted and mounted into the head body 52.

The upper housing 62 may have a water inlet part 663 and a water outlet part 664 protruding upward. In addition, when the filter 60 is connected to the head 50, the water inlet part 663 and the water outlet part 664 may communicate with the flow path of the head 50. Accordingly, water supplied through the water inlet pipe 103 may be purified through the filter 60 and then discharged through the water outlet pipe 104.

The water inlet part 663 and water outlet part 664 maintain an aligned state even when the housing 600 rotates, and can be connected to the head 50. In other words, when the filter 60 is mounted, the water inlet part 663 and water outlet part 664 move upward and are inserted into the corresponding inlet hole 5321 (in FIG. 6) and outlet hole 5323 (in FIG. 6) on the inside of the head 50, and the housing 600 can be coupled to the head 50 while rotating independently of the water inlet part 663 and water outlet part 664.

Below, the head 50 will be described in more detail with reference to the drawings.

Figure 5:
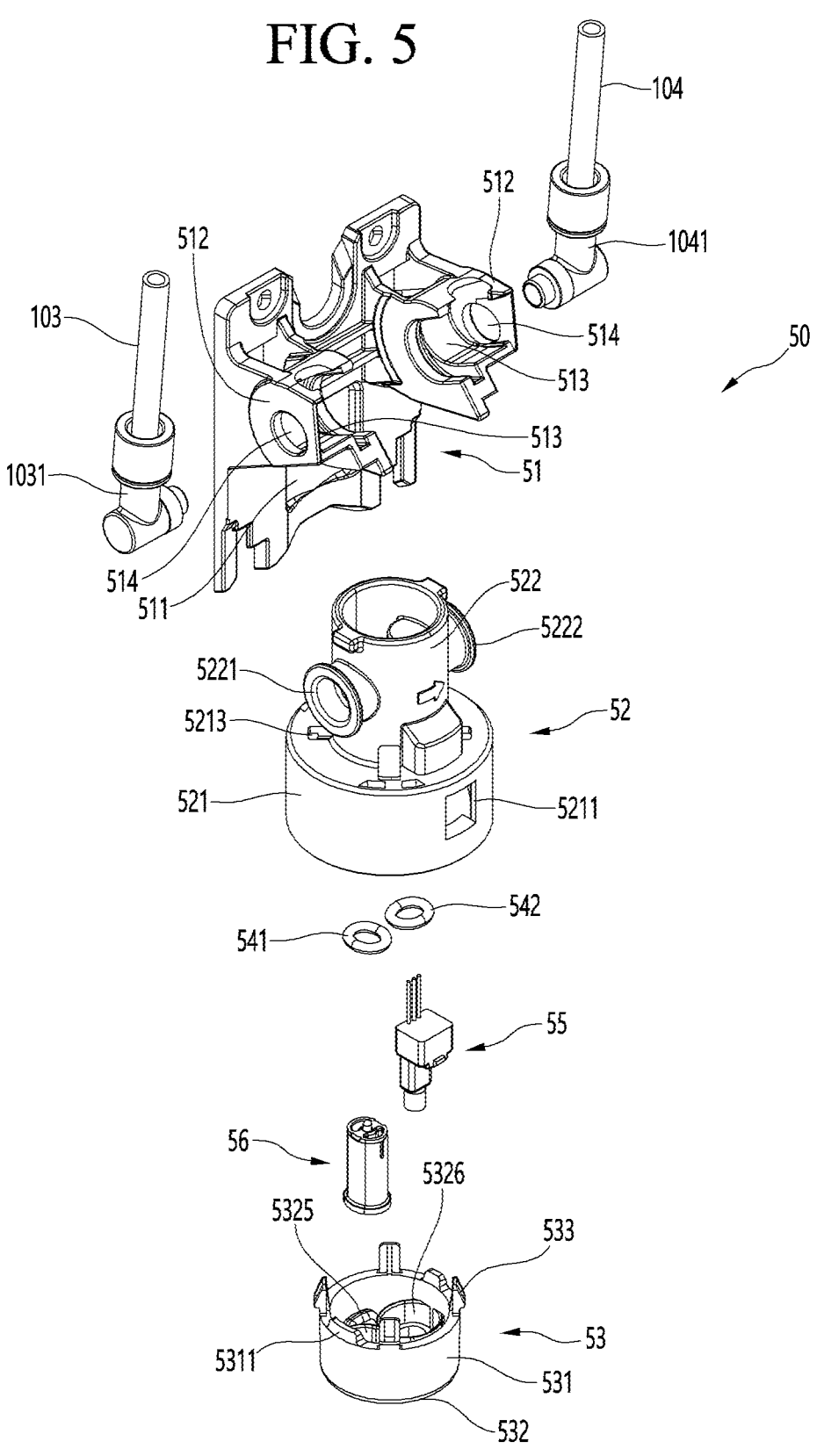
FIG. 5 is an exploded perspective view illustrating the head.
Figure 6:
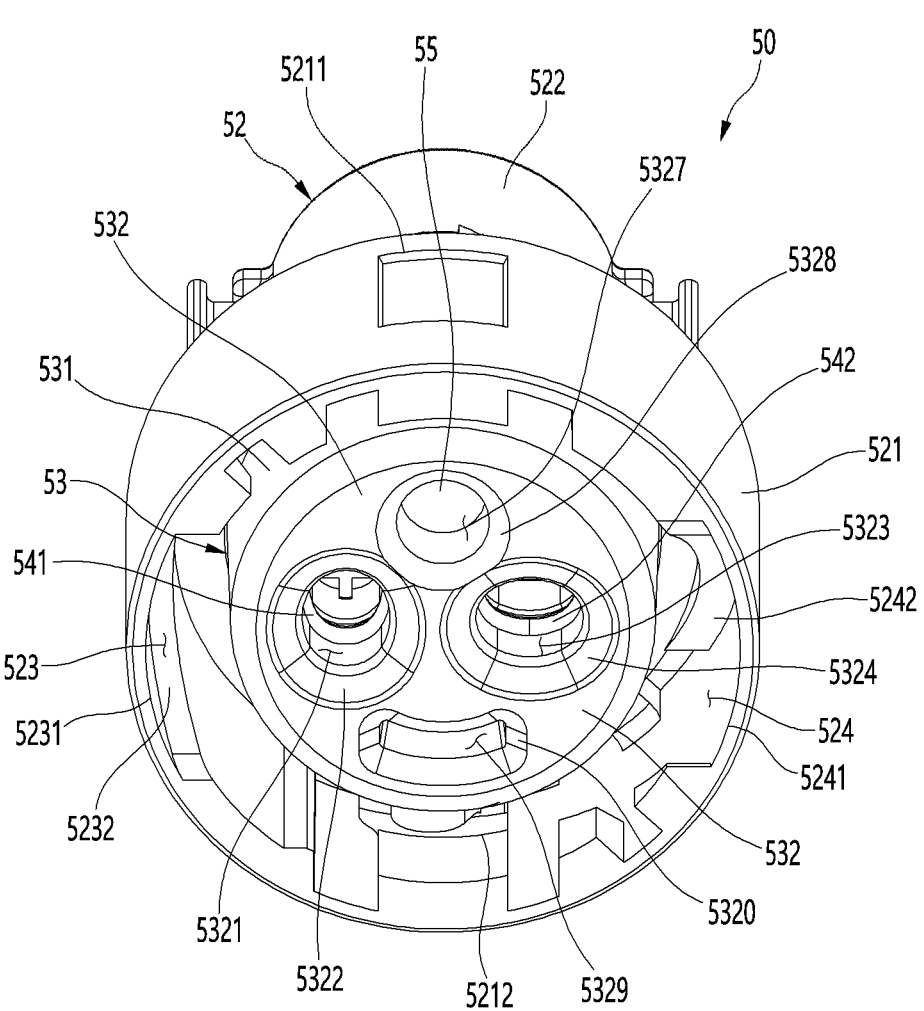
FIG. 6 is a perspective view illustrating the head seen from below.
Figure 7:
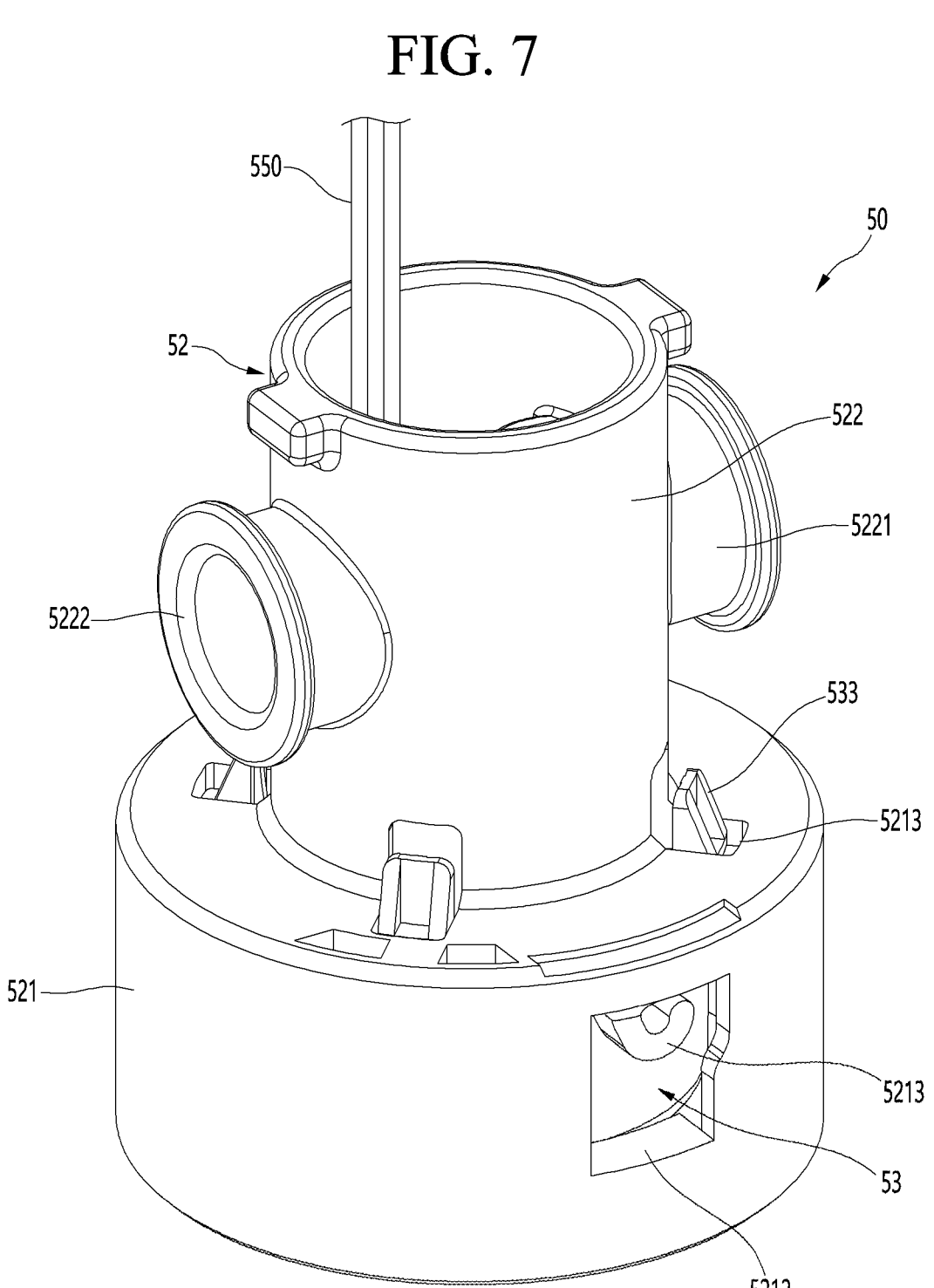
FIG. 7 is a perspective view illustrating the head seen from the rear.
Figure 8:
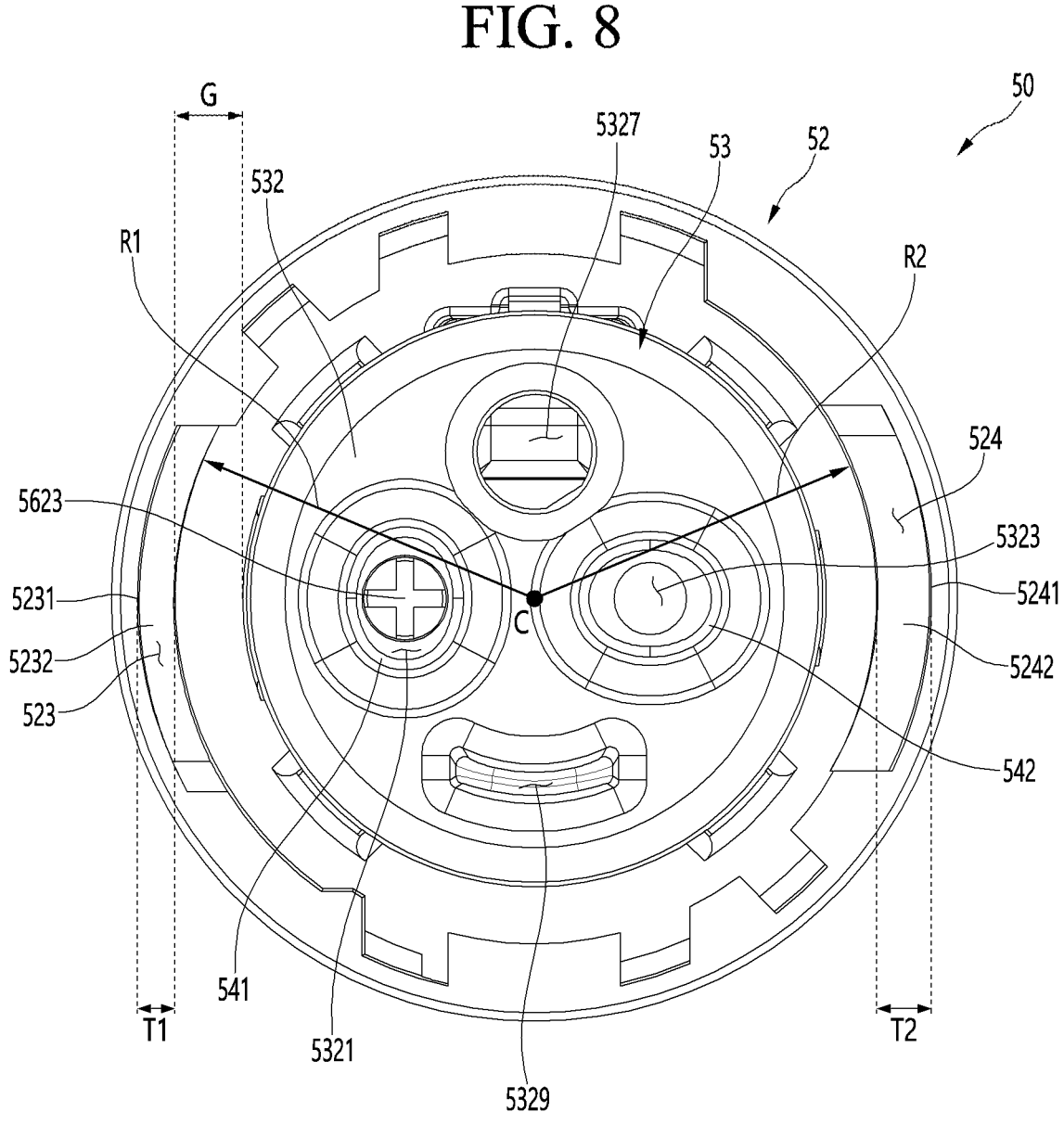
FIG. 8 is a bottom view illustrating the head.

FIG. 5 is an exploded perspective view illustrating the head, FIG. 6 is a perspective view illustrating the head seen from below, FIG. 7 is a perspective view illustrating the head seen from the rear, and FIG. 8 is a bottom view illustrating the head.

As illustrated, the head 50 may include the mounting member 51, the water inlet pipe 103, the water outlet pipe 104, and the head body 52.

The mounting member 51 is for mounting the filter assembly 40, and the head body 52 on which the filter 60 is mounted can be rotatably mounted. In detail, the mounting member 51 can include a mounting part 511 that comes into contact with a mounting target, and a head connection part 512 to which the head body 52 is rotatably coupled.

The mounting part 511 forms the rear surface of the mounting member 51 and can extend in the vertical direction. In addition, a screw can be fastened to the mounting part 511 to secure the mounting member 51.

The head connection part 512 may protrude forward from both left and right sides of the mounting part 511. The head body 52 may be placed between a pair of the head connection parts 512. In detail, a fitting seating part 513 on which the fitting 1031, 1041 is seated may be formed at the front end of the head connection part 512. In addition, a seating part opening 514 on which the fitting 1031, 1041 is axially coupled may be formed at the side of the fitting seating part 513.

The water inlet pipe fitting 1031 and the water outlet pipe fitting 1041 are respectively seated in the fitting mounting parts 513 located on both sides, and can be rotatably disposed by being axially coupled to the seating part openings 514. In addition, the water inlet pipe fitting 1031 and the water outlet pipe fitting 1041 can be rotatably connected to both sides of the head body 52. Therefore, in a state where the head body 52 and the fittings 1031, 1041 are mounted on the head connection part 512, the head body 52 and the fittings 1031, 1041 can be rotated with respect to the head connection part 512.

The head body 52 can be formed in a cylindrical shape to which the filter 60 is connected through the opened lower surface. In addition, the water inlet pipe 103 and the water outlet pipe 104 can be connected to both sides of the head body 52.

In detail, the head body 52 may include a head upper 522 and a head lower 521. The head upper 522 may be connected to the water inlet pipe fitting 1031 and the water outlet pipe fitting 1041. A water inlet pipe connection part 5221 connected to the water inlet pipe fitting 1031 and a water outlet pipe connection part 5222 connected to the water outlet pipe fitting 1041 may be provided on both sides of the head upper 522.

The water inlet pipe connection part 5221 and water outlet pipe connection part 5222 can be opened on both sides of the head upper. In addition, the end parts of the water inlet pipe fitting 1031 and the water outlet pipe fitting 1041 can be rotatably inserted into the water inlet pipe connection part 5221 and the water outlet pipe connection part 5222.

In addition, the water inlet pipe connection part 5221 and the water outlet pipe connection part 5222 may be disposed to face each other on the same extension line. The water inlet pipe connection part 5221 and the water outlet pipe connection part 5222 may protrude outwardly from the outer surface of the head upper 522 and may be rotatably coupled to the head connection part 512. In addition, the water inlet pipe connection part 5221 and the water inlet pipe fitting 1031, the water outlet pipe connection part 5222 and the water outlet pipe fitting 1041 may be formed integrally, and the water inlet pipe 103 and the water outlet pipe 104 may be directly connected to the water inlet pipe connection part 5221 and the water outlet pipe connection part 5222.

The head lower 521 is provided at the lower part of the head upper 522 and may form a coupling space 520 that is coupled to the upper end of the filter 60. The coupling space 520 may be opened downward. In addition, the head lower 521 may be formed to have a larger diameter than the head upper 522. In addition, a check window 5211 that can visualize the exact mounting state of the filter 60 may be opened in the head lower 521. In addition, a rear check window 5212 may be further formed at the rear of the head lower 521 facing the check window 5211. The check window 5211 may also be referred to as a front check window 5211 to distinguish it from the rear check window 5212.

The head lower 521 has an open lower surface and can form the coupling space 520 in which the upper end of the filter 60 is accommodated. In addition, a coupling guide 523, 524 is formed on the inner surface of the head lower 521 to induce insertion and coupling of the filter 60.

For example, the coupling guide 523, 524 may include a first guide 523 and a second guide 524. The first guide 523 may be formed to guide the insertion and coupling of the first guide protrusion 625 formed on the filter 60, and the second guide 524 may be formed to guide the insertion and coupling of the second guide protrusion 626 formed on the filter 60.

In detail, the first guide 523 and the second guide 524 can be formed at positions facing each other. In addition, the first guide 523 and the second guide 524 can be disposed in the same direction as the disposition direction of the water inlet pipe connection part 5221 and the water outlet pipe connection part 5222.

The first guide 523 is recessed into the inner surface of the head lower 521 and can extend upward from the lower end of the head lower 521. The first guide 523 can extend to the check window 5211 to guide the first guide protrusion 625 to move along the first guide 523 to the check window 5211.

The first guide 523 may include a first guide hole 5231 opened at the lower end of the head lower 521. The position of the first guide hole 5231 may be positioned downward corresponding to the water inlet pipe connection part 5221. The size of the first guide hole 5231 may be formed to correspond to the size of the first guide protrusion 625, so that the first guide protrusion 625 may be inserted through the first guide hole 5231.

In addition, the first guide 523 may include a first guide part 5232 extending from one end of the first guide hole 5231 toward the check window 5211. The first guide part 5232 may be formed to be inclined or rounded, and may be in contact with the first guide protrusion 625. Accordingly, the first guide protrusion 625 inserted into the first guide hole 5231 may be guided to move toward the check window 5211 while maintaining contact with the first guide part 5232. In addition, the first guide parts 5232 may be formed in a pair at both ends of the first guide hole 5231, and the first guide protrusion 625 may be positioned between the pair of first guide parts 5232.

At this time, the first guide part 5232 may be formed along the inner circumference of the head lower 521. In addition, the first guide protrusion 625 moves along the inner surface of the head lower 521. Accordingly, the filter housing 600 may rotate while the first guide protrusion 625 moves from the first guide hole 5231 to the check window 5211.

The second guide 524 is recessed into the inner surface of the head lower 521 and can extend upward from the lower end of the head lower 521. The second guide 524 can extend to the rear check window 5212 and guide the second guide protrusion 626 to move along the second guide 524 to the rear check window 5212.

The second guide 524 may be formed at a position facing the first guide 523. In addition, the second guide 524 may be formed in a shape corresponding to the first guide 523, but may be formed to extend in a direction opposite to the extension direction of the second guide 524.

The second guide 524 may include a second guide hole 5241 opened at the lower end of the head lower 521. The position of the second guide hole 5241 may be positioned downward corresponding to the water outlet pipe connection part 5222. In addition, the second guide hole 5241 may be formed in a direction facing the first guide hole 5231. The size of the second guide hole 5241 may be formed corresponding to the size of the second guide protrusion 626, so that the second guide protrusion 626 may be inserted through the second guide hole 5241.

In addition, the second guide 524 may include a second guide part 5242 extending from one end of the second guide hole 5241 toward the rear check window 5212. The second guide part 5242 may be formed to be inclined or rounded, and may be in contact with the second guide protrusion 626. Accordingly, the second guide protrusion 626 inserted into the second guide hole 5241 may be guided to move toward the rear check window 5212 while maintaining contact with the second guide part 5242. In addition, a pair of the second guide parts 5242 may be formed at both ends of the second guide hole 5241, and the second guide protrusion 626 may be positioned between the pair of second guide parts 5242.

At this time, the second guide part 5242 may be formed along the inner circumference of the head lower 521. In addition, the second guide protrusion 626 moves along the inner surface of the head lower 521. Accordingly, the filter housing 600 may rotate while the second guide protrusion 626 moves from the second guide hole 5241 to the rear check window 5212.

In addition, a restraint part 5213 protruding downwardly may be formed on the upper end of the rear check window 5212. The restraint part 5213 may protrude downwardly and may be formed in an elastic ring shape. Accordingly, it may be checked through the rear check window 5212 that the restraint part 5213 is inserted into the restraint groove 6266 (in FIG. 17) formed on the upper surface of the second guide protrusion 626. In addition, the moment the restraint part 5213 is inserted into the restraint groove 6266, the elastic deformation of the restraint part 5213 and the operational feeling due to the coupling with the restraint groove 6266 are transmitted to the user, so that the user can recognize that the filter 60 is completely mounted.

Meanwhile, a head inner 53 may be provided inside the head body 52. The head inner 53 may be separately molded and coupled to the head body 52. The head inner 53 may be exposed through the opened lower surface of the head body 52. In addition, the head inner 53 may be formed into a circular shape concentric with the head body 52 when viewed from below.

The head inner 53 may be formed to be coupled with the water inlet part 663 and the water outlet part 664. In addition, the head inner 53 may provide a mounting structure of an inlet ring 541 and an outlet ring 542 for seal ring the water inlet part 663 and the water outlet part 664. In addition, the head inner 53 may provide a structure in which a filter sensing device 55 for detecting the filter 60 is mounted. In addition, the head inner 53 may be configured to have a rotation protrusion 669 inserted therein to facilitate relative rotation of the housing 600.

In detail, the head inner 53 may include an inner base 532 and an inner wall 531. The inner base 532 may form a lower surface of the head inner 53. In addition, the inner base 532 may be formed in a circular shape. The center of the inner base 532 may be positioned on the same extension line as the center of the head body 52. In a state where the head inner 53 is coupled to the head body 52, the inner base 532 may be positioned higher than the lower end of the head body 52.

The inner base 532 may be formed with the inlet hole 5321 and the outlet hole 5323. The inlet hole 5321 and the outlet hole 5323 may be disposed parallel to each other. In addition, the inlet hole 5321 and the outlet hole 5323 may be positioned between the first guide hole 5231 and the second guide hole 5241. Therefore, when the first guide protrusion 625 and the second guide protrusion 626 are inserted and mounted into the first guide hole 5231 and the second guide hole 5241, the water inlet part 663 and the water outlet part 664 may be naturally inserted into the inlet hole 5321 and the outlet hole 5323, respectively.

The inlet hole 5321 and outlet hole 5323 may be formed in an elliptical shape corresponding to the cross-sectional shape of the water inlet part 663 and the water outlet part 664, respectively. In addition, the inlet hole 5321 and outlet hole 5323 may be disposed to have directionality.

Accordingly, the water inlet part 663 and water outlet part 664 can be inserted and mounted into the corresponding inlet hole 5321 and outlet hole 5323 respectively without being incorrectly mounted. Since incorrect mounting can be prevented when mounting the filter 60, the correct operation of the valve 56 inside the head 50 can be ensured by inserting the water inlet part 663 when mounting the filter 60.

In addition, since the water inlet part 663 and water outlet part 664 have an elliptical cross-sectional shape, the directionality can be easily checked when the filter 60 is viewed from above, and it can be easy to recognize the exact alignment state.

In addition, even if torque is applied to the water inlet part 663 and water outlet part 664 that maintain a fixed state compared to the rotating housing 600, it is possible to maintain a structurally stable fixed state without rotating or movement.

For example, the inlet hole 5321 may be formed so that the major axis of the cross-section is disposed in the front and rear direction, and the outlet hole 5323 may be formed so that the major axis of the cross-section is disposed in the left and right direction.

An inlet edge 5325 extending upward may be formed around the inlet hole 5321. The inlet edge 5325 may form a space into which the water inlet part 663 is inserted. In addition, the upper end of the inlet edge 5325 may support the inlet ring 541. The inlet ring 541 may be secured to the inlet edge 5325 to prevent deformation and detachment.

An inclined surface 5322 may be formed between the inlet hole 5321 and the inlet edge 5325. The inclined surface 5322 guides the water inlet part 663 to be inserted into the inside of the inlet hole 5321, and allows the water inlet part 663 to be smoothly removed without being caught on the end part of the inlet hole 5321 when the filter 60 is separated.

Meanwhile, a valve 56 may be provided above the inlet hole 5321. The valve 56 may open and close a flow path communicating with the inlet hole 5321. The valve 56 may have a structure such as a check valve. The valve 56 may be opened by coming into contact with the water inlet part 663 when the filter 60 is mounted and the water inlet part 663 is inserted into the inlet hole 5321. In addition, in a state where the filter 60 is not mounted, the valve may be maintained in a closed state to prevent water leakage.

An outlet edge 5326 extending upward may be formed around the outlet hole 5323. The outlet edge 5326 may form a space into which the water outlet part 664 is inserted. In addition, the upper end of the outlet edge 5326 may support the outlet ring 542. The outlet ring 542 may be secured to the outlet edge 5326 to prevent deformation and detachment.

Therefore, when the head inner 53 is mounted on the head body 52, the inlet ring 541 and the outlet ring 542 can be fixed in the upper and lower direction by the head body 52 and the inlet edge 5325 and the outlet edge 5326.

An inclined surface 5324 may be formed between the outlet hole 5323 and the outlet edge 5326. The inclined surface 5324 guides the water outlet part 664 to be inserted into the inside of the outlet hole 5323, and allows the water outlet part 664 to be smoothly removed without being caught on the end part of the outlet hole 5323 when the filter 60 is separated. In particular, the filter 60 can be separated by being bent while being rotated, and the separated movement of the filter 60 can be smoothly facilitated by the inclined surface 5322, 5324.

Meanwhile, a filter sensing device 55 for detecting the mounting of the filter 60 may be provided inside the head body 52. For example, the filter sensing device 55 may be a sensor that detects a change in a magnetic field. As another example, the filter sensing device 55 may be configured as a proximity sensing device, a contact switch, an RFID reader, or the like. An electric wire 550 connected to the filter sensing device 55 may extend upward from the head body 52.

A sensing hole 5327 into which a sensing member 668 to be described below is inserted may be formed in the inner base 532. In addition, the filter sensing device 55 may be provided at the upper end of the sensing hole 5237. Accordingly, when the filter 60 is mounted on the head 50, the sensing member 668 (in FIG. 14) is inserted into the sensing hole 5237, and the filter sensing device 55 can detect the sensing member 668 to determine whether the filter 60 is mounted.

An inclined surface 5328 is formed around the circumference of the sensing hole 5237 to facilitate the entry and exit of the sensing member 668.

The inner base 532 may be formed with a rotation groove 5329 into which the rotation protrusion 669 is inserted. The rotation groove 5329 may extend upward and be formed in a shape corresponding to the rotation protrusion 669 so that the rotation protrusion 669 (in FIG. 14) may be closely attached. Accordingly, the generation of torque may be facilitated when the housing 600 is rotated. In addition, the rotation protrusion 669 and the rotation groove 5329 may allow the filter cover 66 (in FIG. 14) and the head inner 53 to be firmly coupled to each other when the filter 60 is mounted, thereby preventing the water inlet part 663 and the water outlet part 664 from moving when the housing 600 is rotated.

An inclined or rounded inclined surface 5320 may be formed around the circumference of the rotation groove 5329. Accordingly, while inducing the insertion of the rotation protrusion 669, the rotation protrusion 669 may be easily entered and exited without being caught in the rotation groove 5329 when the filter 60 is detached.

The sensing hole 5237 and the rotation groove 5329 may be disposed at positions facing each other. In addition, the disposition of the sensing hole 5237 and the rotation groove 5329 may intersect the disposition positions of the inlet hole 5321 and the outlet hole 5323. For example, the inlet hole 5321 and the outlet hole 5323 may be disposed on the left and right sides with respect to the center of the inner base 532, and the sensing hole 5237 and the rotation groove 5329 may be disposed in the front and rear direction.

The inner base 532 may be formed to have a smaller size than the opened lower surface of the head body 52. In addition, the inner wall 531 may extend upward along the circumference of the inner base 532. The inner wall 531 may extend to the upper end of the head lower 521.

An inner coupling part 533 may protrude upwardly from the upper end of the inner wall 531. The inner coupling part 533 may be coupled to the upper surface of the head lower 521 formed stepwise on the upper end of the head lower 521. For example, a coupling hole 5213 may be formed on the upper surface of the head lower 521, and a hook-shaped inner coupling part 533 may penetrate the coupling hole 5213. By coupling the inner coupling part 533 to the coupling hole 5213, the head inner 53 may be fixedly mounted to the inner side of the head body 52. In addition, a coupling guide 5311 may be formed on the upper end of the inner wall 531. The coupling guide 5311 may be inserted into the head body 52 in the shape of a protrusion protruding upward. At this time, the coupling guide 5311 is formed with different sizes so that the head inner 53 can be prevented from being installed incorrectly and mounted in an accurate position.

The outer surface of the inner wall 531 may be spaced apart from the inner surface of the head body 52. At this time, the thickness T1 of the first guide part 5232 may be formed thinner than the thickness T2 of the second guide part 5242. Accordingly, the gap G between the outer end of the first guide part 5232 and the outer surface of the inner wall 531 is formed so that the protrusion extension part 6256 (in FIG. 16) of the first guide protrusion 625 can be inserted.

On the other hand, the gap between the outer end of the second guide part 5242 and the outer surface of the inner wall 531 is narrower than the thickness of the protrusion extension part 6256, making insertion of the protrusion extension part 6256 impossible.

The radius R1 from the center C of the head 50 or the head inner 53 to the first guide part 5232 may be formed to be larger than the radius R2 to the second guide part 5242. Therefore, when the filter 60 is mounted, a gap G into which the protrusion extension part 6256 can be inserted may be provided between the outer end of the head inner 53 and the first guide part 5232. When the first guide protrusion 625 is attempted to be inserted into the second guide 524, the protrusion extension part 6256 gets caught on the second guide part 5242. Therefore, the first guide protrusion 625 cannot be inserted into the second guide 524.

In other words, only the first guide protrusion 625 and the second guide protrusion 626, which correspond to each other, can be inserted into the first guide 523 and the second guide 524, respectively. In addition, the water inlet part 663 and the water outlet part 664 can also be inserted into the inlet hole 5321 and the outlet hole 5323, which have corresponding cross-sectional shapes, respectively.

In addition, when the first guide protrusion 625 and second guide protrusion 626 are rotated and inserted so as to be positioned in the check window 5211 and the rear check window 5212, respectively, the mounting of the filter 60 is completed. In addition, the water inlet part 663 and the water outlet part 664 are inserted so as to pass through the inlet ring 541 and the outlet ring 542 which are positioned inside the inlet hole 5321 and the outlet hole 5323, thereby preventing water leakage between the head 50 and the filter 60.

Inside the head body 52, a flow path communicating with the water inlet pipe 103, the water outlet pipe 104, and the water inlet part 663 and the water outlet part 664 may be formed. In addition, a valve 56 for opening and closing the flow path communicating with the water inlet part 663 may be mounted inside the head body 52.

Below, the flow path structure inside the head body 52 will be examined with reference to the drawings.

Figure 9:
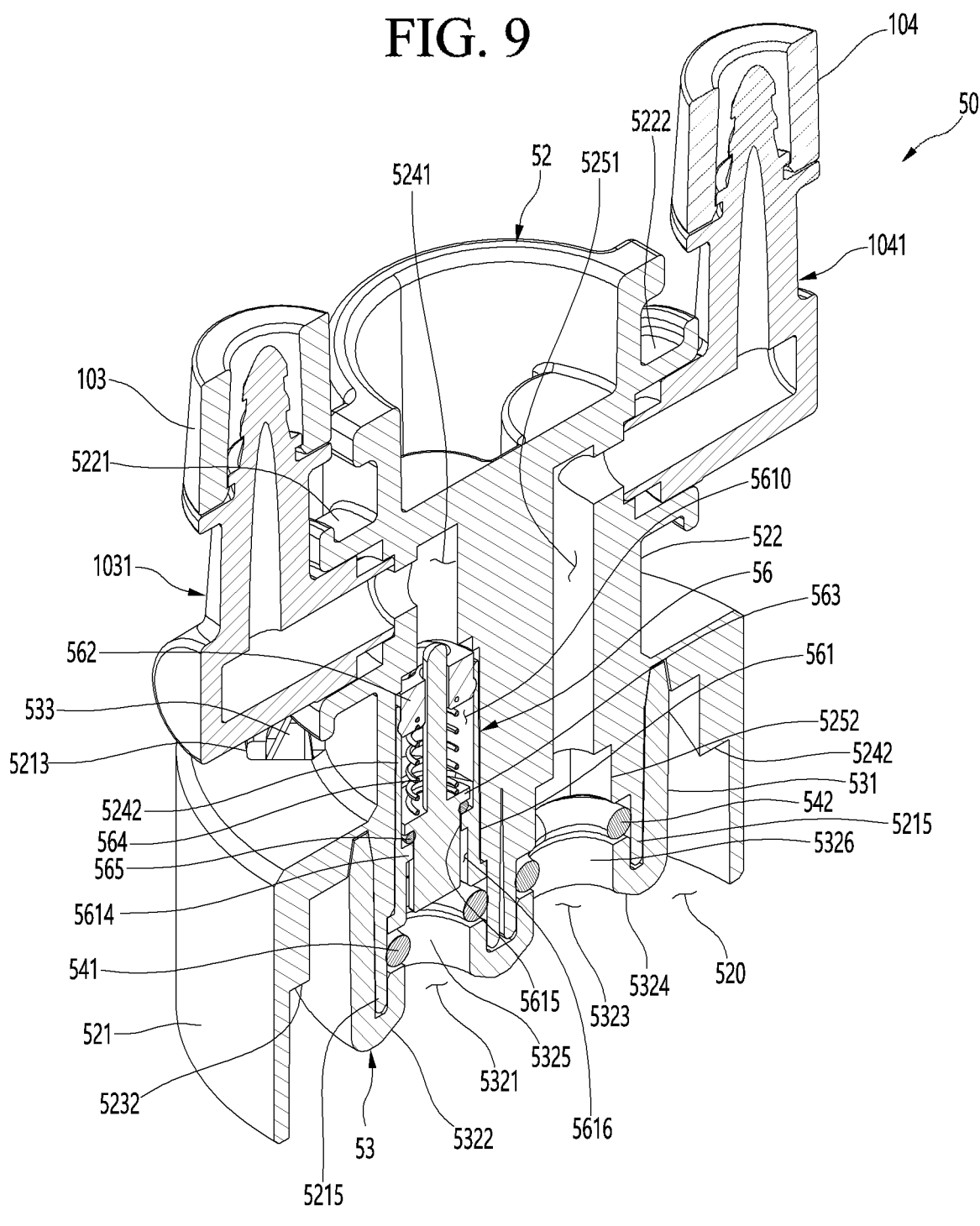
FIG. 9 is a cross-sectional view taken along line 9-9 of FIG. 4.
Figure 10:
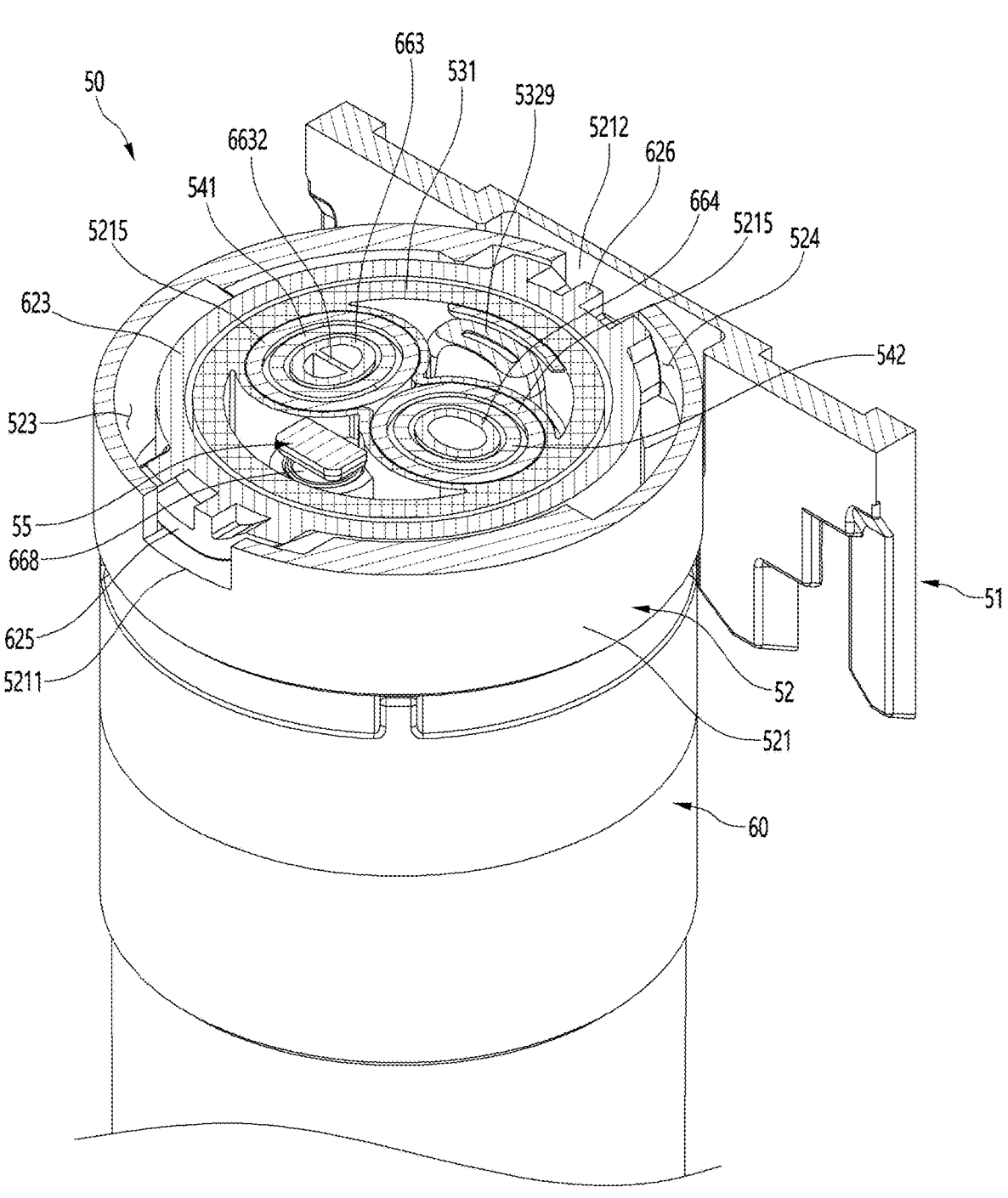
FIG. 10 is a perspective view taken along line 10-10 of FIG. 3.

FIG. 9 is a cross-sectional view taken along line 9-9 of FIG. 4, and FIG. 10 is a perspective view taken along line 10-10 of FIG. 3.

As illustrated, an inlet flow path 5241 communicating with the water inlet pipe connection part 5221 may be formed inside the head body 52, and an outlet flow path 5251 communicating with the water outlet pipe connection part 5222 may be formed.

In addition, inside the head body 52, a valve mounting part 5242 connected to the inlet flow path 5241 and equipped with a valve 56 may be formed. The valve 56 is for selectively supplying water supplied from the inlet flow path 5241 toward the filter 60, and may be opened and closed according to the mounting of the filter 60. The water inlet part 663 may be inserted toward the valve 56, and when the valve 56 is opened, the water inlet part 663 and the inlet flow path 5241 may communicate with each other.

In addition, an outlet accommodation part 5252 connected to the outlet flow path 5251 and into which the water outlet part 664 is inserted may be formed inside the head body 522. The cross-sectional shapes of the valve mounting part 5242 and the outlet accommodation part 5252 may be formed into an elliptical shape corresponding to the cross-sectional shapes of the water inlet part 663 and the water outlet part 664.

Meanwhile, when the head inner 53 is coupled to the head body 52, the body extension part 5215 of the head body 52 can be inserted between the inlet edge 5325 and the outlet edge 5326 and the inner wall 531. The body extension part

5215 is formed in a cylindrical shape with an open lower surface, and a pair of body extension parts 5215 can be formed on the left and right sides. In addition, the upper ends of the water inlet part 663 and the water outlet part 664 can be inserted into the inside of the body extension part 5215. In addition, the inlet ring 541 and the outlet ring 542 can be respectively provided inside the body extension part 5215.

The inlet ring 541 and outlet ring 542 are formed in a ring shape and can be formed in an elliptical shape corresponding to the inlet hole 5321 and the outlet hole 5323. In addition, the inlet ring 541 is restrained in the upper and lower direction by the upper end of the inlet edge 5325 and the lower end of the valve 56, and the outward flow can be restrained by the inner surface of the body extension part 5215.

When the water inlet part 663 and the water outlet part 664 are inserted, the inlet ring 541 and outlet ring 542 can maintain the mounting position, prevent the flow of the water inlet part 663 and the water outlet part 664, and maintain a sealed state.

In addition, the cross-sectional shape of the water inlet part 663 and the water outlet part 664 at least in the part of the total upper and lower height where the inlet ring 541 and outlet ring 542 are located is formed into an elliptical shape corresponding to the inlet ring 541 and outlet ring 542, so that seal ring can be guaranteed.

Meanwhile, the valve 56 may be provided above the inlet ring 541. Then, when the filter 60 is mounted on the head 50, the valve 56 may be opened by the water inlet part 663. Then, when the filter 60 is separated from the head 50, the valve 56 is closed to shield the inlet flow path 5241 and prevent water from being supplied toward the filter 60.

Below, the valve 56 will be described in more detail with reference to the drawings.

Figure 11:
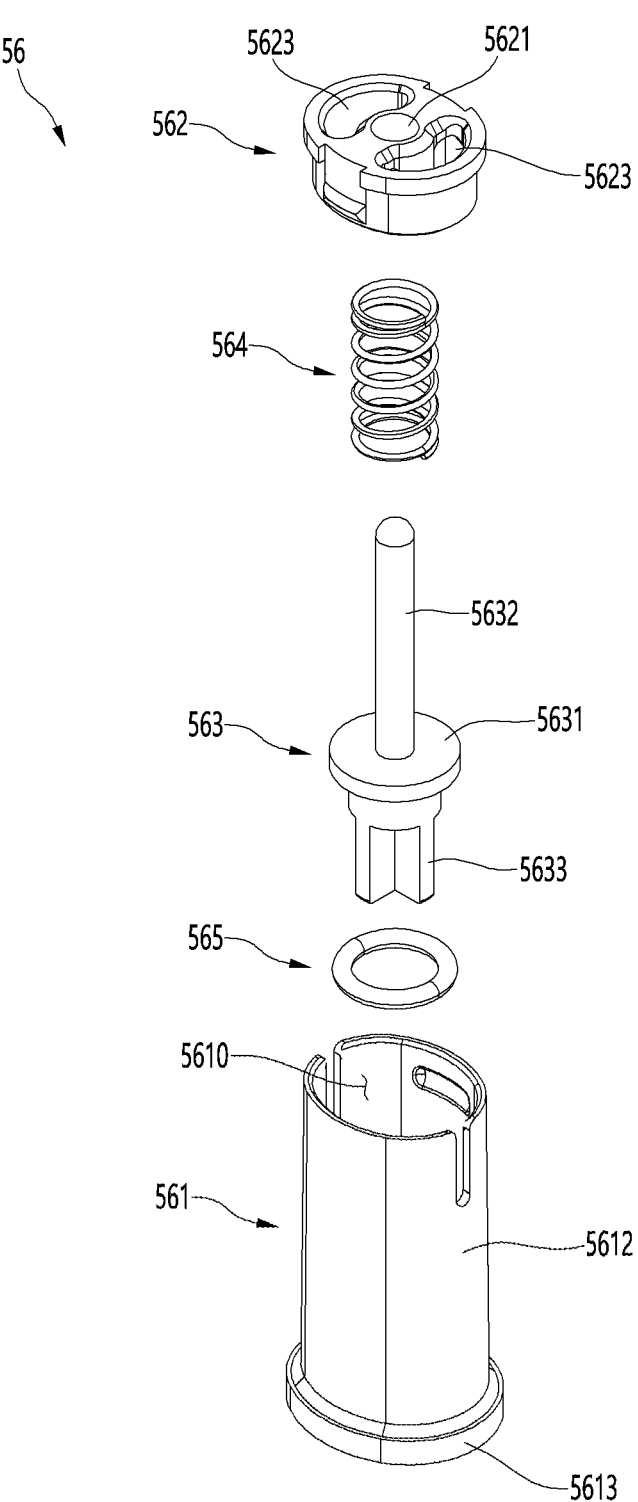
FIG. 11 is an exploded perspective view illustrating a valve, which is a component of the head.
Figure 12:
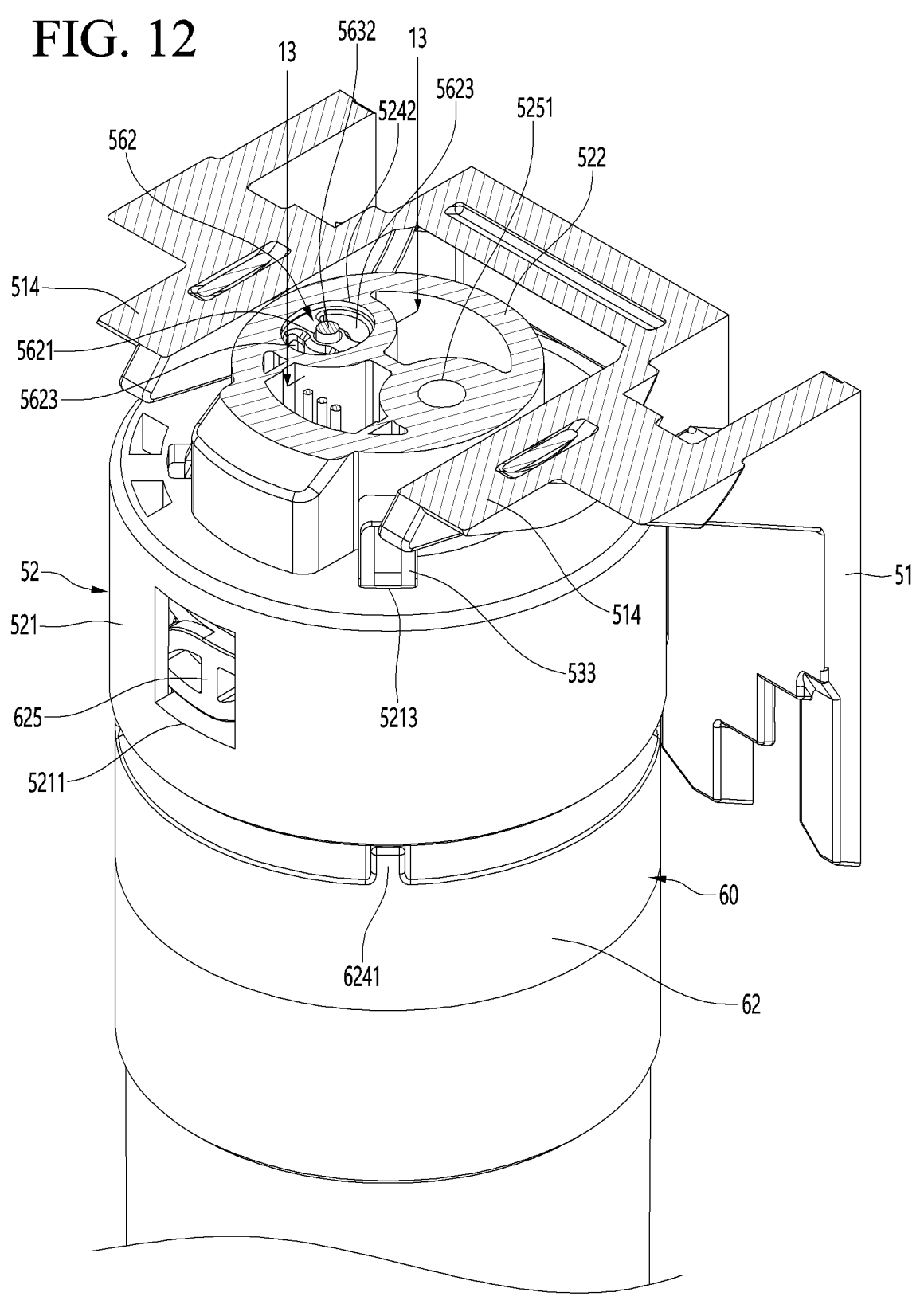
FIG. 12 is a perspective view taken along line 12-12 of FIG. 3.
Figure 13:
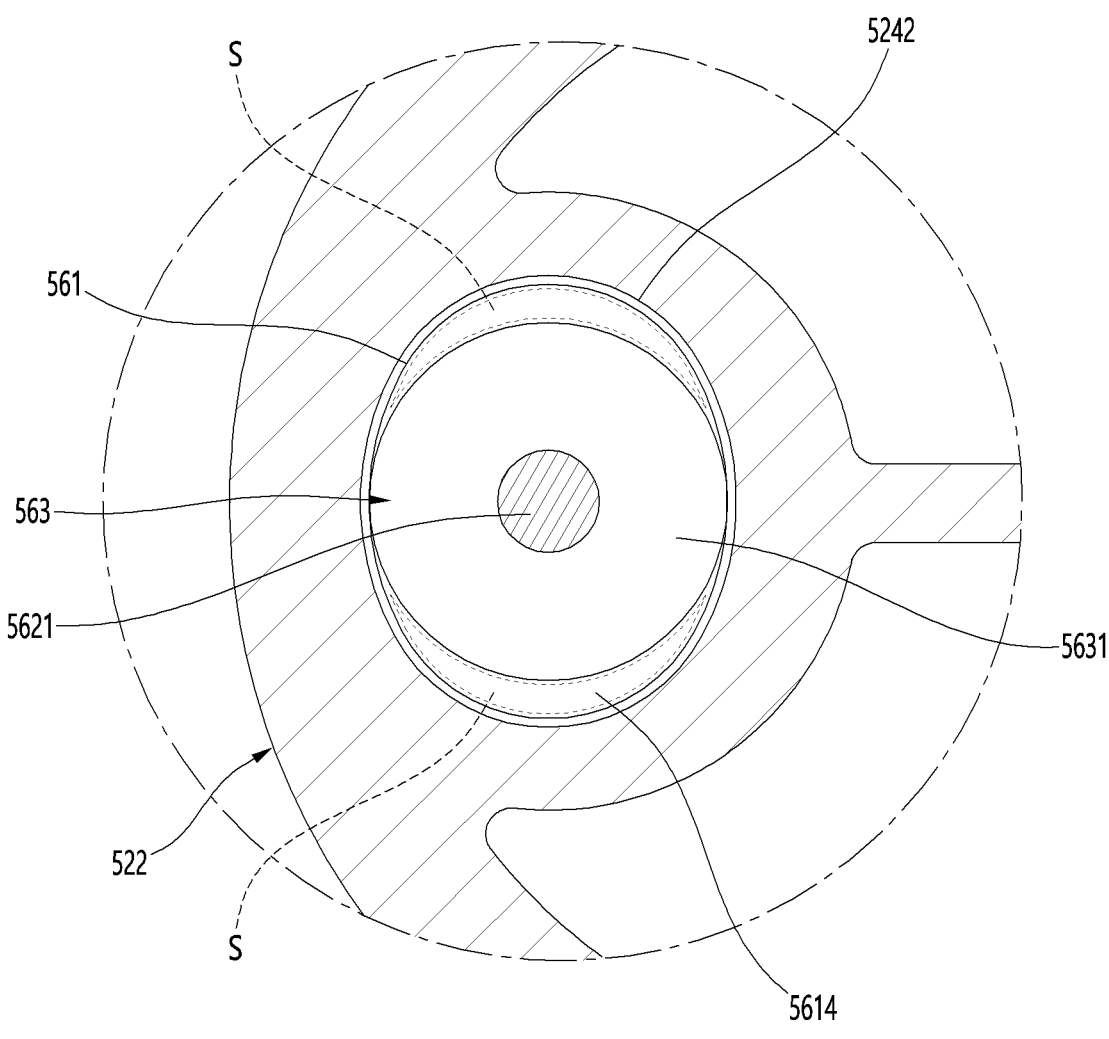
FIG. 13 is a cross-sectional view taken along line 13-13 of FIG. 12.

FIG. 11 is an exploded perspective view illustrating a valve, which is a component of the head, FIG. 12 is a perspective view taken along line 12-12 of FIG. 3, and FIG. 13 is a cross-sectional view taken along line 13-13 of FIG. 12.

As illustrated, the valve 56 may include a valve case 561, a piston 563, a spring 564, and a valve cap 562.

The valve case 561 is formed in a tubular shape with an open upper surface 5611 and a lower surface 5613, and may be formed in an elliptical shape whose cross-sectional shape corresponds to the valve mounting part 5242. The circumference of the lower surface 5613 of the valve case 561 protrudes outward and may be fixed to the valve mounting part 5242. In addition, the lower surface 5613 of the valve case 561 may be in contact with the inlet ring 541 from above to support the inlet ring 541.

In addition, the circumferential surface 5612 of the valve case 561 can be in contact with the valve mounting part 5242. Meanwhile, as illustrated in FIG. 9, a piston support part 5614 protruding inwardly may be formed inside the valve case 561. Based on the piston support part 5614, an inlet accommodation part 5616 into which the upper end of the water inlet part 663 is inserted may be formed below, and a piston accommodation part 5610 in which the piston 563 is accommodated may be formed above. In addition, a case passage 5615 may be formed inside the piston support part 5614. At this time, the inlet accommodation part 5616 and the piston accommodation part 5610 may have an elliptical cross-sectional shape, and the case passage 5615 may have a circular cross-sectional shape. In addition, the major axes of the inlet accommodation part 5616 and the piston accommodation part 5610 are formed larger than the diameter of the case passage 5615 to facilitate water flow when the flow path is opened by the movement of the piston 563.

The piston 563 is provided in the piston accommodation part 5610 and can move in the vertical direction to open and close the case passage 5615. In addition, a valve cap 562 can be provided on the upper surface 5611 of the valve case 561. In addition, a spring 564 is provided between the valve cap 562 and the piston 563 to elastically support the piston 563.

The piston 563 may include a seat part 5631 that shields the case passage 5615, a contact part 5633 that protrudes downward from the lower surface of the seat part 5631 and passes through the case passage 5615, and a rod 5632 that protrudes upward from the upper surface of the seat part 5631 and penetrates the valve cap 562.

The seat part 5631 is formed in a circular shape and can open and close the case passage 5615. At this time, the case passage 5615 is formed in a circular shape corresponding to the seat part 5631 and can be opened and closed by movement of the piston 563 in the vertical direction. In addition, the seat part 5631 can be formed in a circular shape having a diameter corresponding to the length of the minor axis of the cross-section of the elliptical valve case 561.

Accordingly, as illustrated in FIG. 13, a relatively wide flow path space S is provided between a part corresponding to the position of the major axis of the cross-section of the valve case 561 and the outer surface of the seat part 5631. Accordingly, when the case passage 5615 is opened by the upward movement of the piston 563, a larger amount of water can be supplied toward the water inlet part 663.

Meanwhile, the contact part 5633 protrudes downward through the case passage 5615 and can come into contact with the upper end of the water inlet part 663 when the filter 60 is mounted. For example, the contact part 5633 can be formed so that at least a part thereof intersects with the inlet contact part 6632 of the water inlet part 663. Accordingly, when the water inlet part 663 is inserted and comes into contact with the contact part 5633, the contact part 5633 can be prevented from being inserted into the water inlet part 663 and partially shielding the flow path. For example, the contact part 5633 can be formed in a cross-shaped or straight cross-sectional shape to secure a space for water flow.

In addition, a piston ring 565 may be provided on the upper end of the contact part 5633, that is, on the lower surface of the seat part 5631. The piston ring 565 may be in contact with the circumference of the case passage 5615 to seal the space between the case passage 5615 and the piston 563. The piston ring 565 may be formed in a circular ring shape corresponding to the case passage 5615 and the seat part 5631.

The rod 5632 extends upward from the center of the seat part 5631 and can be extended to pass through the rod hole 5621 of the valve cap 562. Therefore, when the piston 563 moves in the vertical direction, the piston 563 can in the vertical direction without being tilted or eccentric by the rod 5632.

In addition, the spring 564 may be disposed to be penetrated by the rod 5632. The upper and lower ends of the spring 564 may be supported by the valve cap 562 and the seat part 5631, respectively. In addition, by the elasticity of the spring 564, the seat part 5631 may maintain a state of shielding the case passage 5615. In addition, the seat part may be compressed when the piston 563 moves upward.

The valve cap 562 can shield the upper surface 5611 of the valve case 561. The valve cap 562 can be formed in an elliptical shape corresponding to the cross-section of the upper part of the valve case 561. In addition, a rod hole 5621 through which the rod 5632 passes can be formed in the center of the valve cap 562. In addition, a cap through-hole 5623 penetrating the valve cap 562 can be formed in the valve cap 562. The cap through-hole 5623 can be formed on both sides of the rod hole 5621 as a passage into which water flowing through the inlet flow path 5241 flows. Accordingly, the case passage 5615 is opened by the movement of the piston 563, and water supplied to the inlet flow path 5241 can pass through the cap through-hole 5623 and the case passage 5615 and then through the valve 56 to flow into the water inlet part 663.

Below, the filter 60 is described in detail with reference to the drawings.

Figure 14:
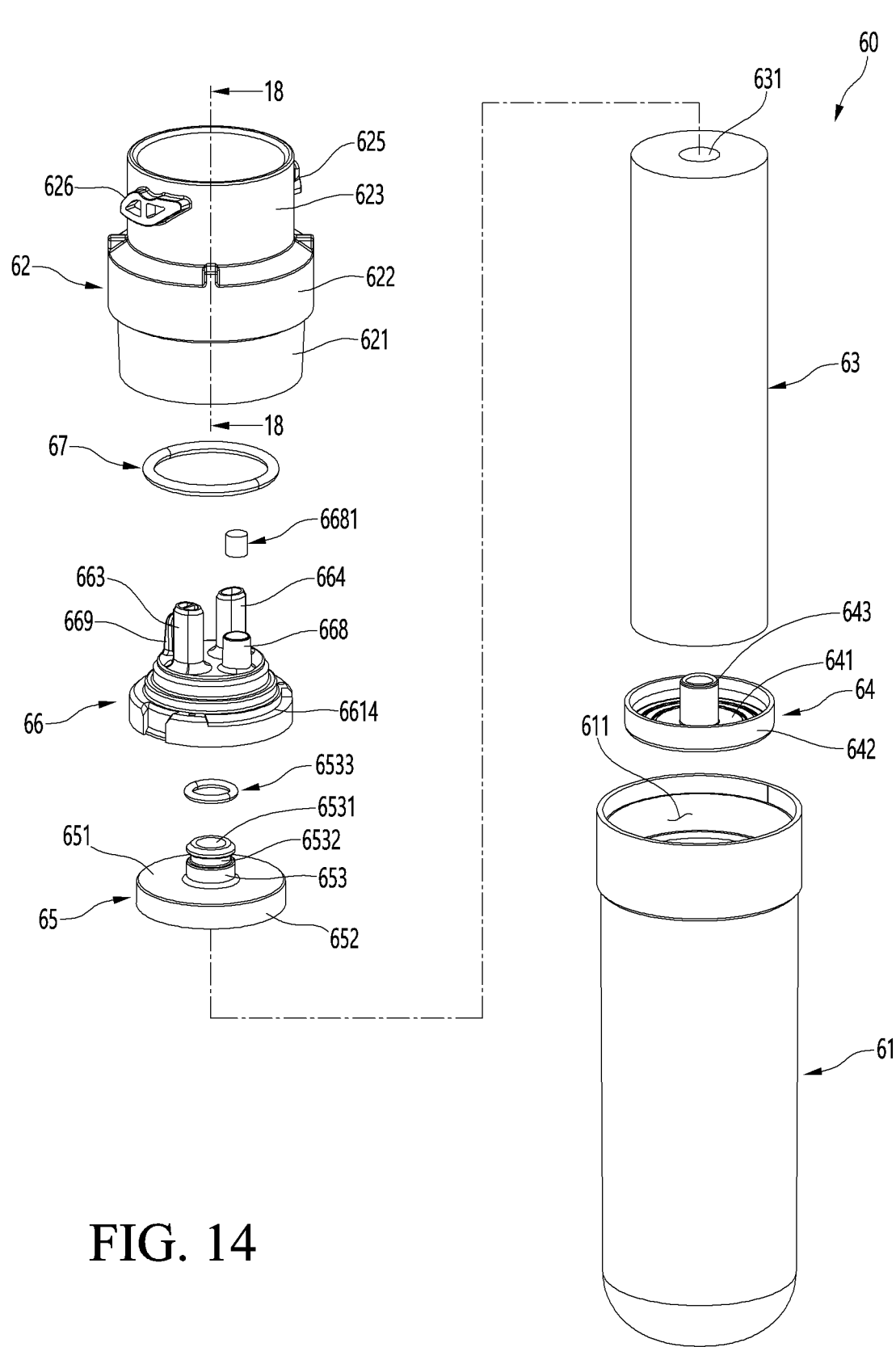
FIG. 14 is an exploded perspective view illustrating the filter.

FIG. 14 is an exploded perspective view illustrating the filter.

As illustrated, the filter 60 may include a housing 600 forming an outer appearance, a filter member 63 positioned inside the housing 600, and a filter cover 66 exposed through the upper surface of the housing 600.

The housing 600 may include an upper housing 62 forming the upper part of the housing 600 and a lower housing 61 forming the lower part of the housing 600. The upper housing 62 and the lower housing 61 may be coupled with each other to form a space in which the filter member 63 is accommodated.

The upper housing 62 and the lower housing 61 may be formed in a cylindrical shape while coupled to form the outer appearance of the filter 60. In addition, the upper housing 62 and the lower housing 61 may be formed of a plastic material and may be coupled with each other by ultrasonic welding or rotational welding.

The upper housing 62 may be configured to have open upper and lower surfaces, and a space 6200, 620 in which a filter cover 66 is rotatably positioned may be formed inside the upper housing 62.

For example, the upper housing 62 may include an upper part 623 inserted into the interior of the head body 52 and a lower part 622 exposed downward from the head body 52. In addition, a first guide protrusion 625 and a second guide protrusion 626 may be formed around the circumference of the upper part 623 so that the filter 60 may be detachably coupled to the head 50.

The upper housing 62 may further be formed with a housing coupling part 621 that extends further downward than the lower part 622. The housing coupling part 621 may be inserted into the inside of the lower housing 61 and may come into contact with the inner surface of the lower housing 61. In addition, a coupling groove 6221 into which the upper end of the lower housing 61 is inserted may further be formed between the lower end of the lower part 622 and the housing coupling part 621. The coupling groove 6221 and the upper end of the lower housing 61 may be fused and coupled to each other.

The upper surface of the lower housing 61 is open and can form an accommodation space 611 in which the filter member 63 is accommodated. The filter member 63 can be inserted through the open upper surface of the lower housing 61 and accommodated inside the accommodation space 611.

Meanwhile, the housing 600 can rotate relative to the filter cover 66. In other words, the filter cover 66 is maintained in an aligned state for coupling with the head 50, and the housing 600 can rotate to be fastened with the head 50.

In addition, the filter cover 66 is connected to the filter member 63 by the upper supporter 65. Therefore, the housing 600 can be seen to rotate relative to the filter cover 66 and the filter member 63 that are coupled with each other.

The filter member 63 may be formed in a cylindrical shape with a hollow 631 formed through the center. The filter member 63 may be formed of a porous material and configured to purify water passing through the filter member 63. For example, water outside the filter member 63 may pass through the filter member 63 and flow into the hollow 631, and may flow upward through the hollow 631 to supply purified water.

The filter member 63 can be composed of various materials and types, and can be appropriately selected and used according to the required water purification performance. For example, the filter member 63 can be composed of various types of filters such as a membrane filter, a pre-carbon filter, and a sediment filter.

A lower supporter 64 may be provided on the lower surface of the filter member 63. The lower supporter 64 supports the filter 60 from below and may be in contact with the lower surface of the lower housing 61.

The lower supporter 64 may include a supporter lower surface 641, a lower edge 642, and a lower boss 643. The supporter lower surface 641 may be in contact with the lower surface of the filter member 63 to support the filter member 63. In addition, the lower edge 642 may extend upward along the circumference of the supporter lower surface 641 to support the lower circumference of the filter member 63. In addition, the lower boss 643 may protrude upward from the supporter lower surface 641. In addition, the lower boss 643 may be inserted from the lower part of the hollow 631 to support the inner surface of the filter member 63.

The upper supporter 65 is disposed on the upper end of the filter member 63, and can fix the upper part of the filter member 63 and simultaneously guide purified water through the hollow 631 toward the filter cover 66. In addition, the upper supporter 65 can also connect the filter member 63 and the filter cover 66 to each other. Accordingly, the filter member 63 and the filter cover 66 can be coupled to each other by the upper supporter 65, and the housing 600 can be rotated relative to the filter member 63 and the filter cover 66.

The upper supporter 65 may include a supporter upper surface 651, an upper edge 652, a filter nipple 653, and an upper boss 654. The supporter upper surface 651 may be in contact with the upper surface of the filter member 63 to support the filter member 63. In addition, the upper edge 652 may extend downward along the circumference of the supporter upper surface 651 to support the upper circumference of the filter member 63.

In addition, a filter nipple 653 may protrude upwardly at the center of the upper surface 651 of the supporter. An exit 6531 communicating with the hollow 631 may be formed at the upper end of the filter nipple 653. In addition, a seal ring groove 5632 in which a nipple seal ring 6533 is mounted may be formed around the filter nipple 653. The filter nipple 653 may be configured to be inserted into a nipple accommodation part 665 of the filter cover 66.

In addition, the upper boss 654 may protrude downward from the upper surface 651 of the supporter. In addition, the upper boss 654 may be inserted from above the hollow 631 to support the inner surface of the filter member 63. The upper boss 654 may be communicated with the filter nipple 653. In other words, the filter nipple 653, the upper boss 654, and the hollow 631 are disposed on the same extension line and may be communicated with each other to form a flow path through which purified water from the filter member 63 passes.

The filter cover 66 is positioned inside the upper housing 62 and can divide the inside of the upper housing 62 into upper and lower parts. In addition, the filter cover 66 can be rotatably mounted on the upper housing 62. At this time, a seal ring 67 can be provided between the circumference of the filter cover 66 and the upper housing 62. Therefore, the filter cover 66 can prevent water leakage even when it is rotatably mounted on the upper housing 62.

The upper surface of the filter cover 66 may have the water inlet part 663 and water outlet part 664 protruding upward. In addition, the water inlet part 663 and water outlet part 664 may be exposed through the opened upper surface of the upper housing 62. In addition, when the filter 60 is mounted on the head 50, the water inlet part 663 and water outlet part 664 may be inserted into the inlet hole 5321 and outlet hole 5323.

On the upper surface of the filter cover 66, a rotation protrusion 669 inserted into the rotation groove 5329 may protrude upward. In addition, a sensing member 668 may protrude upward on the upper surface of the filter cover 66. In addition, a magnet 6681 may be mounted inside the sensing member 668. The rotation protrusion 669 and the sensing member 668 may be disposed in a direction intersecting with the disposition direction of the water inlet part 663 and the water outlet part 664.

Meanwhile, the sensing member 668 is inserted into the sensing hole 5237, and the outer surface of the sensing member 668 can be in contact with the inner surface of the sensing hole 5237. In addition, even when the rotation protrusion 669 is omitted, the sensing member 668 can be inserted into the sensing hole 5237 so that the head inner 53 and the filter cover 66 can be firmly fixed to each other. Accordingly, even if the housing 600 is rotated, the filter cover 66 can be maintained in a fixed state by the sensing member 668, and movement of the water inlet part 663 and the water outlet part 664 can be prevented.

Below, the upper structure of the filter 60 will be described in detail with reference to the drawings.

Figure 15:
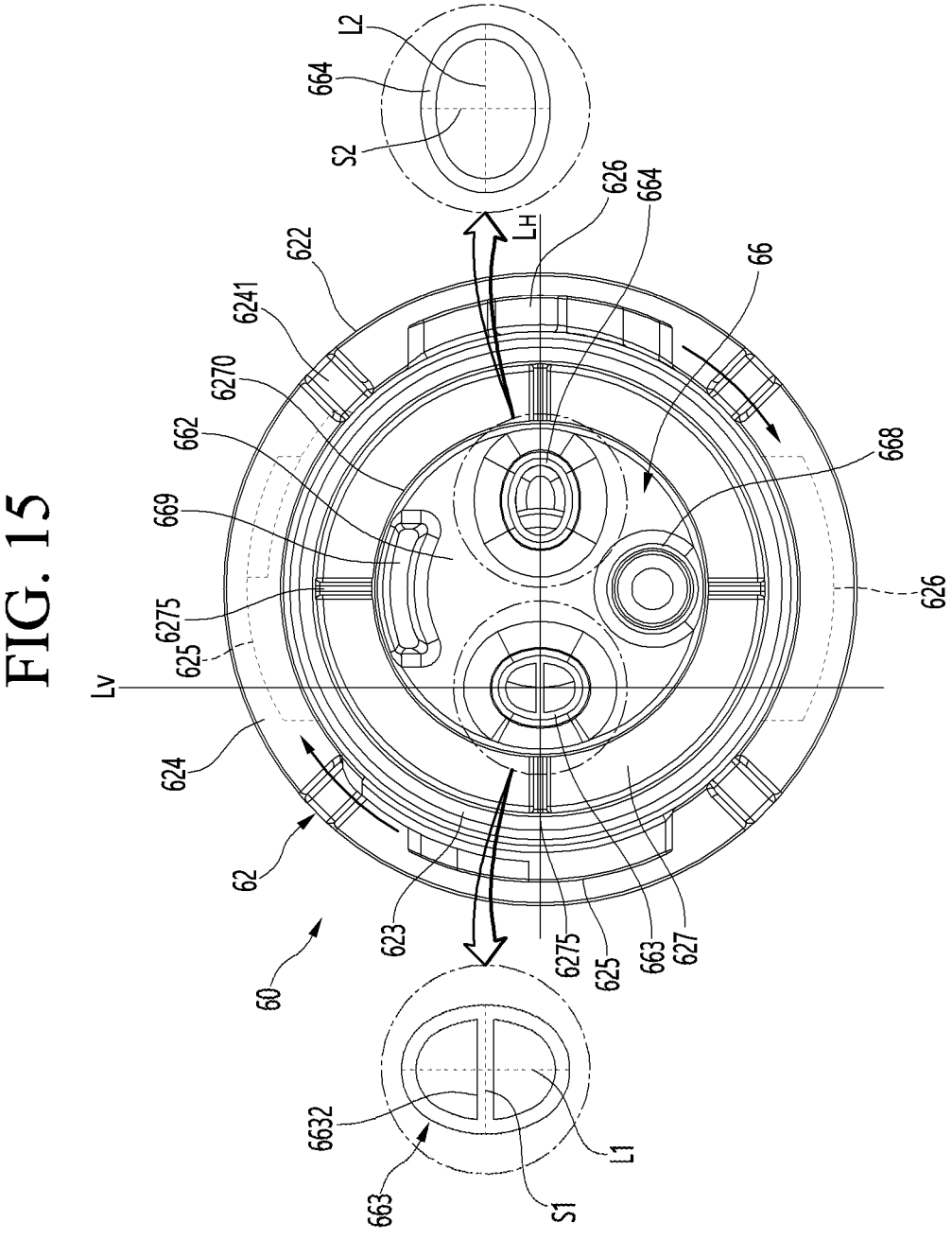
FIG. 15 is a plan view illustrating the filter.
Figure 16:
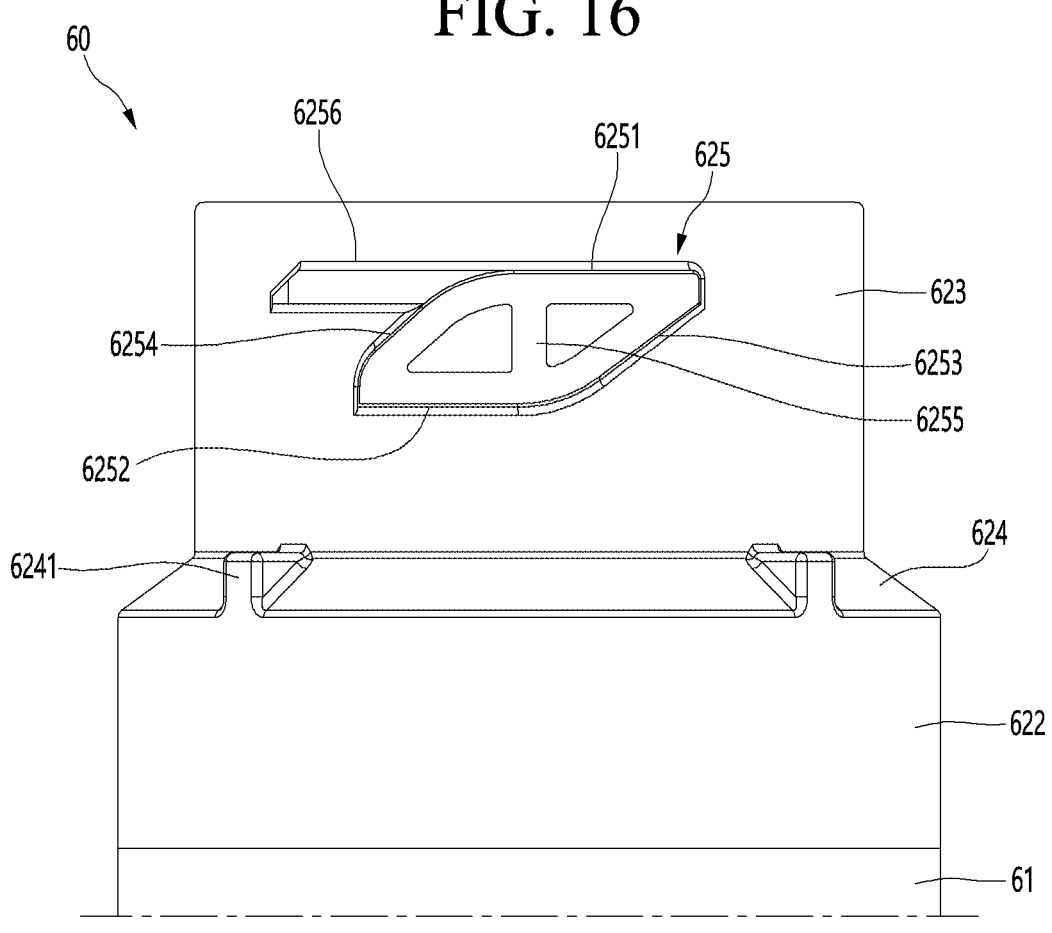
FIG. 16 is a side view illustrating the upper part of the filter as seen from one side.
Figure 17:
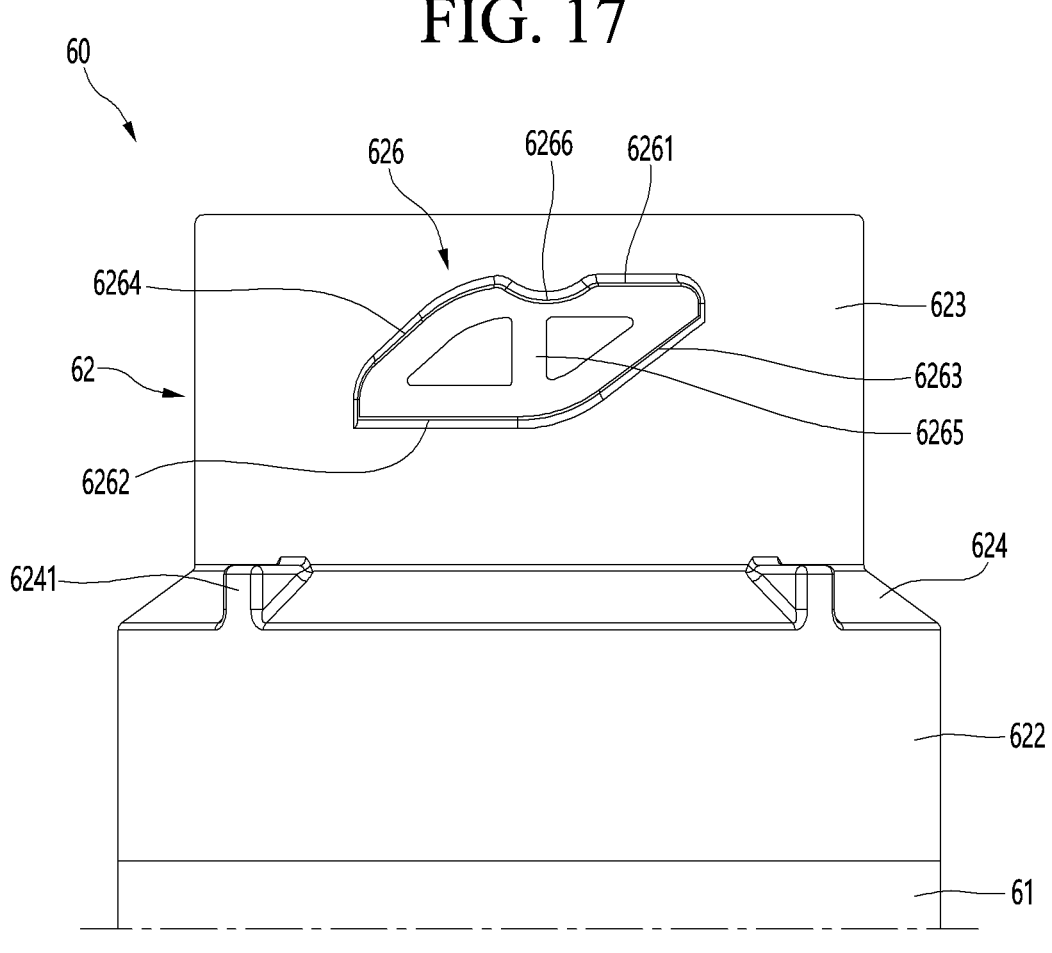
FIG. 17 is a side view illustrating the upper part of the filter as seen from the other side.
Figure 18:
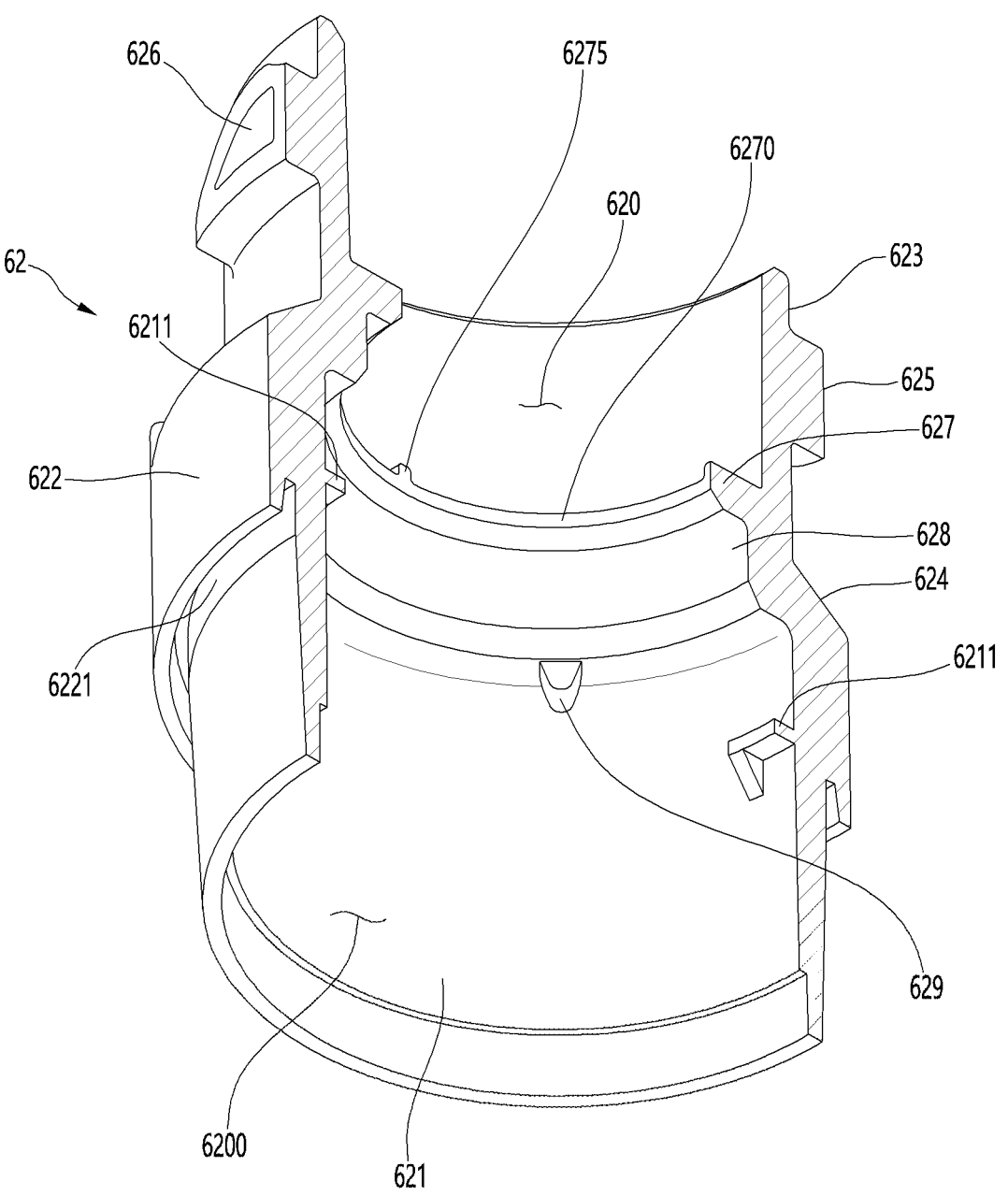
FIG. 18 is a perspective view taken along line 18-18 of FIG. 14.

FIG. 15 is a plan view illustrating the filter, FIG. 16 is a side view illustrating the upper part of the filter as seen from one side, FIG. 17 is a side view illustrating the upper part of the filter as seen from the other side, and FIG. 18 is a perspective view taken along line 18-18 of FIG. 14.

As illustrated, the upper housing 62 may include an upper part 623 and a lower part 622. The upper part 623 may have a smaller diameter than the lower part 622. In addition, a lower end of the upper part 623 and an upper end of the lower part 622 may be formed with a connecting surface 624 having a downward slope. In addition, a housing rib 6241 protruding upward may be formed on the connecting surface 624.

The housing rib 6241 can be adjacent to the lower end of the head body 52 when the filter 60 is mounted. Therefore, it is possible to visually check that the filter 60 is completely fastened through the gap between the housing rib 6241 and the head body 52.

In addition, the housing rib 6241 may also serve as a guide for disposing a jig during rotational fusion of the upper housing 62 and the lower housing 61. A plurality of the housing ribs 6241 may be formed along the connecting surface 624. In addition, the housing ribs 6241 may be disposed symmetrically with respect to the center of the upper housing 62.

The first guide protrusion 625 and the second guide protrusion 626 may be formed to protrude on the outer surface of the upper part 623. The first guide protrusion 625 and the second guide protrusion 626 may be formed at positions facing each other with respect to the center of the housing 600. In addition, the first guide protrusion 625 may be formed in a shape that can be inserted into the first guide 523, and the second guide protrusion 626 may be formed in a shape that can be inserted into the second guide 524. In addition, the first guide protrusion 625 and the second guide protrusion 626 may be formed in different shapes to prevent incorrect mounting of the filter 60 and induce accurate mounting thereof.

In particular, the first guide protrusion 625 makes contact with the first guide 523 and the second guide 524 before the water inlet part 663 and the water outlet part 664 are inserted into the head inner. Therefore, the first guide protrusion 625 prevents the water inlet part 663 and the water outlet part 664 from coming into contact with the head inner when incorrectly mounted by the first guide 523, thereby fundamentally preventing deformation and damage of the water inlet part 663 and the water outlet part 664 due to incorrect mounting.

For example, the first guide protrusion 625 may be formed on the left side with respect to the center of the filter 60. In addition, the first guide protrusion 625 may be positioned on the side of the water inlet part 663.

The first guide protrusion 625 may include a first upper part 6251 and a first lower part 6252 forming upper and lower surfaces, a first front inclined part 6253 connecting the front ends of the first upper part 6251 and the first lower part 6252, and a first rear inclined part 6254 connecting the rear ends of the first upper part 6251 and the first lower part 6252. The first upper part 6251, the first lower part 6252, the first front inclined part 6253, and the first rear inclined part 6254 may protrude from the outer surface of the upper housing 62 with the same thickness. In particular, the first front inclined part 6253 can be protruded to move into contact with the first guide part 5232, and rotation and upward movement of the filter 60 can be facilitated.

The length of the first upper part 6251 and the first lower part 6252 may be formed to correspond to the size of the first guide hole 5231 so that the first guide protrusion 625 may be inserted into the first guide hole 5231 by upward movement of the filter 60. In addition, the first upper part 6251 and the first lower part 6252 may extend parallel to the upper end of the upper housing 62. In addition, the disposition height of the first guide protrusion 625 may be positioned at the upper part of the upper part 623. In addition, a connecting rib 6255 that vertically connects the first upper part 6251 and the first lower part 6252 may be further formed.

The first front inclined part 6253 and the first rear inclined part 6254 can be formed in a shape corresponding to the inclination of the first guide part 5232. Accordingly, the first front inclined part 6253 or the first rear inclined part 6254 can move along the first guide part 5232.

Meanwhile, a rearwardly extending protrusion extension part 6256 may be formed at the rear end of the first upper part 6251. The protrusion extension part 6256 may protrude rearwardly along the same extension line as the first upper part 6251 and may protrude along the outer surface of the upper part 623. In addition, the protrusion thickness of the protrusion extension part 6256 may be formed smaller than the protrusion thickness of the first upper part 6251. In addition, the protrusion thickness of the protrusion extension part 6256 may be formed smaller than the gap G between the head inner 53 and the first guide part 5232. Accordingly, when the first guide protrusion 625 is inserted into the first guide hole 5231, the protrusion extension part 6256 is inserted between the first guide part 5232 and the outer surface of the head inner 53, thereby enabling insertion and rotational movement of the first guide protrusion 625.

The second guide protrusion 626 may include a second upper part 6261 and a second lower part 6262 forming upper and lower surfaces, a second front inclined part 6263 connecting the front ends of the second upper part 6261 and the second lower part 6262, and a second rear inclined part 6264 connecting the rear ends of the second upper part 6261 and the second lower part 6262. The second upper part 6261, the second lower part 6262, the second front inclined part 6263, and the second rear inclined part 6264 may protrude from the outer surface of the upper part 623 with the same thickness. In particular, the second front inclined part 6263 may protrude so as to move into contact with the second guide part 5242. In addition, the protrusion thickness of the second guide protrusion 626 may be the same as the protrusion thickness of the first guide 523.

The length of the second upper part 6261 and the second lower part 6262 may be formed to correspond to the size of the second guide hole 5241 so that the second guide protrusion 626 may be inserted into the second guide hole 5241 by upward movement of the filter 60. In addition, the second upper part 6261 and the second lower part 6262 may extend parallel to the upper end of the upper housing 62. In addition, the disposition height of the second guide protrusion 626 may be the same as the disposition height of the first guide protrusion 625. In addition, a connecting rib 6265 may be further formed to vertically connect the second upper part 6261 and the second lower part 6262.

The second front inclined part 6263 and the second rear inclined part 6264 may be formed in a shape corresponding to the inclination of the second guide part 5242. Accordingly, the second front inclined part 6263 or the second rear inclined part 6264 may move while in contact with the second guide part 5242, and the rotation and upward movement of the filter 60 may be facilitated.

In addition, a downwardly recessed restraint groove 6266 may be formed in the second upper part 6261. The restraint groove 6266 may be inserted into the restraint part 5213 to restrain the filter 60 when the second guide protrusion 626 is moved to the rear check window 5212.

Meanwhile, a protrusion part may be formed inside the upper housing 62. The protrusion part may include a first protrusion part 627. In addition, the protrusion part may further include a second protrusion part 628. The first protrusion part 627 may divide the interior of the upper housing 62 into an upper space 620 in which the upper surface of the filter cover 66 is exposed, and a lower space 6200 in which the lower end of the filter cover 66 is rotatably accommodated.

The first protrusion part 627 may be formed on the upper part 623. The first protrusion part 627 may protrude toward the center of the upper housing 62 and form an upper opening 6270 through which the filter cover 66 passes. The first protrusion part 627 may support the circumference of the filter cover 66 so that the filter cover 66 is not separated upward even when the pressure inside the filter 60 increases.

In addition, a second protrusion part 628 may be formed below the first protrusion part 627. The second protrusion part 628 may be formed at the upper end of the lower part 622. In addition, the second protrusion part 628 may be formed continuously in a stepwise manner from the lower end of the first protrusion part 627. The second protrusion part 628 may protrude from the inner surface of the upper housing 62 toward the center of the upper housing 62 and may protrude lower than the first protrusion part 627. Therefore, the inner surface of the upper housing 62, the second protrusion part 628, and the first protrusion part 627 may be formed in a stepwise manner in sequence. The seal ring 67 can be disposed by the stepped shape of the first protrusion part 627 and the second protrusion part 628, and the filter cover 66 can be rotatably disposed inside the upper housing 62.

Meanwhile, a restriction protrusion 629 may be formed on the lower surface of the second protrusion part 628. The restriction protrusion 629 may protrude downward at a position corresponding to a restriction groove 6614 formed in the filter cover 66. Then, when the filter cover 66 is mounted on the inside of the upper housing 62, the restriction protrusion 629 may be inserted into the restriction groove 6614. Then, when the upper housing 62 rotates, the restriction protrusion 629 moves along the restriction groove 6614. Then, the restriction protrusion 629 may come into contact with one end of the restriction groove 6614 when the housing 600 is aligned before the filter 60 is mounted on the head 50. In addition, the limit protrusion 629 can come into contact with the other end of the restriction groove 6614 when the housing 600 is rotated and the filter 60 is coupled to the head 50.

A supporting protrusion 6211 may be formed below the second protrusion part 628. The supporting protrusion 6211 may be configured to support the filter cover 66 from below when the filter cover 66 is mounted inside the upper housing 62.

The support protrusion 6211 protrudes from the inner surface of the upper housing 62 and may be formed at a position corresponding to the position of the lower end of the filter cover 66. A plurality of support protrusions 6211 may be formed at the same height. For example, a pair of support protrusions 6211 may be formed at a position facing each other. In addition, the pair of the support protrusions 6211 may be formed with different sizes to prevent incorrect assembly when coupled with the filter cover.

Meanwhile, with the filter cover 66 mounted on the upper housing 62, the water inlet part 663 and water outlet part 664 can be aligned directionally within the upper housing 62. Then, the user can easily check the alignment status of the water inlet part 663 and water outlet part 664 with the naked eye.

In detail, as illustrated in FIG. 15, the marker 6275 may be formed on the upper surface 6271 of the first protrusion part 627 of the filter 60. The markers 6275 may be formed on the upper, lower, left, and right sides in directions intersecting each other. The marker 6275 may be protruded or recessed into the upper surface 6271 of the first protrusion part 627 and may extend toward the center of the upper housing 62.

The marker 6275 may be protruded from the upper surface of the first protrusion part 627 and may extend toward the water inlet part 663 and the water outlet part 664. Accordingly, the marker 6275 may visualize the alignment state with the water inlet part 663 and the water outlet part 664. In addition, the marker may be protruded from the first protrusion part 627 to reinforce the strength of the first protrusion part 627, and may support the head inner 53 from below to prevent the head inner 53 from being separated due to water pressure.

For example, the water inlet part 663 and water outlet part 664 formed on the filter cover 66 may be disposed on the extension lines of the markers 6275 disposed on the left and right sides. In addition, the rotation protrusion 669 and the sensing member 668 formed on the filter cover 66 may be disposed on the extension lines of the markers 6275 disposed on the front and rear sides. In other words, when the upper surface of the filter 60 is viewed from above, the marker 6275 may be aligned on the same extension line as the water inlet part 663, water outlet part 664, and the rotation protrusion 669 and sensing member 668. Therefore, the user can visually check the alignment state of the filter cover 66.

In addition, the housing 600 can be rotated at a 90° angle when the filter 60 is mounted. Since the four markers 6275 are disposed at a 90° angle, the alignment state of the water inlet part 663, water outlet part 664, rotation protrusion 669, and sensing member 668 can be visualized as the housing 600 rotates.

Meanwhile, before the filter 60 is mounted on the head 50, the water inlet part 663 and the water outlet part 664 can be disposed between the first guide protrusion 625 and the second guide protrusion 626. In other words, the first guide protrusion 625 and the second guide protrusion 626 and the water inlet part 663 and the water outlet part 664 can be disposed on the same extension line in the left and right direction. In particular, the markers 6275 on both left and right sides, the first guide protrusion 625 and the second guide protrusion 626, the water inlet part 663 and the water outlet part 664 can all be positioned on the same extension line, and the user can easily check the alignment state of the filter cover 66.

In this state, while the filter 60 is mounted on the head 50, the housing 600 rotates, and the filter cover 66 remains a state of being fixed. Then, the first guide protrusion 625 and the second guide protrusion 626 can be rotated 90° clockwise. At this time, the rotation protrusion 669 and the sensing member 668 can be positioned between the first guide protrusion 625 and the second guide protrusion 626. In other words, the first guide protrusion 625 and the second guide protrusion 626, the front and rear markers 6275, and the rotation protrusion 669 and the sensing member 668 can all be disposed on the same extension line in the front and rear direction.

Meanwhile, the water inlet part 663 and water outlet part 664 may be formed in an elliptical shape when viewed from above. In addition, the water inlet part 663 and water outlet part 664 may be disposed in different directions when viewed from above. Therefore, when the filter 60 is mounted on the head 50, the water inlet part 663 and water outlet part 664 may be coupled to the inlet hole 5321 and outlet hole 5323 with directionality. In other words, due to the directionality of the cross-sectional shapes of the water inlet part 663 and water outlet part 664, the filter 60 can be prevented from being mounted incorrectly and its accurate mounting can be ensured.

For example, the water inlet part 663 and water outlet part 664 may be disposed so that the major axes of their respective elliptical cross sections face in a direction that intersects each other. In other words, the water inlet part 663 may be disposed so that the major axis L1 faces the front and rear direction and the minor axis S1 faces the left and right direction. In addition, the major axis L1 of the water inlet part 663 may be positioned on the same line as a vertical extension line Lv that is disposed parallel to the marker 6275 that is disposed vertically based on the center of the filter cover.

The water outlet part 664 can be disposed so that the major axis L2 faces the left and right direction and the minor axis S2 faces the front and rear direction. In other words, the extension lines of the major axis of the cross section of the water inlet part 663 and the major axis L2 of the cross section of the water outlet part 664 can intersect each other perpendicularly. In addition, the major axis L2 of the water outlet part 664 can be positioned on the same line as the horizontal extension line LH that is disposed on the same line as the marker 6275 that is disposed in the left and right direction based on the center of the filter cover.

In this way, the water inlet part 663 and the water outlet part 664 have a structure in which the cross-section is formed in an elliptical shape and the major axes L1, L2 of the cross-section extend in a direction intersecting each other, so that the filter cover 66 does not rotate despite the torque generated when the housing 600 rotates.

The elliptical cross-section of the water inlet part 663 and water outlet part 664 may be an elliptical shape having continuous rounds with a major axis and a minor axis, rather than a circle. In the present disclosure, the ellipse may be defined as including a structure in which the elliptical shape of the cross-section of the water inlet part 663 and water outlet part 664 has a section that is cut off, a section that is recessed or protruded, or a section that is not a round but a straight section within the entire circumference. In other words, the water inlet part 663 and water outlet part 664 may have various cross-sectional shapes in which the major axis and the minor axis intersect each other and may have directionality.

Meanwhile, the rotation protrusion 669 and the rotation groove 5329 are coupled to each other so that torque for rotating the housing 600 can be generated while the filter cover 66 is fixed. Therefore, the rotation protrusion 669 and the rotation groove 5329 can minimize the movement of the water inlet part 663 and the water outlet part 664 when the housing 600 rotates. In addition, by coupling the sensing member 668 and the sensing groove 5327, the filter cover 66 can be maintained in a more firmly fixed state to the head inner 53, and stable coupling of the water inlet part 663 and the water outlet part 664 can be guaranteed.

Below, the filter cover 66 will be described in more detail with reference to the drawings.

Figure 19:
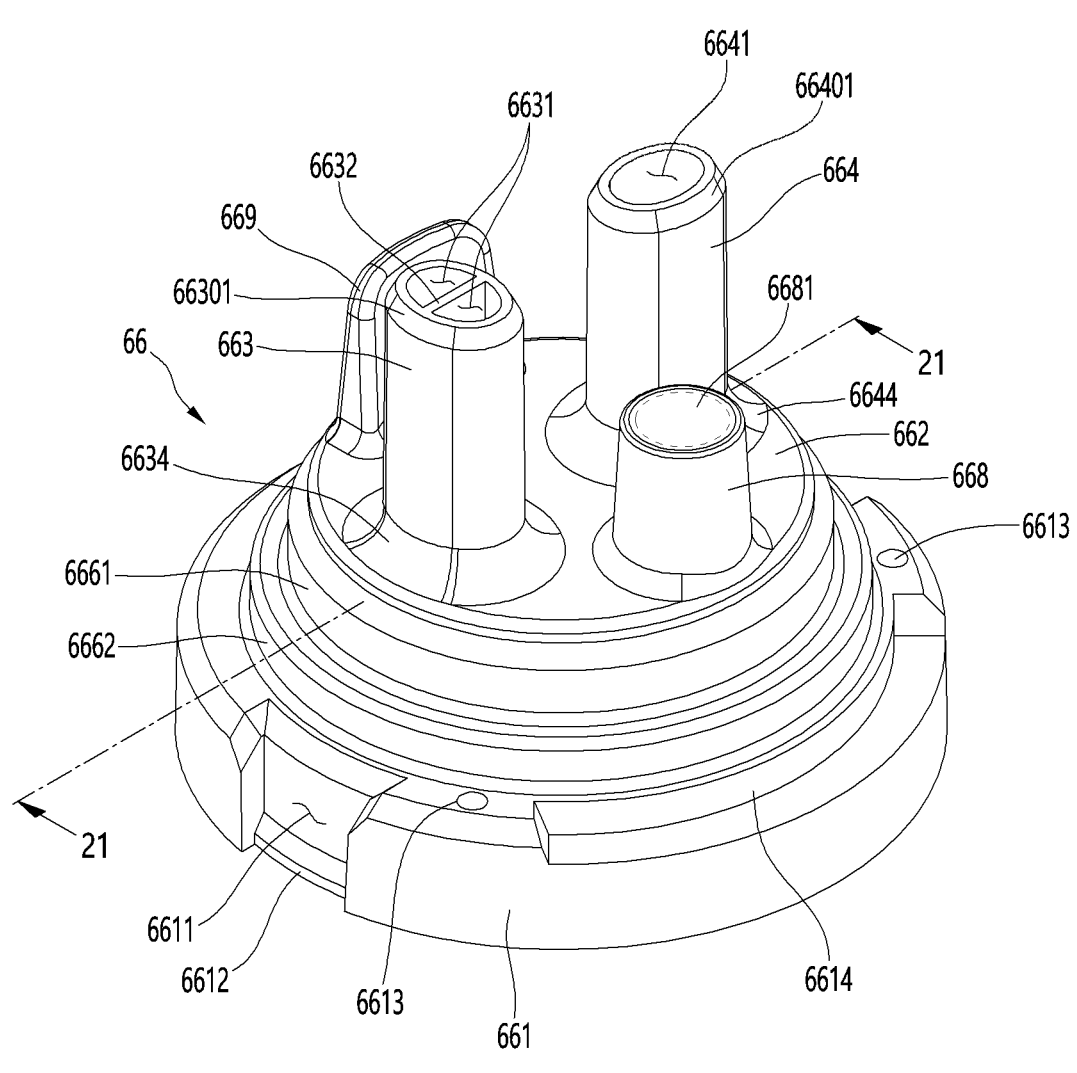
FIG. 19 is a perspective view illustrating the filter cover of the filter.
Figure 20:
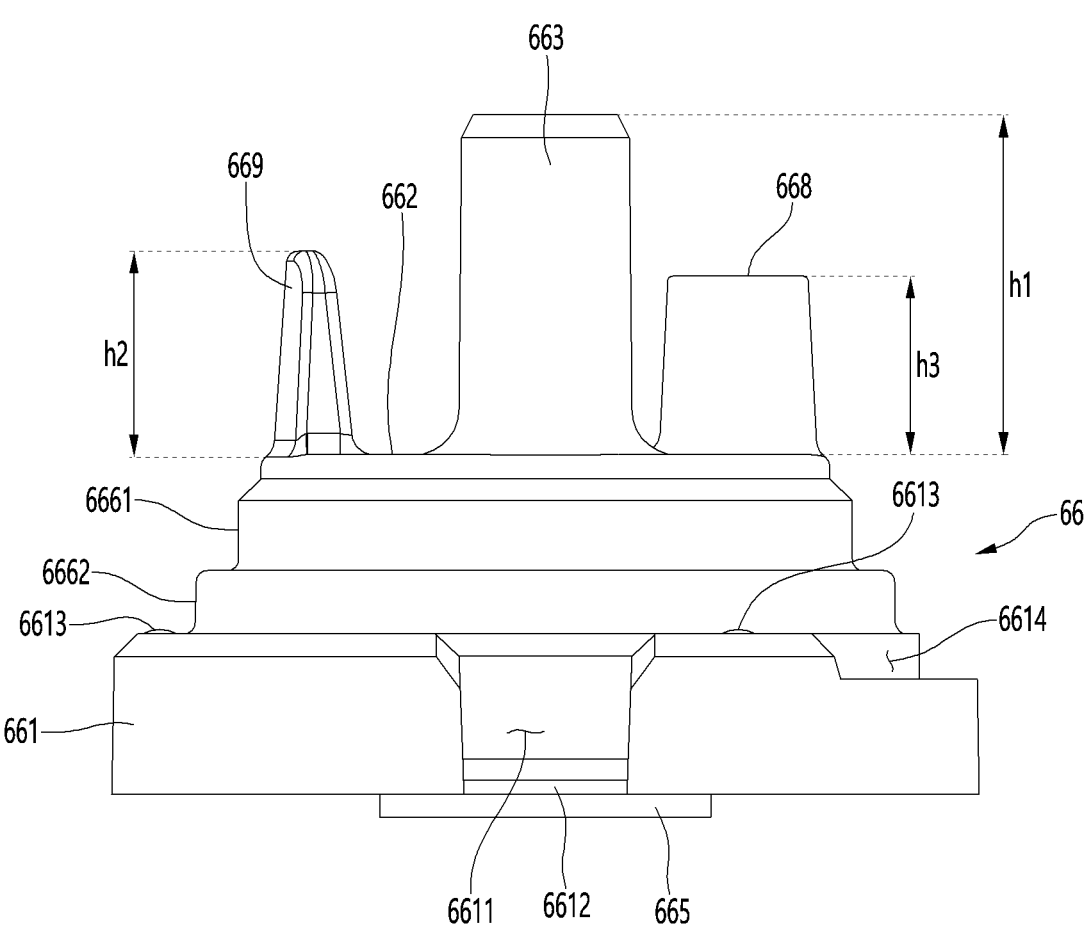
FIG. 20 is a side view illustrating the filter cover.
Figure 21:
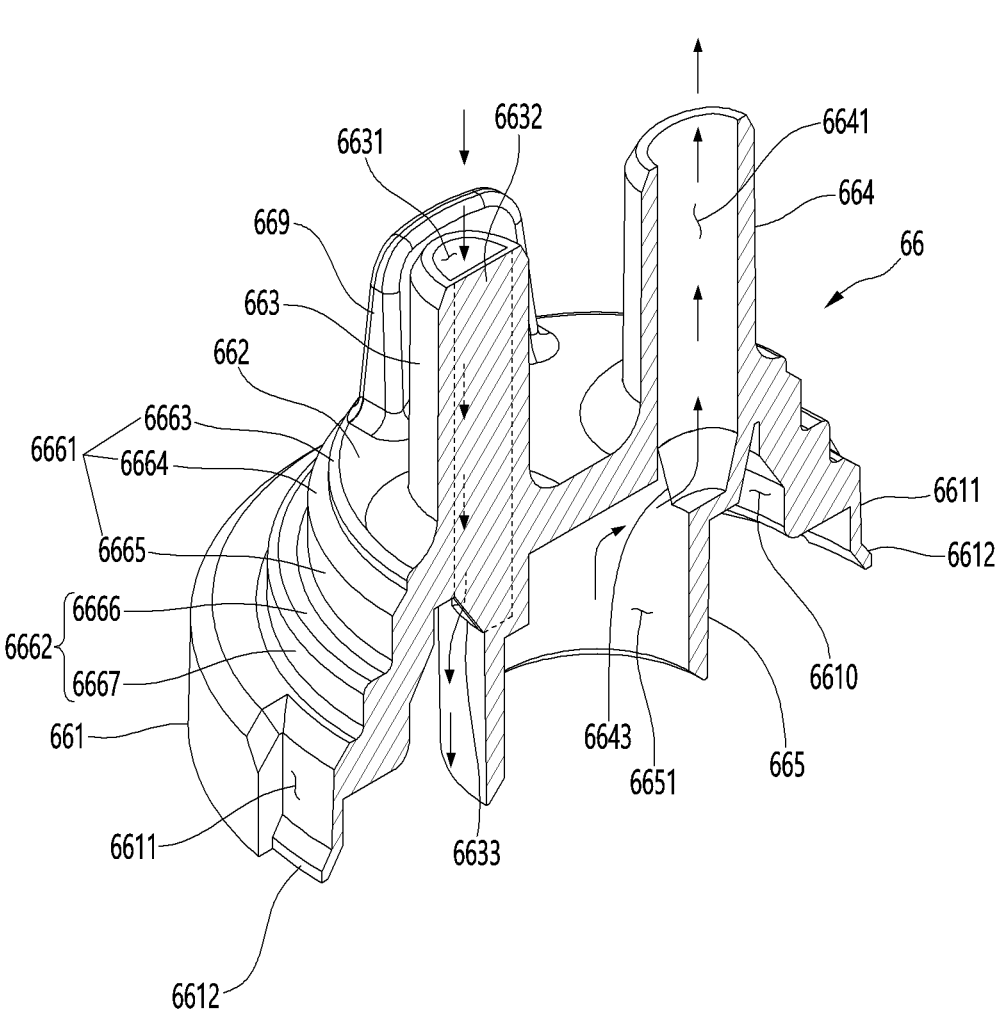
FIG. 21 is a perspective view taken along line 21-21 of FIG. 19.
Figure 22:
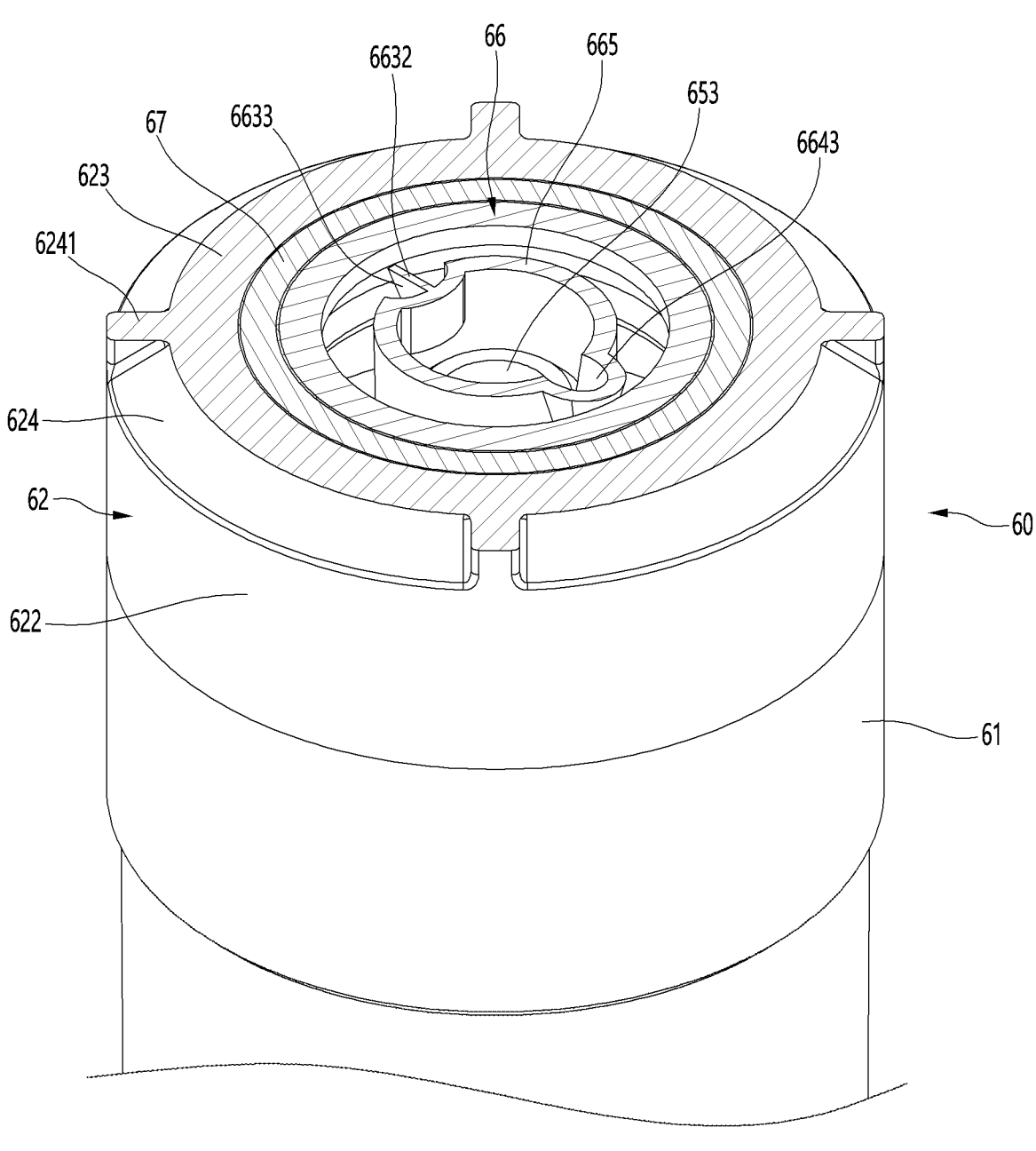
FIG. 22 is a perspective view taken along line 22-22 of FIG. 4.

FIG. 19 is a perspective view illustrating the filter cover of the filter, FIG. 20 is a side view illustrating the filter cover, FIG. 21 is a perspective view taken along line 21-21 of FIG. 19, and FIG. 22 is a perspective view taken along line 22-22 of FIG. 4.

As illustrated, the filter cover 66 may be formed with an open lower surface and a circular shape when viewed from above. An inner edge 661 may be formed at the lower end of the filter cover 66. The inner edge 661 may be in contact with the inner surface of the upper housing 62.

In addition, an edge groove 6611 and an edge hook 6612 may be formed on the inner edge 661. The edge groove 6611 may extend from the lower end to the upper end of the inner edge 661. In addition, the edge groove 6611 may be formed at a position corresponding to the support protrusion 6211, and may be formed so that the support protrusion 6211 of the upper housing passes through it.

The edge hook 6612 may be formed at the lower end of the edge groove 6611. The edge hook 6612 may be formed to be inclined so that the support protrusion 6211 may easily pass through. The edge grooves 6611 may be formed on opposite sides facing each other, and may be formed to have different sizes so that the support protrusion 6211 of a corresponding size may be inserted. Accordingly, the filter cover 66 is prevented from being assembled incorrectly, and may be assembled in the correct direction within the housing 600.

In addition, the support protrusion 6211 can support the lower end of the filter cover 66 after passing through the edge groove 6611 and the edge hook 6612. In addition, the filter cover 66 can be maintained in a state of being fixedly mounted to the upper housing 62. In addition, when the housing 600 rotates, the support protrusion 6211 can move along the lower end of the inner edge 661.

In addition, a stepped part 666 (FIG. 24) having a smaller diameter than the inner edge 661 may protrude upward from the upper end of the inner edge 661. A limit groove 6614 into which the limit protrusion 629 is inserted may be formed between the inner edge 661 and the stepped part 666.

The limit groove 6614 may extend along the upper end of the inner edge 661. The limit groove 6614 may be opened upward. Accordingly, when the filter cover 66 is inserted upward from the lower part of the upper housing 62, the limit protrusion 629 of the upper housing 62 may be inserted into the inner side of the limit groove 6614. In addition, one end of the limit groove 6614 may come into contact with the limit protrusion 629 when the housing 600 is not rotated before mounting the filter 60. In addition, the other end of the limit groove 6614 may come into contact with the limit protrusion 629 when the housing 600 is completely rotated when mounting the filter 60.

In other words, as the housing 600 rotates, the restriction protrusion 629 can contact both ends of the restriction groove 6614 so that the housing 600 can rotate by a set angle. For example, the set angle can be approximately 90°. To this end, the restriction groove 6614 can have a set length and can be formed so that the housing 600 can rotate by 90°. In addition, the restriction groove 6614 can be formed on one side of the filter cover 66 corresponding to the restriction protrusion 629, not on the inner edge 661.

Meanwhile, a contact protrusion 6613 may be formed on the upper surface of the inner edge 661. A plurality of the contact protrusions 6613 may be formed along the inner edge 661. For example, three or four of the contact protrusions 6613 may be spaced apart from each other by a certain distance. In addition, the contact protrusions 6613 may be in contact with the inner surface of the upper housing 62. Accordingly, the outer surface of the filter cover 66 and the inner surface of the upper housing 62 may not be in contact with each other entirely, but may be in partial contact with each other. In addition, the upper housing 62 may be rotated while minimizing friction with the fixed filter cover 66, and may ensure smooth rotation operation.

Figure 24:
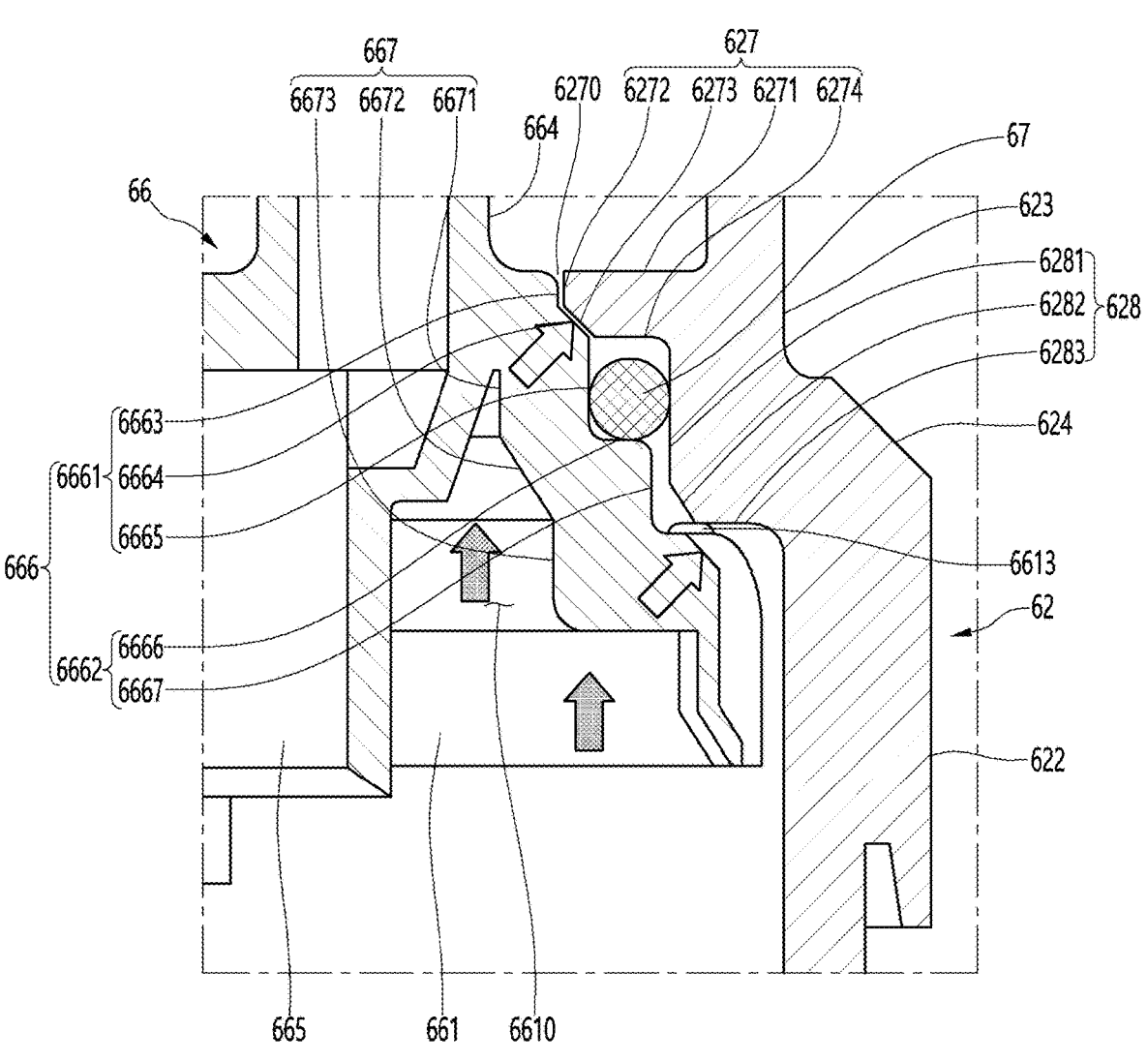
FIG. 24 is an enlarged view illustrating the part A of FIG. 23.

As illustrated in FIG. 24, the vertical gap between the upper housing 62 and the filter cover 66 by the contact protrusion 6613 can minimize direct contact between the filter cover 666 and the upper housing 62. In addition, the upper surface of the contact protrusion 6613 can be formed round or inclined so that the contact protrusion 6613 can come into point contact or minimal area contact with the inner surface of the upper housing 62.

The stepped part 666 may be configured in multiple steps and may have a shape corresponding to the protruding and recessed shapes of the inner surface of the upper housing 62. For example, the stepped part 666 may include a second stepped part 6662 at the upper end of the inner edge 661 and a first stepped part 6661 at the upper end of the second stepped part 6662. In addition, the seal ring 67 may be seated between the first stepped part 6661 and the second stepped part 6662. In addition, the first stepped part 6661 may shield the upper opening 6270 of the first protrusion part 627.

An inner upper surface 662 exposed through the upper opening 6270 may be formed above the first stepped part 6661. The inner upper surface 662 may be formed in a circular shape corresponding to the upper opening 6270. In addition, the inner upper surface 662 may form the same plane as the upper surface of the first protrusion part 627. As another example, the inner upper surface 662 may be formed in a curved or inclined shape having a high center and low edges.

In addition, a water inlet part 663 and a water outlet part 664 may be formed on the inner upper surface 662. The water inlet part 663 and the water outlet part 664 may be referred to as an inlet nipple and an outlet nipple. The water inlet part 663 and the water outlet part 664 may be spaced apart from each other at positions facing each other, and may be formed at the same height h1. A rotation protrusion 669 and a sensing member 668 may protrude upward on the inner upper surface 662. The rotation protrusion 669 and the sensing member 668 may be disposed in a direction intersecting with the disposition direction of the water inlet part 663 and the water outlet part 664.

In addition, the height h2 of the rotation protrusion 669 and the height h3 of the sensing member 668 can be formed lower than the height h1 of the water inlet part 663 and the water outlet part 664. Therefore, when the filter 60 is mounted on the head 50, the water inlet part 663 and the water outlet part 664 can be first inserted into the inlet hole 5321 and the outlet hole 5323, and while the insertion of the water inlet part 663 and the water outlet part 664 is in progress, the rotation protrusion 669 and the sensing member 668 can be inserted into the rotation groove 5329 and the sensing hole 5237. In other words, by forming the height H1 of the water inlet part 663 and the water outlet part 664 higher, it is possible to couple the water inlet part 663 and water outlet part 664 with the head inner 53 without interference from other components 668, 669 when inserting and mounting them.

An inlet inclined part 66301 and an outlet inclined part 66401 as shown in FIG. 19 may be formed at the upper end of the water inlet part 663 and the upper end of the water outlet part 664, respectively. The inlet inclined part 66301 and the outlet inclined part 66401 may be formed so that their diameters become narrower as they go upward. Accordingly, the water inlet part 663 and the water outlet part 664 may be more easily inserted into the inlet hole 5321 and the outlet hole 5323. In addition, the inlet ring 541 and the outlet ring 542 may be prevented from being damaged during the process of inserting the water inlet part 663 and the water outlet part 664 into the inlet hole 5321 and the outlet hole 5323.

In particular, inclined surfaces 5322, 5324, as shown in FIG. 6, may be formed on the opened circumference of the inlet hole 5321 and the outlet hole 5323, and when the filter 60 is mounted, the inlet inclined part 66301 and the inclined surface 5322 of the inlet hole 5321 come into contact with each other, and the outlet inclined part 66401 and the inclined surface 5324 of the outlet hole 5323 come into contact with each other. Accordingly, even when the water inlet part 663 and water outlet part 664 are not precisely aligned with the inlet hole 5231 and outlet hole 5323, the filter 60 can be naturally inserted into the inlet hole 5321 and outlet hole 5323 of the water inlet part 663 and water outlet part 664 by the contact and guidance of the inclined parts 66301, 66401 and inclined surfaces 5322, 5324. For example, when the filter 60 is rotated by a set angle (for example, approximately) 20° based on the aligned state, the inclined parts 66301, 66401 and inclined surfaces 5322, 5324 can be aligned so that the filter 60 can be inserted into the inlet hole 5321 and outlet hole 5323 of the water inlet part 663 and water outlet part 664 by contacting each other. This structure may be very effective in the coupling between the water inlet part 663 and the water outlet part 664 and the inlet hole 5321 and the outlet hole 5323 having an elliptical cross-sectional structure facing in different directions.

In particular, even if the filter cover 66 is not completely aligned, when the water inlet part 663 and the water outlet part 664 approach the inlet hole 5321 and the outlet hole 5323, the inclined parts 66301, 66401 and the inclined surfaces 5322, 5324 come into contact with each other, so that the filter cover 66 can be naturally aligned. For example, even when the filter cover 66 is misaligned by about 10% (misaligned by about 20° compared to the aligned state), the water inlet part 663 and the water outlet part 664 can be inserted into the inlet hole 5321 and the outlet hole 5323.

The filter cover 66 may include a nipple accommodation part 665. The nipple accommodation part 665 may extend downward from the inner upper surface 662. The nipple accommodation part 665 may be positioned on the center line of the filter cover 66. In addition, the nipple accommodation part 665 may be formed in a cylindrical shape with an open lower surface to form a second space 6651 into which the filter nipple 653 is inserted.

The nipple accommodation part 665 may be formed in a shape corresponding to the outer diameter of the nipple seal ring 6533 (FIG. 14). In addition, the outer end of the nipple accommodation part 665 may be in contact with the lower end of the water inlet part 663 and the lower end of the water outlet part 664, respectively. By the nipple accommodation part 665, the interior of the filter cover 66 may be divided into a first space 6610 into which water flows in through the water inlet part 663 and a second space 6651 into which purified water is discharged toward the water outlet part 664. See FIG. 21.

In detail, the water inlet part 663 may be communicated with the first space 6610. The lower end of the water inlet part 663 may form an inlet exit 6633 that communicates with the first space 6610.

In addition, an inlet contact part 6632 may be formed inside the water inlet part 663 to divide the inlet flow path 6631 inside the water inlet part 663. The inlet contact part 6632 may extend from the upper end of the water inlet part 663 to the inlet exit 6633. In addition, the inlet contact part 6632 may be formed along the minor axis S1 of the elliptical cross-section of the water inlet part 663.

Accordingly, water flowing in through the flow path space S on both sides of the sheet part 5631 can more effectively pass through the water inlet part 663 and head toward the first space 6610. In addition, the upper end of the inlet contact part 6632 can come into contact with the contact part 5633 of the valve 56, as shown in FIG. 11.

In detail, the water inlet part 663 may be formed in an elliptical shape and formed so that the major axis L1 extends in the front and rear direction. When the inlet exit 6633 of the water inlet part 663 is formed at a position close to the lateral stepped parts 6661, 6662 so that the major axis L1 is disposed in the front and rear direction, the size of the inlet exit 6633 is secured and smooth water inflow through the water inlet part 663 is enabled.

In addition, the direction of the major axis L1 of the water inlet part 663 may correspond to the cross-sectional shape of the flow path formed in the valve 56 so that water supplied through the valve 56 may flow smoothly along the water inlet part 663.

In addition, when the inlet contact part 6632 is disposed in the direction of the major axis L1 of the water inlet part 663, a part of the inlet exit 6633 side is blocked, making it impossible for water to flow uniformly through the water inlet flow path 6631 divided by the inlet contact part. Therefore, the inlet contact part 6632 is disposed in the direction of the minor axis S1 of the water inlet part 663 so that the inlet exit 6633 side is completely open, making it possible for water to flow uniformly through the water inlet flow path 6631.

As another example, the inlet contact part 6632 may be formed at the upper end of the water inlet part 663, but may be partially formed inside the water inlet part 663. The inlet contact part 6632 may also be formed only at the upper end of the water inlet part 663 or the upper part of the water inlet part 663 that can come into contact with the contact part 5633.

As another example, the inlet contact part 6632 may be formed in a cross shape with a plurality of ribs intersecting when viewed from above to support the contact part 5633 more stably.

The water outlet part 664 may communicate with the second space 6651. The lower end of the water outlet part 664 may form an outlet entrance 6643 communicating with the second space 6651. In addition, a water outlet flow path 6641 may be formed inside the water outlet part 664. The cross-sectional shape of the water outlet flow path 6641 may be formed in an elliptical shape, and may be disposed in a direction intersecting with the cross-sectional shape of the water inlet flow path 6631.

In addition, the lower ends of the water inlet part 663 and water outlet part 664 may be formed with inclined parts 6634, 6644 that are formed to have an incline or round from the inner upper surface 662, respectively. The inclined parts 6634, 6644 may be formed in a shape corresponding to the inclined parts 5322, 5324 of the inner head 53, shown in FIG. 6. The inclined parts 6634, 6644 may reinforce the strength of the water inlet part 663 and water outlet part 664 to prevent deformation and damage. In addition, when the water inlet part 663 and the water outlet part 664 are inserted into the inlet hole 5321 and outlet hole 5323, the inclined parts 6634, 6644 may be adjacent to the inclined parts 5322, 5324.

Below, the coupling structure of the upper housing 62 and the filter cover 66 is described in more detail with reference to the drawings.

Figure 23:
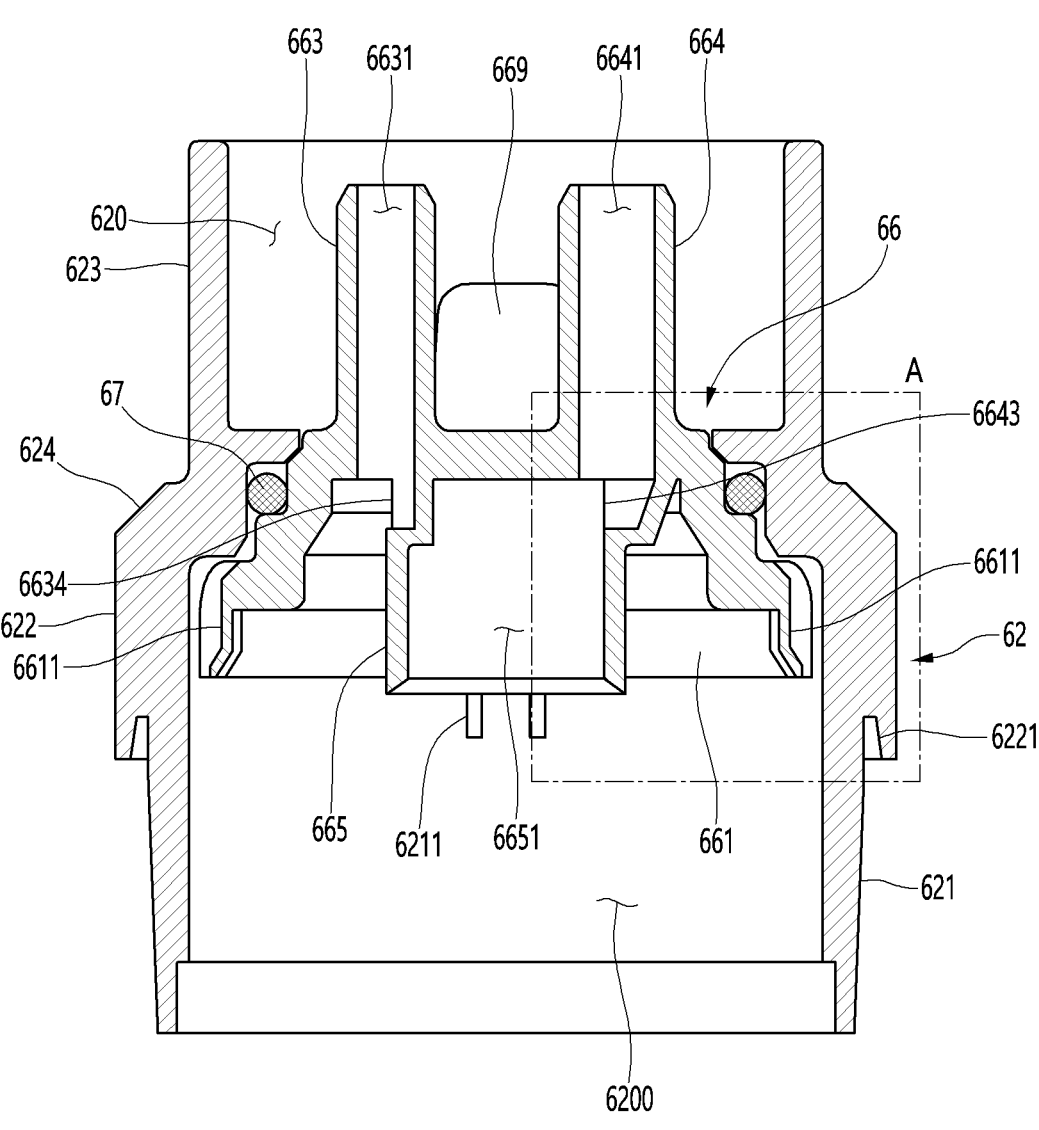
FIG. 23 is a longitudinal cross-sectional view illustrating a state where the upper housing and filter cover are coupled.
Figure 25:
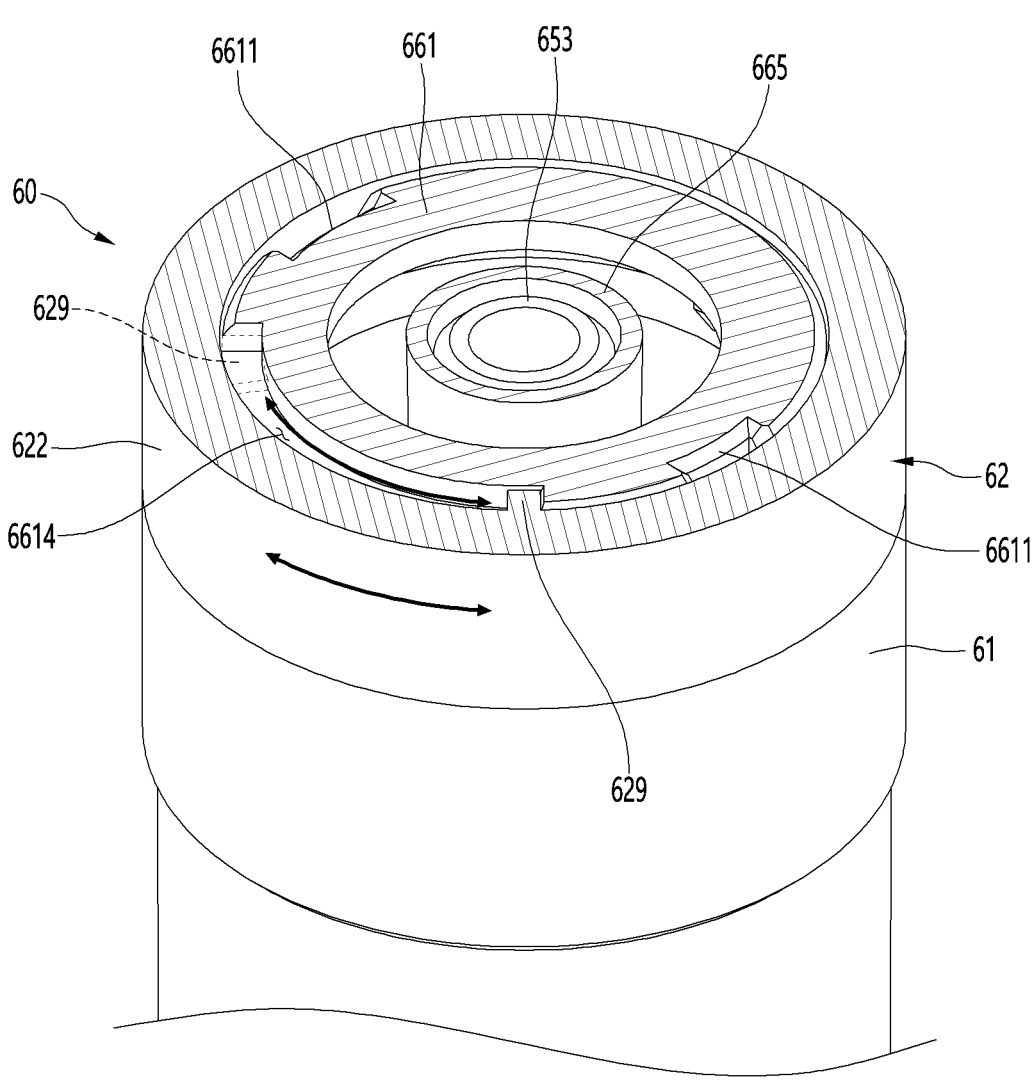
FIG. 25 is a perspective view taken along line 25-25 of FIG. 4.

FIG. 23 is a longitudinal cross-sectional view illustrating a state where the upper housing and filter cover are coupled, FIG. 24 is an enlarged view illustrating the part A of FIG. 23, and FIG. 25 is a perspective view taken along line 25-25 of FIG. 4.

As illustrated, the filter cover 66 is inserted into the opened lower part of the upper housing 62 and can be mounted to shield the upper opening 6270. When the filter cover 66 is mounted on the upper housing 62, the water inlet part 663 and the water outlet part 664 can be exposed to the opened upper surface of the upper housing 62. Then, when the filter 60 is mounted, the water inlet part 663 and the water outlet part 664 which are exposed can be inserted into the inlet hole 5321 and the outlet hole 5323. The water inlet part 663 and the water outlet part 664 have an elliptical cross-section, and the outer surfaces of the water inlet part and the water outlet part can be sealed by contacting the inner surfaces of the inlet hole 5231 and outlet hole 5233 or the inlet ring 541 and outlet ring 542. Therefore, the outer surfaces of the water inlet part 663 and outlet part 664 can be referred to as seal ring parts.

The filter cover 66 can be supported from below by the support protrusion 6211 while inserted into the upper housing 62. Therefore, the filter cover 66 can be maintained in a mounted state without being separated from the upper housing 62.

The outer surface of the filter cover 66 formed in steps and the inner surface of the upper housing 62 can be disposed to correspond to each other. In addition, the filter cover 66 and the upper housing 62 can be rotated relative to each other while maintaining sealed state by the seal ring 67.

In detail, the upper housing 62 may have a first protrusion part 627 protruding toward the inside of the upper housing 62, and a second protrusion part 628 protruding from the lower end of the first protrusion part 627 toward the center of the upper housing 62. The first protrusion part 627 may protrude toward the center of the upper housing 62 more than the second protrusion part 628. In addition, the first protrusion part 627 and the second protrusion part 628 may be formed to be stepped from each other. In addition, the seal ring 67 may be disposed on the stepped part of the first protrusion part 627 and the second protrusion part 628.

For example, the first protrusion part 627 may include a first inner surface 6271 forming an upper surface of the first protrusion part 627, a second inner surface 6272 extending downward from an inner end of the first inner surface 6271 and forming the upper opening 6270, a third inner surface 6273 formed to be inclined at a lower end of the second inner surface 6272, and a fourth inner surface 6274 formed parallel to the second inner surface 6272 at an end part of the third inner surface 6273 and forming a lower surface of the first protrusion part 627.

In addition, the second protrusion part 628 may include a fifth inner surface 6281 forming an inner surface of the second protrusion part 628, a sixth inner surface 6282 formed to be inclined at the lower end of the fifth inner surface 6281, and a seventh inner surface 6283 extending from the lower end of the sixth inner surface 6282 to form the lower surface of the second protrusion part 628.

The seal ring 67 is formed in an O-ring shape and can be positioned to come into contact with the fourth inner surface 6274 and the fifth inner surface 6281. In particular, even when the upper housing 62 rotates, the upward and outward flow of the seal ring 67 is restricted so that the position of the seal ring 67 can be maintained and the seal ring between the upper housing 62 and the filter cover 66 can be maintained.

The inner edge 661 at the lower end of the filter cover 66 may be positioned below the second protrusion part 628, that is, the seventh inner surface 6283, and may be positioned further outside than the fifth inner surface 6281. Accordingly, the filter cover 66 may be restrained from upward flow below the second protrusion part 628 by the inner edge 661. At this time, the contact protrusion 6613 formed on the upper surface of the inner edge 661 may come into contact with the seventh inner surface 6283 to facilitate the rotation of the upper housing 62.

In addition, the first stepped part 6661 and the second stepped part 6662 may be formed above the inner edge 661. The first stepped part 6661 and the second stepped part 6662 may be configured to be in contact with the first protrusion part 627 and the second protrusion part 628, respectively.

For example, the first stepped part 6661 may include a first outer surface 6663 facing the second inner surface 6272, a second outer surface 6664 extending obliquely from the lower end of the first outer surface 6663 and facing the third inner surface 6273, and a third outer surface 6665 extending downwardly from the lower end of the second outer surface 6664 and facing the fifth inner surface 6281. At this time, the second outer surface 6664 and the fifth inner surface 6281 may be spaced apart from each other in the left and right direction, and the seal ring 67 may be disposed between the second outer surface 6664 and the fifth inner surface 6281.

In addition, the second stepped part 6662 may include a fourth outer surface 6666 extending from the lower end of the third outer surface 6665 and facing the fourth inner surface 6274. The fourth inner surface 6274 and the fourth outer surface 6666 may be spaced apart from each other in the vertical direction, and the seal ring 67 may be disposed therebetween. In addition, the second stepped part 6662 may include a fifth outer surface 6667 extending downward from an end part of the fourth outer surface 6666. The fifth outer surface 6667 may face the fifth inner surface 6281 and may extend downward to a height corresponding to the seventh inner surface 6283.

Meanwhile, the seal ring 67 is supported in the front, rear, left, and right directions by the first protrusion part 627 and the second protrusion part 628 and the first stepped part 6661 and the second stepped part 6662, and thus can seal the space between the filter cover 66 and the upper housing 62 to prevent water leakage. In addition, the first protrusion part 627 and the second protrusion part 628 may be adjacent to the first stepped part 6661 and the second stepped part 6662 by the seal ring 67, but may not be in direct contact with each other, and thus the upper housing 62 may be rotatable.

In addition, the circumferential surface of the filter cover 66 in which the inner edge 661 and the first stepped part 6661 and the second stepped part 6662 are formed can be pressed toward the inner surface of the housing 600 by the hydraulic pressure of the second space 6651 inside the housing 600, thereby enabling the seal ring between the upper housing 62 and the filter cover 66 to be more effectively achieved.

In particular, the inner surface 667 of the filter cover 66 forming the second space 6651 may include an inner inclined surface 6672. The inner inclined surface 6672 may be formed at a position facing the seal ring 67. In addition, the inner inclined surface 6672 may be disposed so that it faces outward as it extends downward. At this time, a normal line intersecting the inner inclined surface 6672 may be formed so as to pass through the center of the seal ring 67. Therefore, when water is supplied to the filter 60 and the pressure inside the housing 600, particularly, the second space 6651, increases, the inner inclined surface 6672 presses the seal ring 67 outward, and the gap between the filter cover 66 and the upper housing 62 is reduced, so that the seal ring may be more airtight.

The inner surface of the filter cover 66 may further include a first vertical surface 6671 extending upward from the upper end of the inner inclined surface 6672 and a second vertical surface 6673 extending downward from the lower end of the inner inclined surface 6672. The first vertical surface 6671 and the second vertical surface 6672 may be formed perpendicular to the upper surface of the filter cover 66.

Below, the mounting process of a filter 60 having the structure is described with reference to the drawings.

Figure 26:
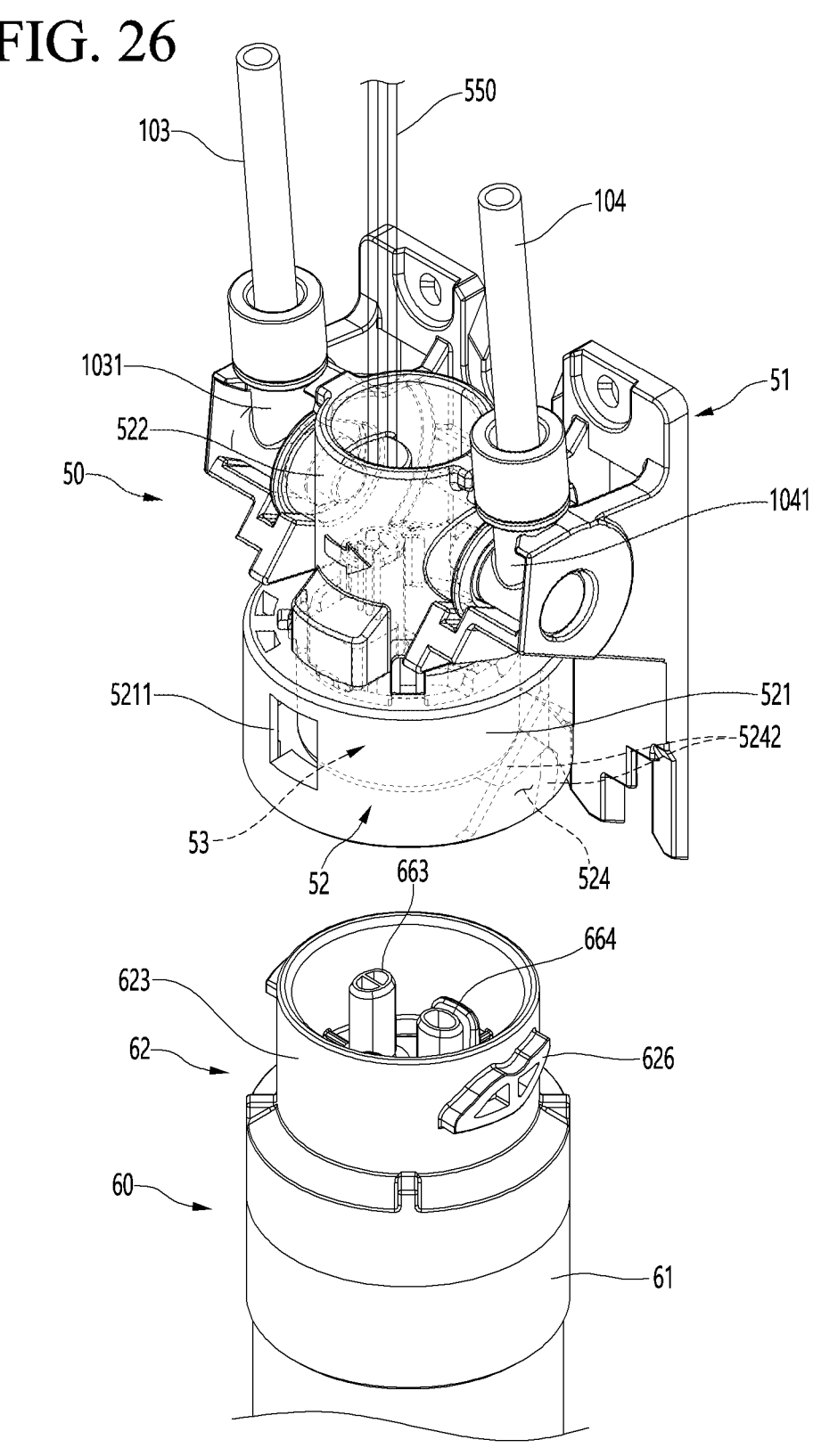
FIG. 26 is an exploded perspective view illustrating a state of being aligned for coupling the filters as seen from one side.
Figure 27:
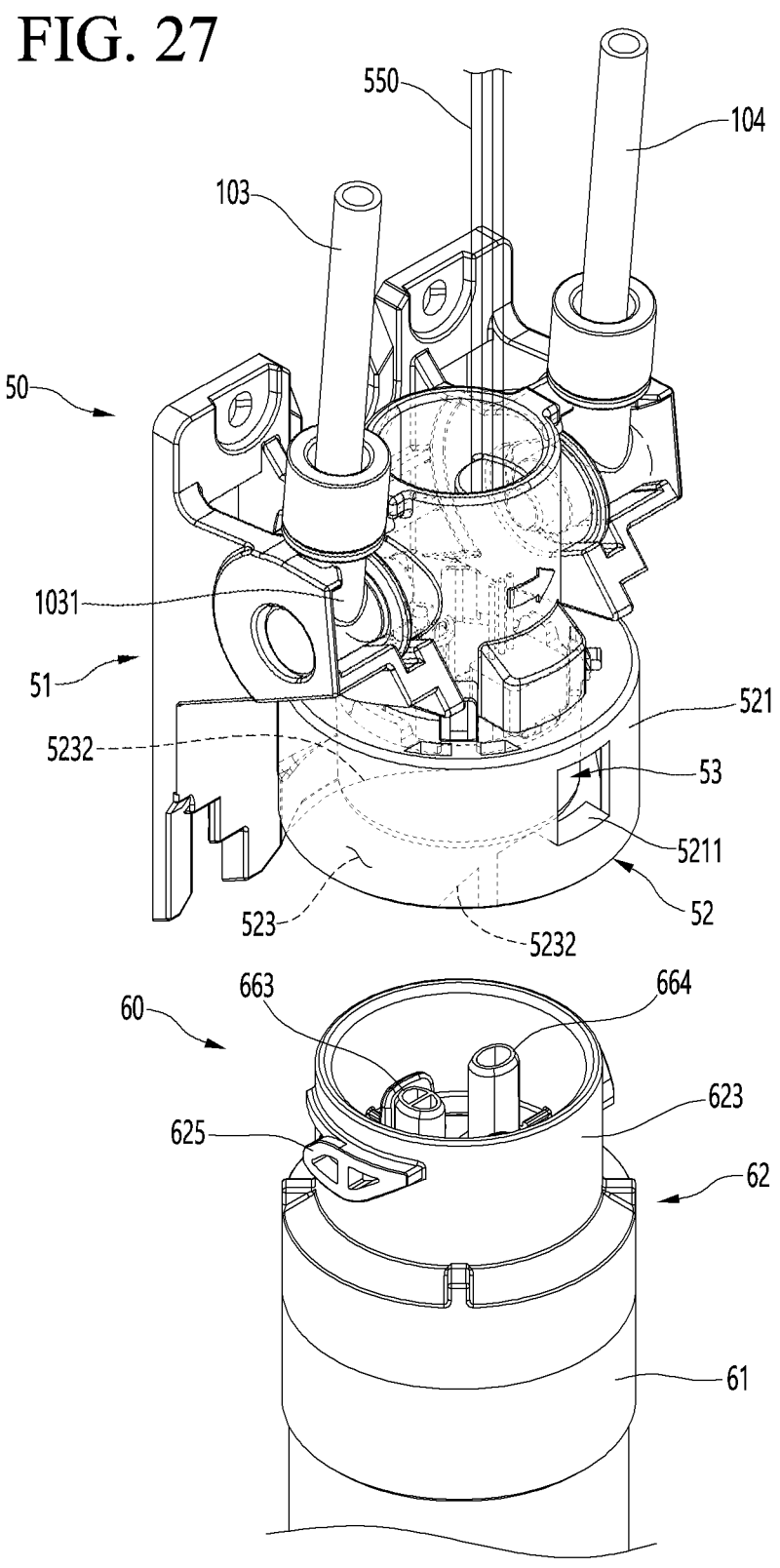
FIG. 27 is an exploded perspective view illustrating a state of being aligned for coupling the filters as seen from the other side.
Figure 28:
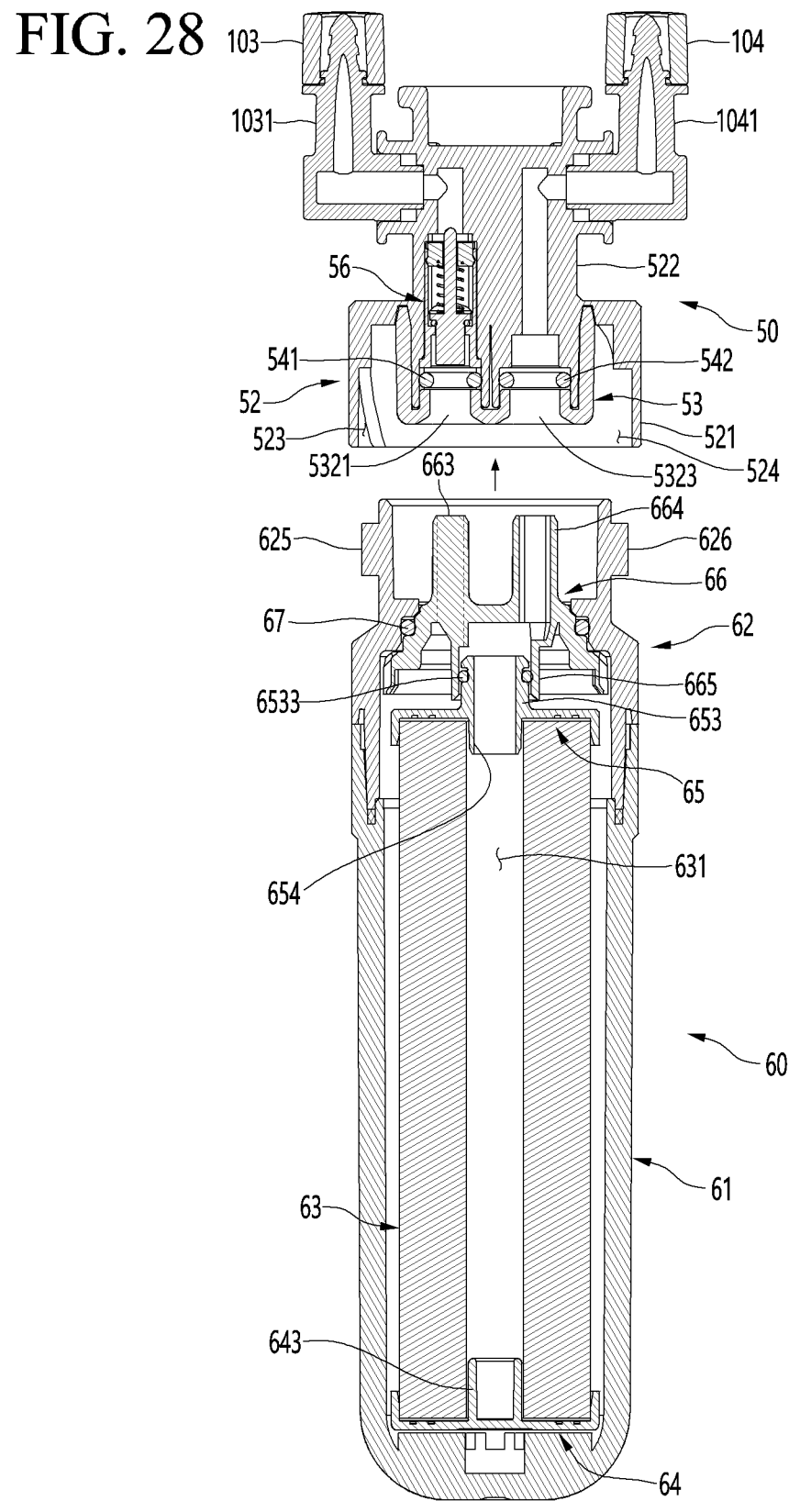

FIG. 26 is an exploded perspective view illustrating a state of being aligned for coupling the filters as seen from one side, FIG. 27 is an exploded perspective view illustrating a state of being aligned for coupling the filters as seen from the other side, and FIG. 28 is a longitudinal cross-sectional view illustrating a state the head and filter are separated.

As illustrated, the upper end of the filter 60 may be inserted through the open lower surface of the head 50.

The filter 60 has a structure in which the housing 600 rotates relative to the filter cover 66 and is coupled to the head body 52. Therefore, in order to properly mount the filter 60, the water inlet part 663 and water outlet part 664 have to be aligned with the inside of the housing 600.

When the filter 60 is viewed from above, the water inlet part 663 and the water outlet part 664 can be aligned between the first guide protrusion 625 and the second guide protrusion 626 disposed on both sides. In detail, the water inlet part 663 and the water outlet part 664 can be disposed in parallel on an extension line connecting the first guide protrusion 625 and the second guide protrusion 626. Therefore, the user can easily visually check that the filter 60 is aligned so that it can be mounted on the head 50 when viewed from above.

In particular, when the filter 60 is aligned to be mounted on the head, the water inlet part 663 and the water outlet part 664 can be aligned with the marker 6275 formed on the outside of the upper opening 6270. In addition, the marker 6275 can be positioned on the same line as the minor axis of the water inlet part 663 or the inlet contact part 6632 of the water inlet part 663. Therefore, the user can more accurately know the alignment state of the filter 60 through the disposition of the marker 6275 and the inlet contact part 6632.

In addition, the markers 6275 can be formed on both left and right sides and also on the upper and lower sides, and the markers 6275 on both left and right sides can visualize the alignment state of the water inlet part 663 and the water outlet part 664, and the markers 6275 on both upper and lower sides can visualize the alignment state of the rotation protrusion 669 and the sensing member 668. Therefore, the alignment state of the filter 60 can be accurately checked through the disposition of the markers 6275 exposed to the upper surface of the filter 60 and the water inlet part 663, the water outlet part 664, the rotation protrusion 669, and the sensing member 668.

If the water inlet part 663 and water outlet part 664 are not aligned before the filter 60 is mounted on the head 50, the user can align them as above by rotating the filter cover 66 relative to the housing 600.

In a state where the filter 60 is aligned, the first guide protrusion 625 and the second guide protrusion 626 can be positioned on the left and right sides, respectively. Then, in order to couple the filter 60 to the head, the user can position the first guide protrusion 625 and the second guide protrusion 626 downwardly corresponding to the first guide hole 5231 and the second guide hole 5241 opened in the lower surface of the head body 52, respectively. At this time, the water inlet part 663 and the water outlet part 664 aligned with the filter 60 can be positioned downwardly of the inlet hole 5321 and the outlet hole 5323.

In this state, the filter 60 can be moved upward to begin combining the filter 60 with the head 50.

Figure 29:
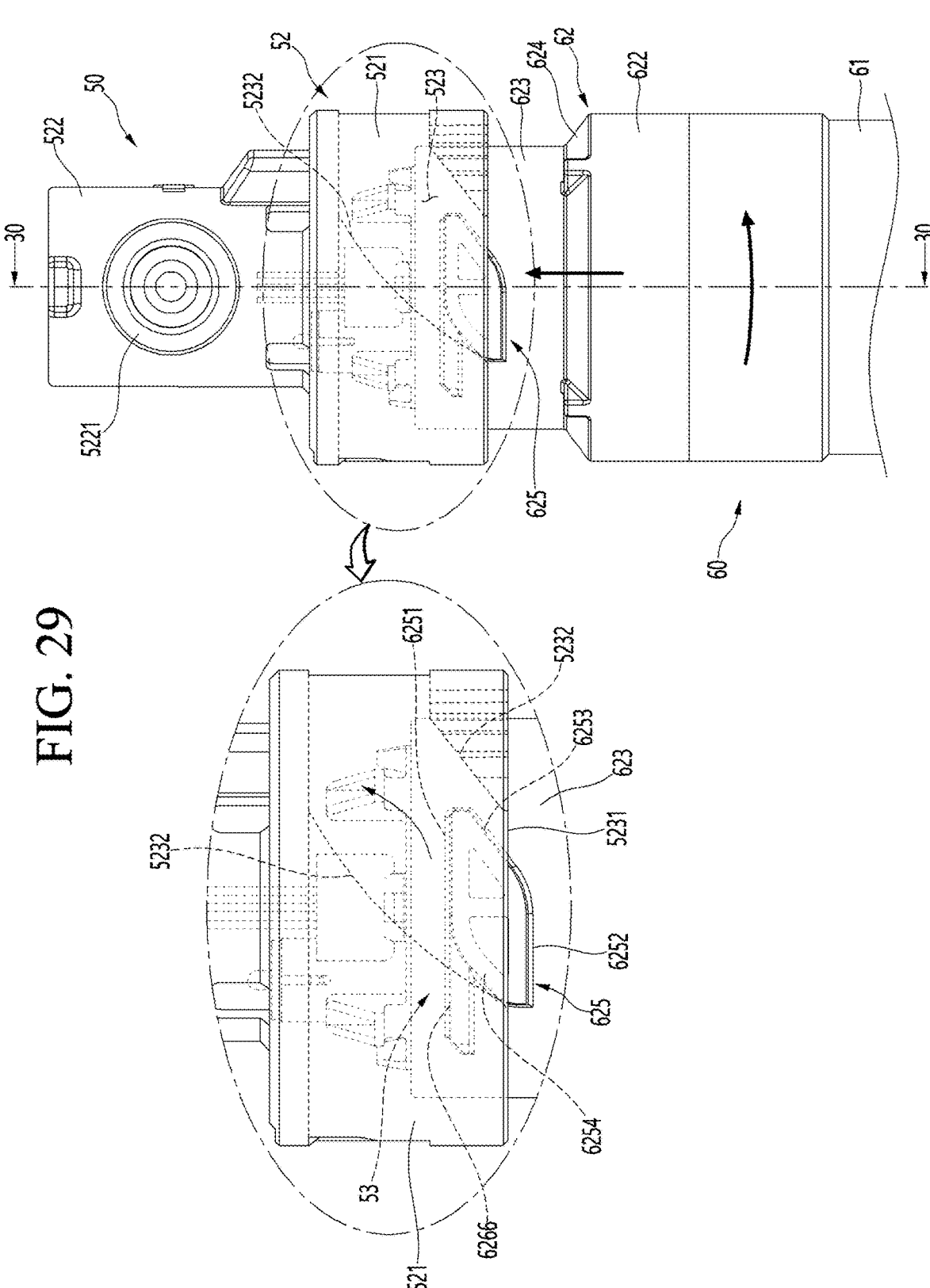
FIG. 29 is a view illustrating a state where the filter has started to be inserted into the head.
Figure 30:
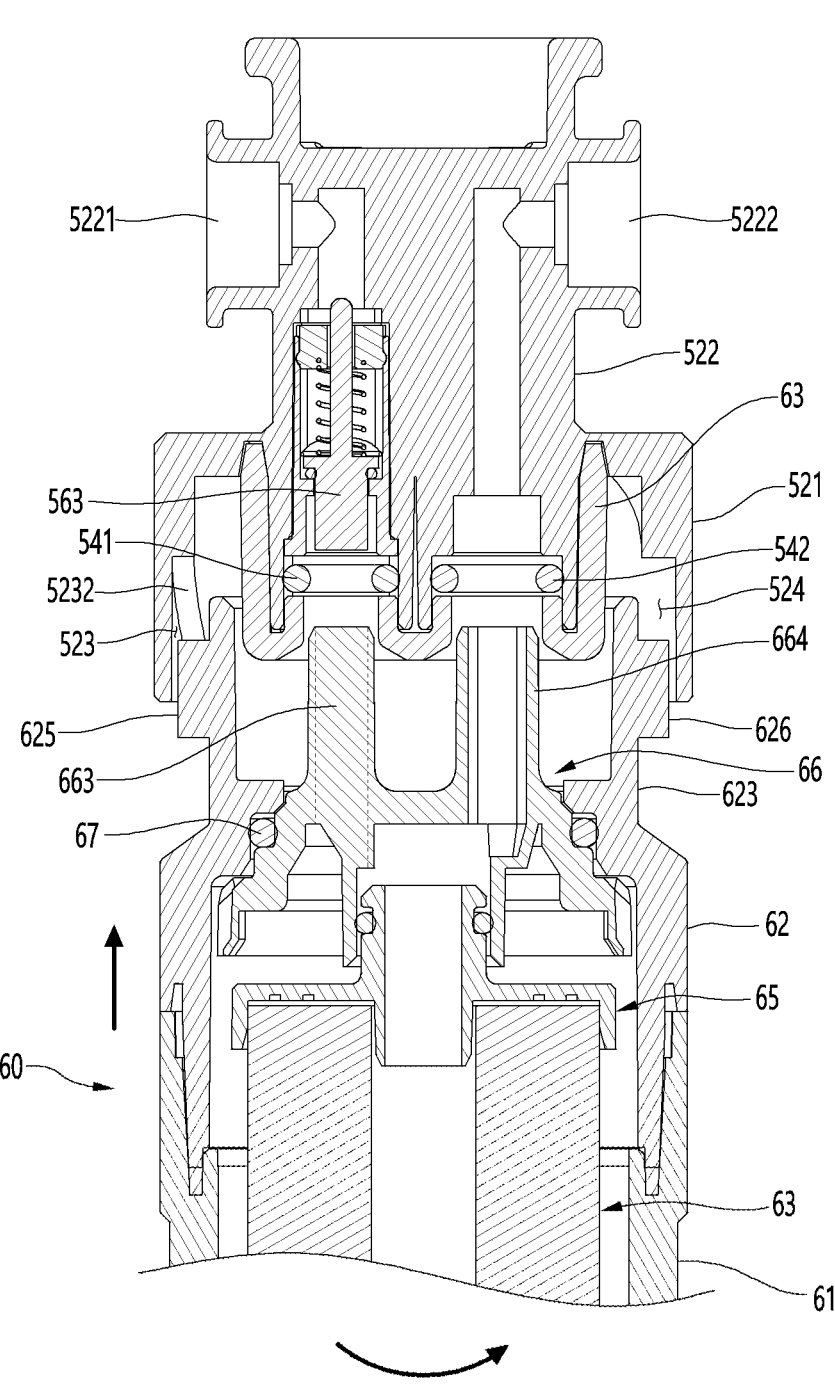
FIG. 30 is a cross-sectional view taken along line 30-30 of FIG. 29.

FIG. 29 is a view illustrating a state where the filter has started to be inserted into the head, and FIG. 30 is a cross-sectional view taken along line 30-30 of FIG. 29.

As illustrated, the upper end of the filter 60 can be inserted through the opened lower surface of the head body 52. When the filter 60 is started to be coupled to the head body 52, the first guide protrusion 625 can be inserted into the first guide 523, and the second guide protrusion 626 can be inserted into the second guide 524.

In particular, the first guide protrusion 625 is structurally prevented from being inserted into the second guide 524, thereby preventing incorrect mounting of the filter 60. In addition, the cross sections of the water inlet part 663 and the water outlet part 664 are also formed to have directionality to be inserted into the inlet hole 5321 and the outlet hole 5323 only when the first guide protrusion 625 is inserted into the first guide 523 and the second guide protrusion 626 is inserted into the second guide 524.

In detail, when the first guide 523 is inserted into the interior of the first guide hole 5231 from below the first guide hole 5231, the protrusion extension part 6256 can be inserted through the gap G between the first guide part 5232 and the head inner 53.

In other words, the first guide protrusion 625 is inserted into the interior of the first guide 523, and the protrusion extension part 6256 can be inserted between the first guide part 5232 and the head inner 53. As the first guide protrusion 625 is inserted into the first guide 523, the first front inclined part 6253 or the first rear inclined part 6254 moves into contact with the first guide part 5232.

At this time, the second guide protrusion 626 can be inserted into the interior of the second guide 524. In other words, the first guide protrusion 625 and the second guide protrusion 626 can be simultaneously inserted and moved into the first guide 523 and the second guide 524.

Meanwhile, if the user incorrectly mounts the filter 60, the first guide protrusion 625 may be attempted to be inserted toward the second guide hole 5241. At this time, the protrusion extension part 6256 cannot be inserted into the relatively narrow gap between the second guide part 5242 and the head inner 53. Therefore, the first guide protrusion 625 cannot be inserted into the second guide 524. In other words, the filter 60 may have a structure in which it is mounted only in a set disposition, thereby ensuring accurate mounting of the water inlet part 663 and water outlet part 664.

In addition, the water inlet part 663 and the water outlet part 664 can be inserted into the corresponding inlet hole 5321 and the outlet hole 5323, respectively. The water inlet part 663 and the water outlet part 664 can be inserted into the inlet hole 5321 and the outlet hole 5323, respectively, at the moment when the first guide protrusion 625 and the second guide protrusion 626 are inserted into the first guide 523 and the second guide 524.

At this time, since the water inlet part 663 and water outlet part 664 are already aligned, accurate mounting is possible simply by inserting the first guide protrusion 625 and the second guide protrusion 626 into the first guide 523 and the second guide 524 without a separate alignment operation.

In addition, the rotation protrusion 669 and the sensing member 668 can also be inserted into the inside of the rotation groove 5329 and the sensing hole 5237, respectively. At this time, the rotation protrusion 669 comes into contact with the inner surface of the rotation groove 5329, and thus, the torque generated when the housing 600 rotates is not transmitted to the water inlet part 663 and water outlet part 664, thereby ensuring stable rotation of the housing 600.

Figure 31:
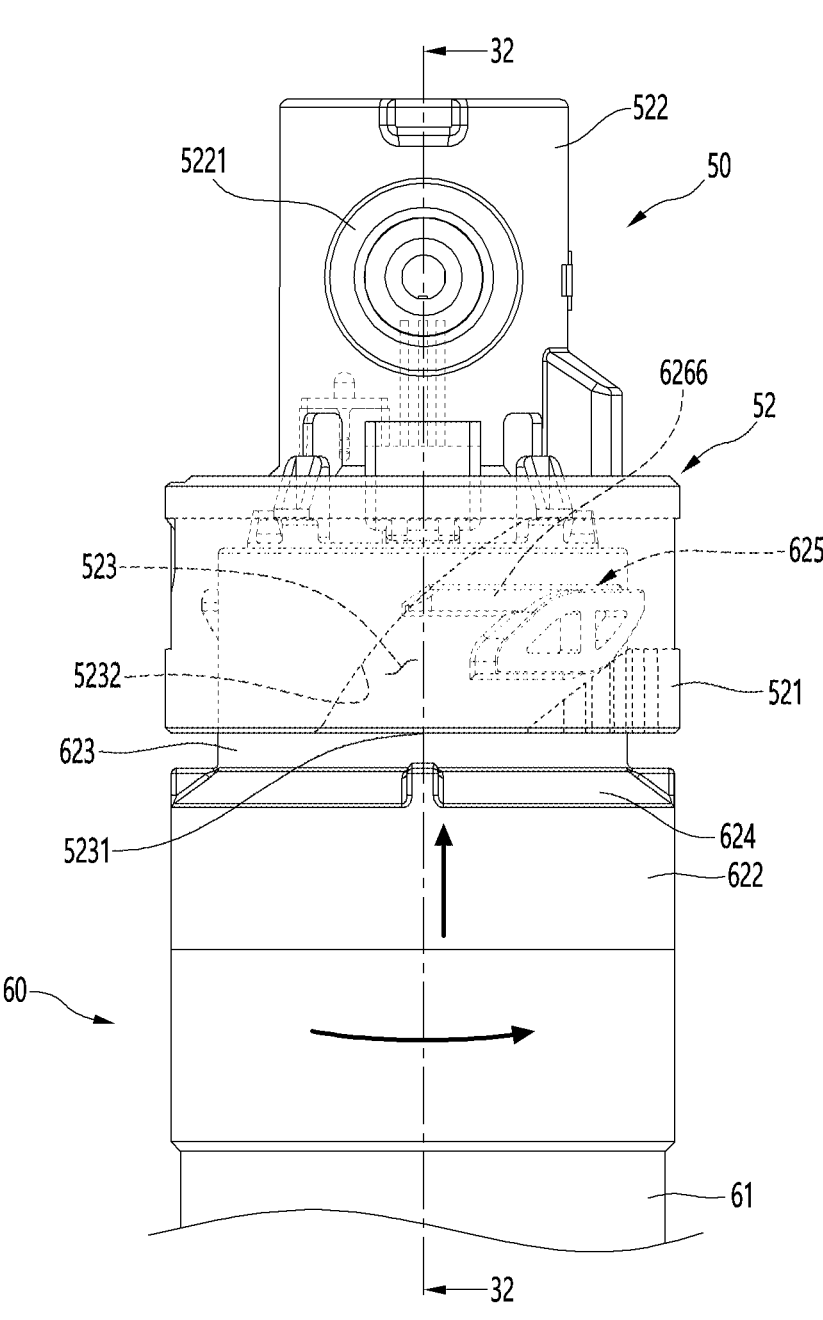
FIG. 31 is a view illustrating a state where the filter is inserted into the head and rotated at a set angle.
Figure 32:
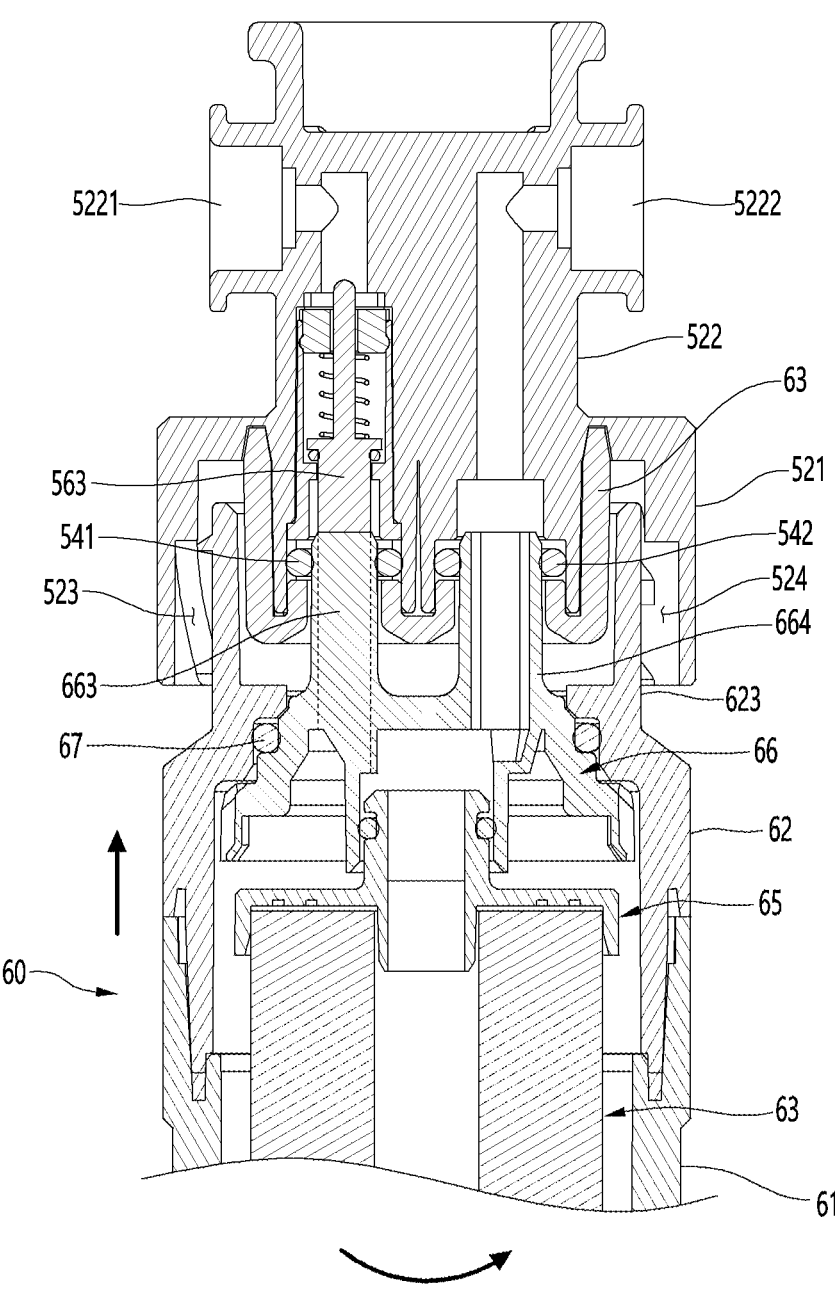
FIG. 32 is a cross-sectional view taken along line 32-32 of FIG. 31.

FIG. 31 is a view illustrating a state where the filter is inserted into the head and rotated at a set angle, and FIG. 32 is a cross-sectional view taken along line 32-32 of FIG. 31.

As illustrated, the filter 60 can be rotated to be coupled with the head 50 while being inserted into the head 50. At this time, the housing 600 moves upward while rotating with respect to the filter cover 66, and the filter cover 66 can move upward while being coupled with the head inner 53.

In detail, as the housing 600 is rotated, the first guide protrusion 625 and the second guide protrusion 626 can move upward along the first guide 523 and the second guide 524, respectively. For example, the first front inclined part 6253 or the first rear inclined part 6254 can move while maintaining contact with the first guide part 5232. At this time, the protrusion extension part 6256 can move while being positioned at the gap (G) between the first guide part 5232 and the head inner 53.

As the housing 600 rotates, the first guide protrusion 625 and the second guide protrusion 626 continuously move along the first guide 523 and the second guide 524. In addition, the water inlet part 663 and the water outlet part 664 move upward and can be inserted into the inlet hole 5321 and the outlet hole 5323. The water inlet part 663 and the water outlet part 664 can move upward by passing through the inlet ring 541 and the outlet ring 542, respectively. Therefore, the circumference of the water inlet part 663 and the water outlet part 664 can be sealed by the inlet ring 541 and the outlet ring 542.

The housing 600 is rotated until the first guide protrusion 625 and the second guide protrusion 626 are positioned at the end parts of the first guide 523 and the second guide 524, and insertion of the water inlet part 663 and the water outlet part 664 can proceed.

In addition, the rotation protrusion 669 and the sensing member 668 may also be further inserted into the inside of the rotation groove 5329 and the sensing hole 5237, respectively. When the sensing member 668 is completely inserted into the inside of the sensing hole 5237, the filter sensing device 55 can detect this and open the water supply valve 102, thereby allowing water to be supplied to the filter 60.

Figure 33:
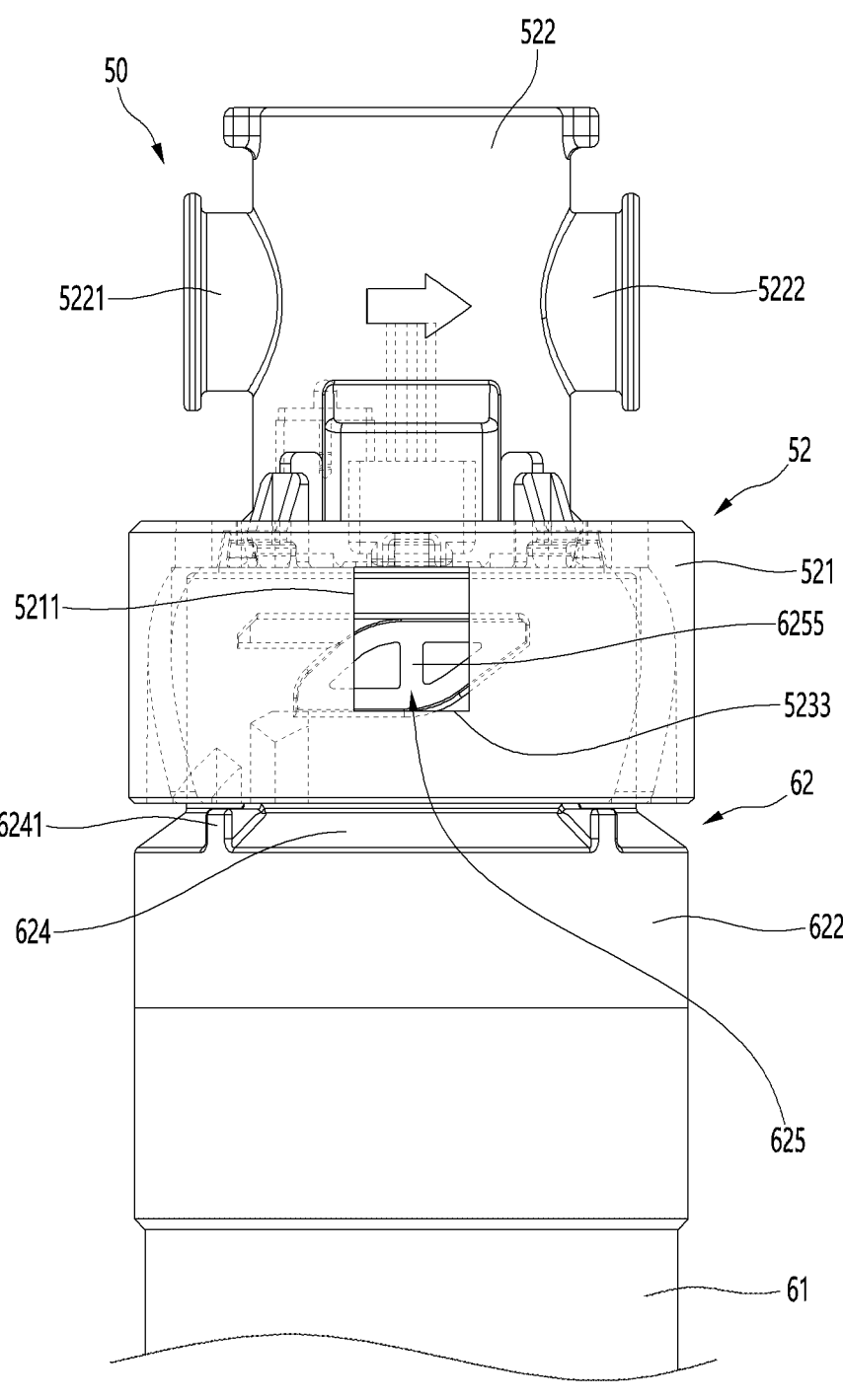
FIG. 33 is a front view illustrating a state where the filter is completely coupled to the head.
Figure 34:
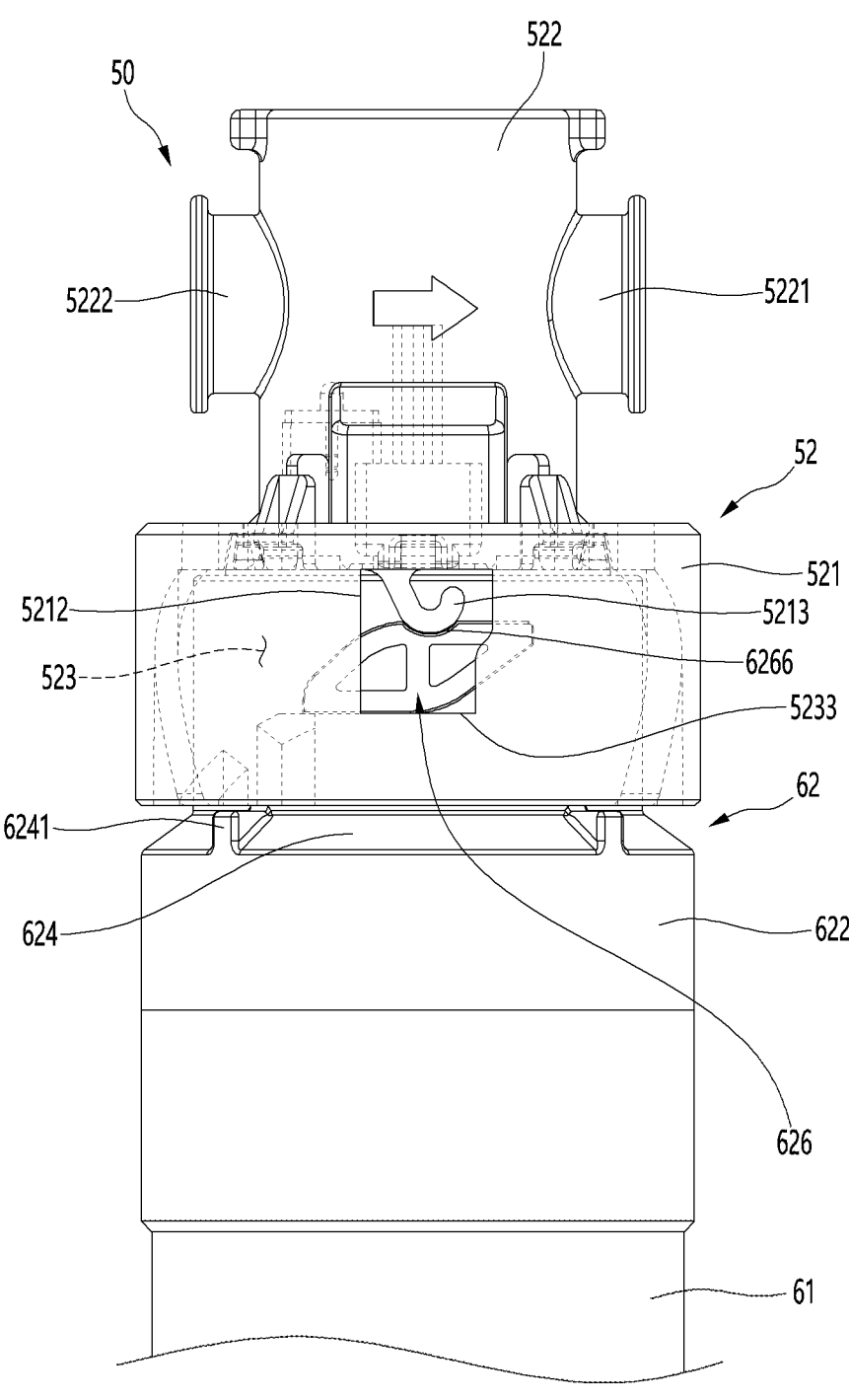
FIG. 34 is a rear view illustrating a state where the filter is completely coupled to the head.
Figure 35:
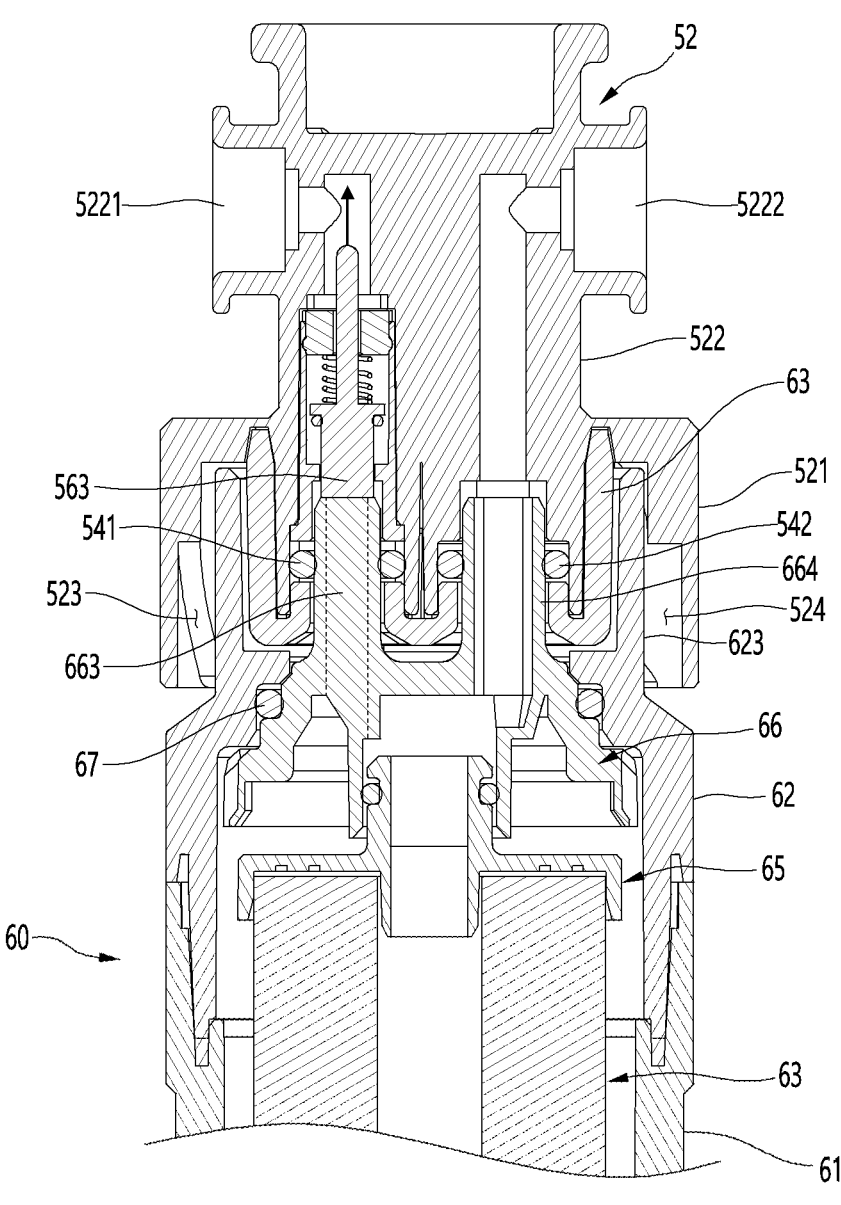
FIG. 35 is a longitudinal cross-sectional view of FIG. 33.

FIG. 33 is a front view illustrating a state where the filter is completely coupled to the head, FIG. 34 is a rear view illustrating a state where the filter is completely coupled to the head, and FIG. 35 is a longitudinal cross-sectional view of FIG. 33.

As illustrated, when the filter 60 is completely coupled to the head body 52, the first guide protrusion 625 can be positioned at the upper end of the first guide 523. At this time, the first guide protrusion 625 can be positioned within the check window 5211. The check window 5211 is opened forward, and the first guide protrusion 625 can be exposed forward through the check window 5211. Accordingly, the user can check that the connecting rib 6255 is positioned at the center of the check window 5211, and can visually check that the filter 60 is completely mounted on the head 50.

In addition, when the filter 60 is completely coupled to the head body 52, the second guide protrusion 626 can be positioned at the upper end of the second guide. In addition, the second guide protrusion 626 can be positioned within the rear check window 5212. At this time, the restraint part 5213 can be caught and restrained in the restraint groove 6266 of the second guide protrusion 626. The restraint part 5213 is formed in a ring-like shape and can be elastically deformed when coupled or separated from the restraint groove 6266, and can be press-coupled to the restraint groove 6266.

In detail, at the moment when the filter 60 is completely coupled to the head body 52, the restraint groove 6266 and the restraint part 5213 can be engaged with each other. Then, the user can determine whether the filter 60 is normally coupled to the head 50 through the engaging sound or vibration generated at this time. In other words, even if the user does not directly check the check window 5211 with the user's eyes, the user can determine whether the filter 60 is completely mounted by the engaging sound and engaging vibration generated when the housing 600 rotates.

In addition, when the filter 60 is coupled to the head body 52, the housing rib 6241 may be in contact with the lower end of the head body 52. Accordingly, the user can also determine whether the filter 60 is fully coupled through the gap between the housing rib 6241 and the head body 52.

Meanwhile, when the filter 60 is completely mounted on the head body 52, the water inlet part 663 and the water outlet part 664 can be inserted into the inlet hole 5321 and the outlet hole 5323 to a set depth.

In addition, when the water inlet part 663 and the water outlet part 664 are completely inserted into the inlet hole 5321 and the outlet hole 5323, the inside of the filter 60 and the inlet flow path 5241 and the outlet flow path 5251 of the head 50 can communicated with each other. In addition, when the mounting of the filter 60 is complete, the valve 56 and the water supply valve 102 are opened so that water can be supplied to the filter 60 for water purification.

Below, the water flow state of the filter assembly 40 with the filter 60 coupled will be described in more detail with reference to the drawings.

Figure 36:
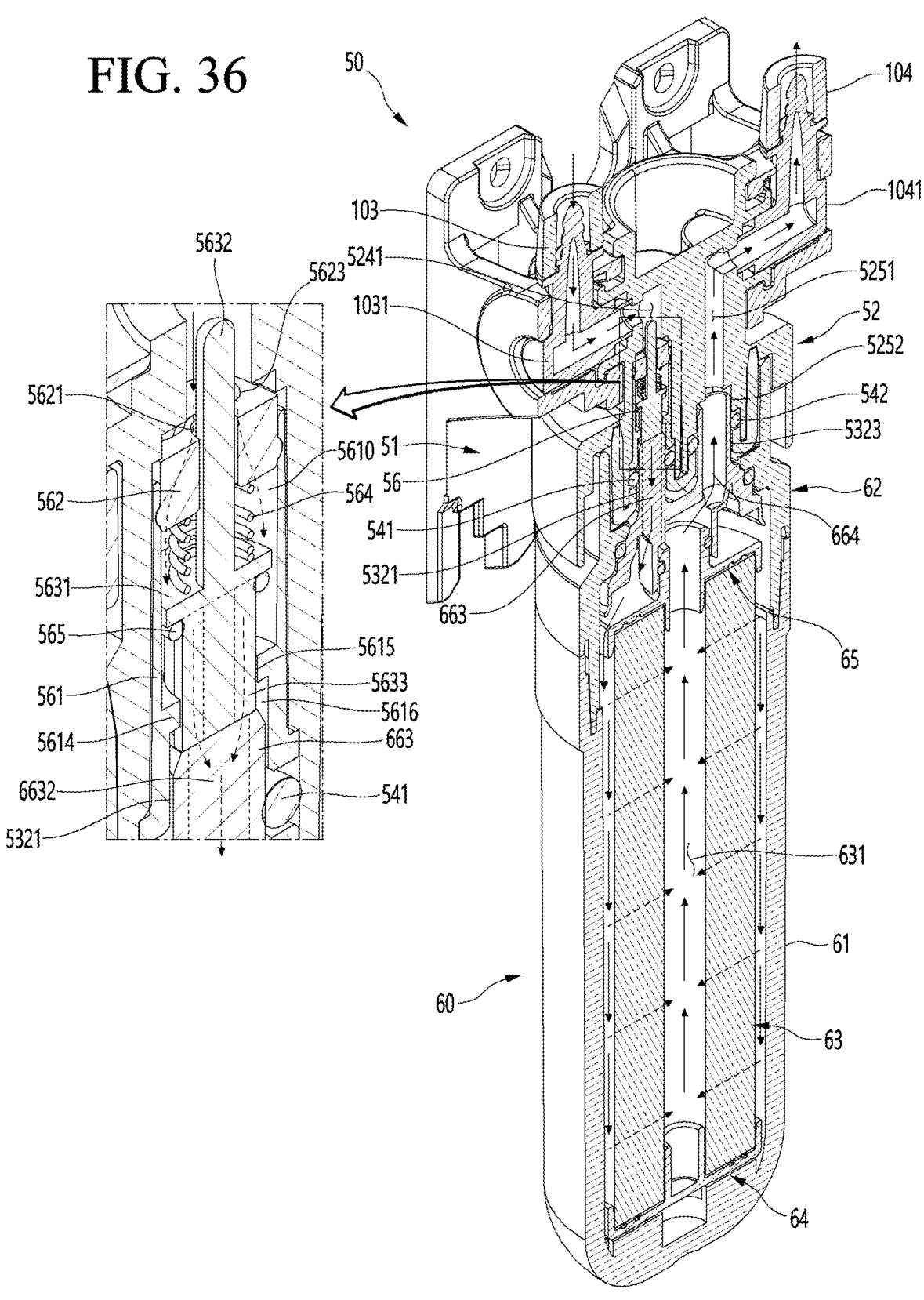
FIG. 36 is a view illustrating the water flow in a state where the filter is completely coupled to the head.
Figure 37:
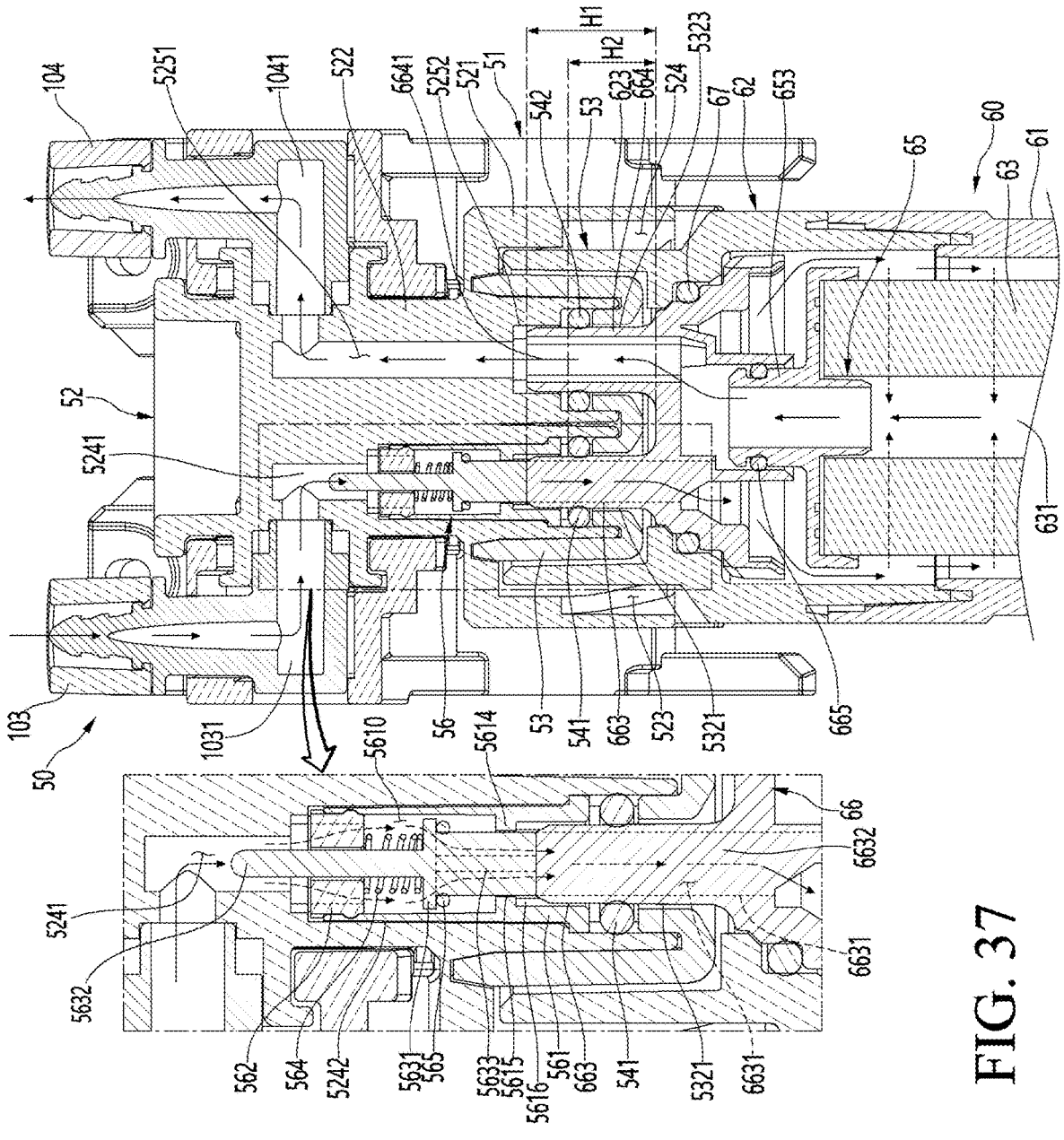
FIG. 37 is a cross-sectional view illustrating a state where the water inlet part and the water outlet part are connected when the filter is completely attached to the head.
Figure 38:
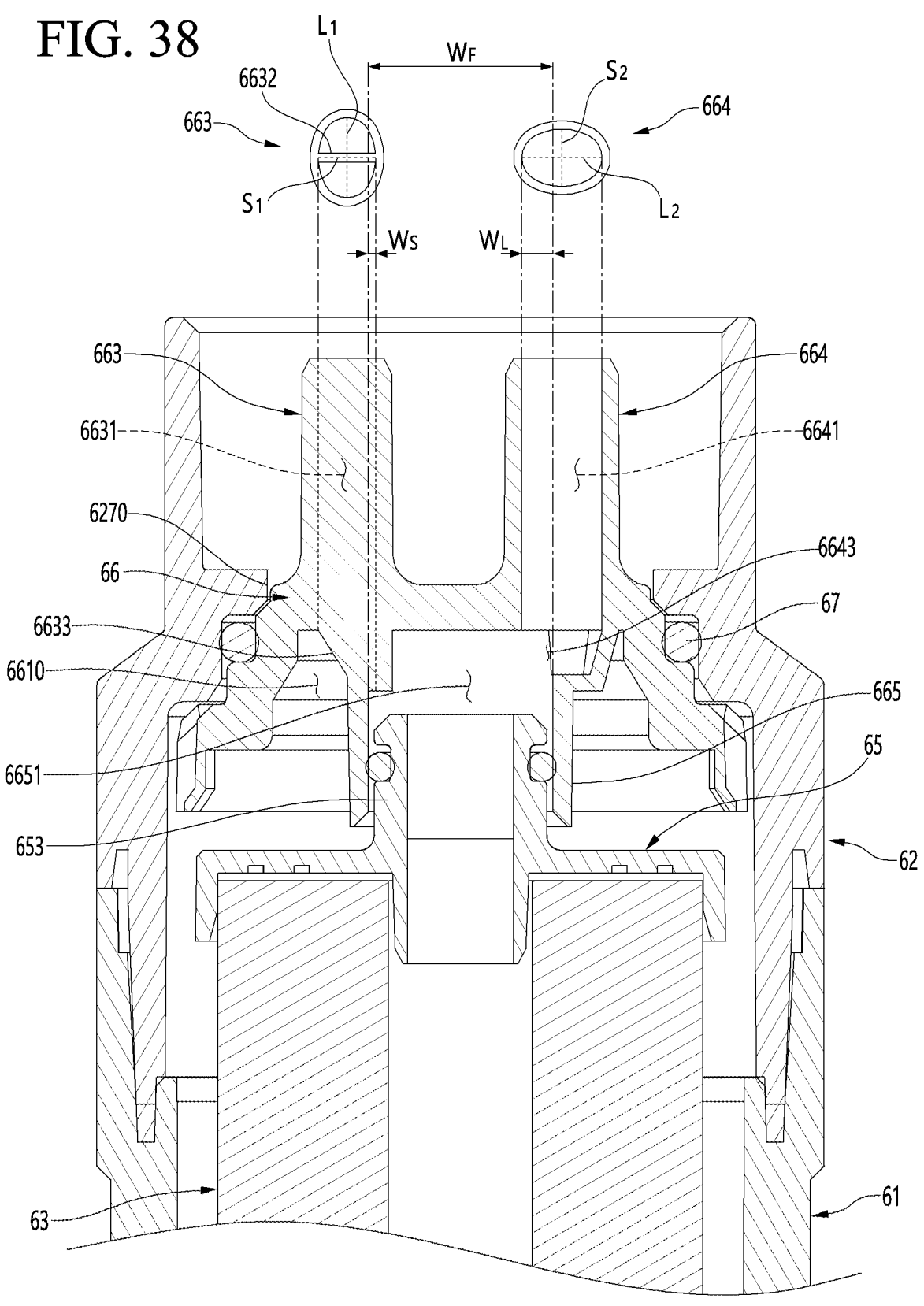
FIG. 38 is a cross-sectional view illustrating the disposition of the water inlet part and the water outlet part at the upper part of the filter.

FIG. 36 is a view illustrating the water flow in a state where the filter is completely coupled to the head, FIG. 37 is a cross-sectional view illustrating a state where the water inlet part and the water outlet part are connected when the filter is completely attached to the head, and FIG. 38 is a cross-sectional view illustrating the disposition of the water inlet part and the water outlet part at the upper part of the filter.

As illustrated, when the filter 60 is completely coupled to the head 50, the water inlet part 663 and the water outlet part 664 can be inserted into the inlet hole 5321 and the outlet hole 5323, respectively.

In detail, the upper end of the water inlet part 663 may be positioned further upward past the inlet ring 541. Then, the upper end of the water inlet part 663 may contact the contact part 5633 to move the piston 563 upward to open the case passage 5615.

Water supplied through the inlet flow path 5241 can flow into the piston accommodation part 5610 through the cap through-hole 5623. The piston accommodation part 5610 has an elliptical shape so that a flow path space S can be secured between the piston accommodation part and the seat part 5631. In addition, when the piston 563 is moved upward, water flows through the case passage 5615 through the flow path space S and into the inlet accommodation part. In addition, water flowing into the inlet accommodation part 5616 can be supplied into the filter 60 through the water inlet flow path 6631 of the water inlet part 663 inserted into the inlet accommodation part 5616. Accordingly, water flowing into the water inlet pipe 103 can flow into the interior of the filter 60 through the inlet flow path 5241 of the head 50, the valve 56, and the water inlet flow path 6631.

In addition, the flow path flowing into the interior of the filter 60 can be guided to the outside of the filter member 63 through the first space 6610. In addition, the water outside the filter member 63 passes through the filter member 63 and moves to the hollow space of the filter member 63. In this case, the water can be purified in the process of passing through the filter member 63. The purified water can flow upward through the hollow 631 toward the second space 6651 and be discharged through the water outlet part 664.

The upper end of the water outlet part 664 may be positioned further upward past the outlet ring 542. Accordingly, purified water from the filter 60 may flow through the water outlet part 664 to the outlet flow path 5251 and be discharged to the outside through the water outlet pipe 104.

While water flows through the filter 60, the circumference of the water inlet part 663 and the water outlet part 664 is sealed by the inlet ring 541 and the outlet ring 542 to prevent water leakage. To this end, the height H1 of the water inlet part 663 and the water outlet part 664 based on the upper surface of the filter cover 66 may be formed to be higher than the height H2 of the inlet ring 541 and the outlet ring 542.

For example, the height H2 of the inlet ring 541 and the outlet ring 542 may be positioned at a position slightly higher than the midpoint of the vertical height H1 of the water inlet part 663 and the water outlet part 664. In addition, the inlet ring 541 and the outlet ring 542 may be positioned at a position spaced apart from the upper ends of the water inlet part 663 and the water outlet part 664 by a set distance.

In addition, at least a part of the circumference of the water inlet part 663 and the water outlet part 664 passing through the inlet ring 541 and the outlet ring 542 may be formed to have an elliptical cross-section corresponding to the water inlet part 663 and the water outlet part 664. Accordingly, the water inlet part 663 and the water outlet part 664 can be sealed to prevent leakage and ensure water flow within the head 50.

The filter 60 can be separated from the head 50 after purifying water for a set period of time or a set flow rate, and then replaced with a new filter 60. In order to separate the filter 60 from the head 50, the housing 600 is rotated and moved downward in the reverse order of the above-described process. At this time, the water inlet part 663 and the water outlet part 664 can be moved downward by the reverse rotation of the filter 60 and can exit the inlet hole 5321 and the outlet hole 5323. In addition, the valve 56 can be closed again by the downward movement and separation of the water inlet part 663, and water flowing into through the water inlet pipe 103 is prevented from leaking out of the head 50.

Meanwhile, as illustrated in FIG. 38, the water inlet part 663 and water outlet part 664 can be compactly and efficiently disposed within the limited inner area of the housing 600. In detail, the water inlet part 663 and water outlet part 664 are disposed within the upper opening 6270.

In addition, the water inlet part 663 and water outlet part 664 should be placed on the cover upper surface 662 of the filter cover 66 exposed through the upper opening 6270, and at the same time, form a flow path connecting the inside of the housing 600 and the head 50. At this time, according to the disposition direction of the water inlet part 663 and water outlet part 664 having an elliptical cross-section, smooth flow of water passing through the filter 60 can be ensured.

In detail, the water inlet part 663 can be disposed so that the major axis L1 of the elliptical cross-section faces the front and rear direction. The water inlet part 663 has a structure in which the inlet exit 6633 communicates with the first space 6610 located away from the center of the filter member 63. Therefore, in this structure, the major axis L1 of the elliptical cross-section of the water inlet part 663 is disposed so that the major axis L1 of the elliptical cross-section of the water inlet part 663 faces the front and rear direction. Therefore, the water inlet part 663 communicates with the first space 6610 over the widest area, so that water flows in smoothly through the water inlet part 663. In addition, interference with the inner surface of the filter cover 66, which is inclined due to the disposition direction of the elliptical cross-section of the water inlet part 663, can also be minimized, and water flows smoothly in the circumferential direction of the filter member 63 through the narrow space.

If the major axis L1 of the elliptical cross-section of the water inlet part 663 is formed in the left and right direction, the area overlapping with the first space 6610 is reduced, thereby reducing the water inlet efficiency. In addition, the flow path of the inlet exit 6633 communicating with the first space 6610 may be excessively bent, thereby making the water flow toward the first space 6610 not smooth.

In addition, when the major axis L1 of the elliptical cross-section of the water inlet part 663 is formed in the left and right direction, the area overlapping with the first space 6610 unnecessarily increases for the function of the water inlet part 663, thereby hindering the discharge of purified water through the second space 6651 and thus hindering the flow of discharged water.

In addition, the water outlet part 664 can be disposed so that the major axis L2 of the elliptical cross-section faces left and right direction. The water outlet part 664 has a structure in which the outlet entrance 6643 communicates with the second space 6651 through which purified water is discharged. In this disposition, the major axis L2 of the elliptical cross-section of the water outlet part 664 can face left and right direction. Therefore, the water outlet part 664 communicates with the second space 6651 over the widest area, so that water is discharged smoothly through the water outlet part 664.

In other words, based on the width Wf of the second space 6651 through which purified water flows out of the filter member 63, the water outlet part 664 has an disposition direction in which it overlaps the second space 6651 by a maximum width WL, and the water inlet part 663 has an disposition direction in which it can overlap the second space 6651 by a minimum width Ws. In addition, the disposition direction of the water inlet part 663 can overlap the first space by a maximum area. In this way, the elliptical cross-section shapes of the water inlet part 663 and the water outlet part 664 have directionality in order to provide an efficient disposition for water inlet and water outlet.

In addition, since the elliptical cross-sectional shapes of the water inlet part 663 and the water outlet part 664 are disposed in a direction intersecting each other, the filter cover 66 can be firmly coupled to the head 50 in all directions, and the torque generation of the housing 600 that is rotated can be made easier. In addition, since the elliptical cross-sectional shapes of the water inlet part 663 and the water outlet part 664 have directionality, the filter cover 66 can be prevented from the moving in the front, rear, left, and right directions even during the rotation of the housing 600, and thus water leakage from the water inlet part 663 and the water outlet part 664 can be prevented.

In addition, when the water inlet part 663 and water outlet part 664 are viewed from above, the elliptical cross-sectional shape has directionality, so that the alignment state of the water inlet part 663 and water outlet part 664 can be accurately identified, and when coupled with the head 50, coupling and insertion in the correct direction can be induced.

Meanwhile, the present disclosure may have various other embodiments in addition to the above-described embodiments. Hereinafter, other embodiments of the present disclosure will be described with reference to the drawings. Among the configurations of other embodiments of the present disclosure, the same configurations as the above-described embodiments may be omitted for detailed description and illustration, and may be described using the same drawing reference numerals. In other words, only the structures that are different from the above-described embodiments will be described below, and other configurations that are not described may be the same as the above-described embodiments. In addition, configurations that are not illustrated or described in detail can be referenced in the drawings of the above-described embodiments.

Figure 39:
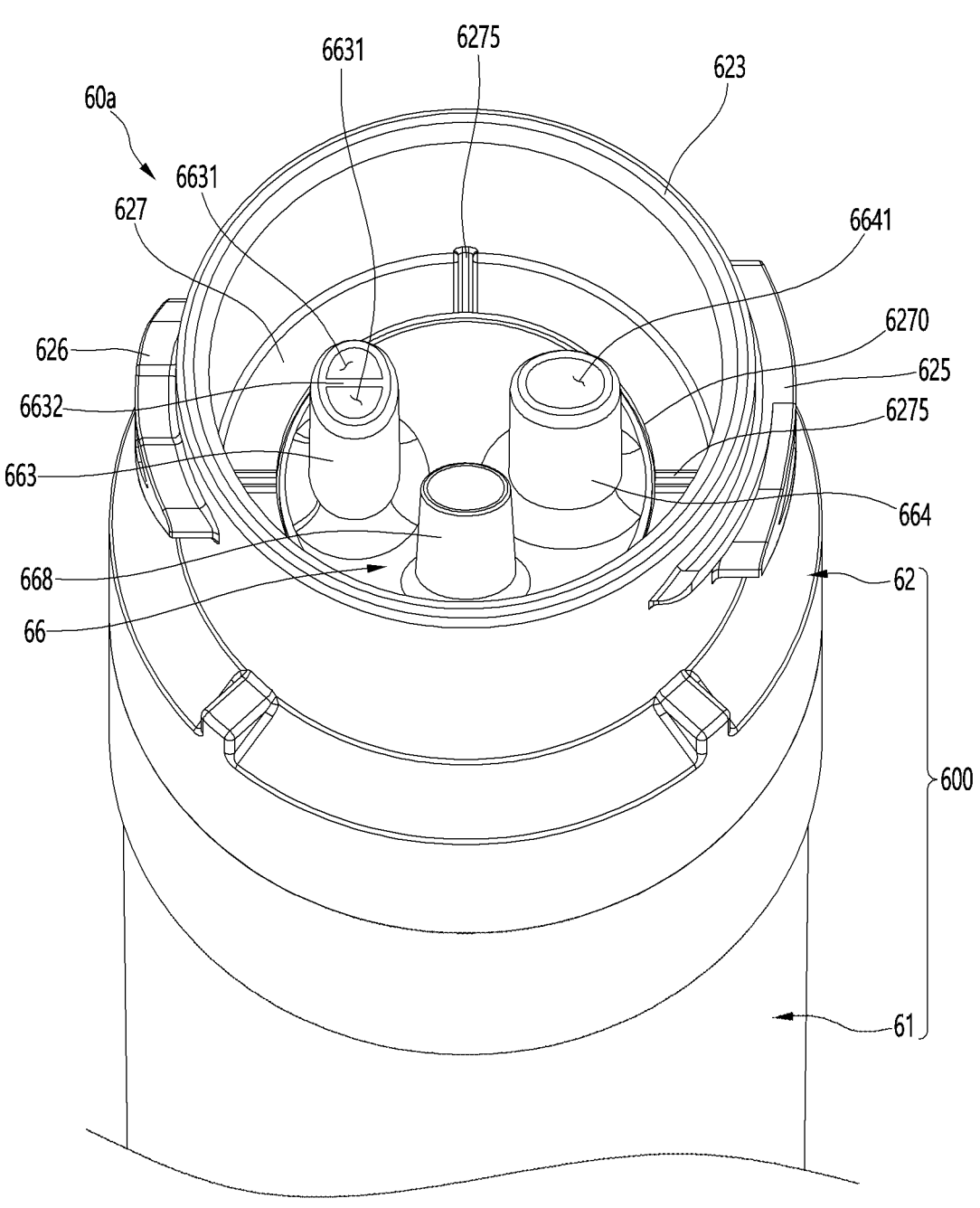
FIG. 39 is a perspective view illustrating a filter of a filter assembly according to a second embodiment of the present disclosure.

FIG. 39 is a perspective view illustrating a filter of a filter assembly according to a second embodiment of the present disclosure.

As illustrated, the filter assembly 40 according to the second embodiment of the present disclosure may be configured to include a head 50 and a filter 60a. The filter 60a may be configured to be capable of being attached to and detached from the head 50. In addition, compared to the first embodiment described above, there is a difference in that the rotation protrusion 669 of the above-described embodiment is not formed on the filter cover 66 of the filter 60a, and the remaining configuration may be the same.

The filter 60a may have an outer shape formed by a lower housing 61 and an upper housing 62, and the upper housing 62 may be provided with a filter cover 66. The filter cover 66 shields an upper opening 6270 of the upper housing 62, and an upper surface may be exposed through the upper opening 6270. In addition, a water inlet part 663 and a water outlet part 664 may be formed on the upper surface of the filter cover 66.

The water inlet part 663 and water outlet part 664 may have an elliptical cross-sectional structure. In addition, the water inlet part 663 and water outlet part 664 may have the same cross-sectional size. In addition, the water inlet part 663 and water outlet part 664 may be disposed so that their major axes face different directions. For example, the major axis of the water inlet part 663 and the major axis of the water outlet part 664 may intersect each other perpendicularly. For example, the water inlet part 663 may have a minor axis of its cross-section disposed in the left and right direction, and the water outlet part 664 may have a major axis of its cross-section disposed in the left and right direction. In addition, the interior of the water inlet part 663 may be divided by an inlet contact part 6632. The inlet contact part 6632 may extend along the minor axis of the water inlet part 663.

In addition, a sensing member 668 may be formed on the upper surface of the filter cover 66. The sensing member 668 may protrude upward and be inserted into a sensing hole 5327 formed in the head 50. The filter sensing device 55 provided in the sensing hole 5327 may sense the sensing member 668 to determine whether the filter 60 is mounted. In addition, when it is determined that the filter 60 is mounted, the water supply valve 102 may be opened.

The sensing member 668 may be provided between the water inlet part 663 and the water outlet part 664, and may be positioned forward with respect to the center of the filter cover 66. In addition, the sensing member 668 may be inserted into the inside of the sensing hole 5327 and may be in close contact with the inner surface of the sensing hole 5327. Therefore, even if the rotation protrusion 669 is omitted from the filter cover 666, the water inlet part 663 and the water outlet part 664 may be prevented from moving by the firm coupling of the sensing member 668 and the sensing hole 5327 when the housing 600 rotates.

A marker 6275 may be formed on the upper surface of the first protrusion part 627 where the upper opening 6270 is formed. A pair of the markers 6275 may be formed on the left and right sides, and may be positioned on the same extension line as the water inlet part 663 and the water outlet part 664. Therefore, the user can visually check the alignment status of the filter cover 66 through the disposition of the marker 6275 and the water inlet part 663 and the water outlet part 664.

In addition, a first guide protrusion 625 and a second guide protrusion 626 may be formed on the circumferential surface of the upper housing 62. The first guide protrusion 625 and the second guide protrusion 626 may be positioned facing each other. In addition, before the filter 60a is mounted, the water inlet part 663 and the water outlet part 664 may be aligned on the same extension line between the first guide protrusion 625 and the second guide protrusion 626. In addition, when the filter 60a is mounted on the head 50, the filter cover 66 may be maintained in a fixed state, and the housing 600 may be rotated so that the first guide 523 and the second guide 524 may be positioned to intersect the disposition of the water inlet part 663 and the water outlet part 664.

Meanwhile, although not illustrated, the head 50 may be configured such that the water inlet part 663 and water outlet part 664 are inserted so that the flow paths are connected to each other. In addition, compared to the above-described embodiment, the rotation groove 5239 may not be formed, and the remaining structure of the head 50 may be the same.

Figure 40:
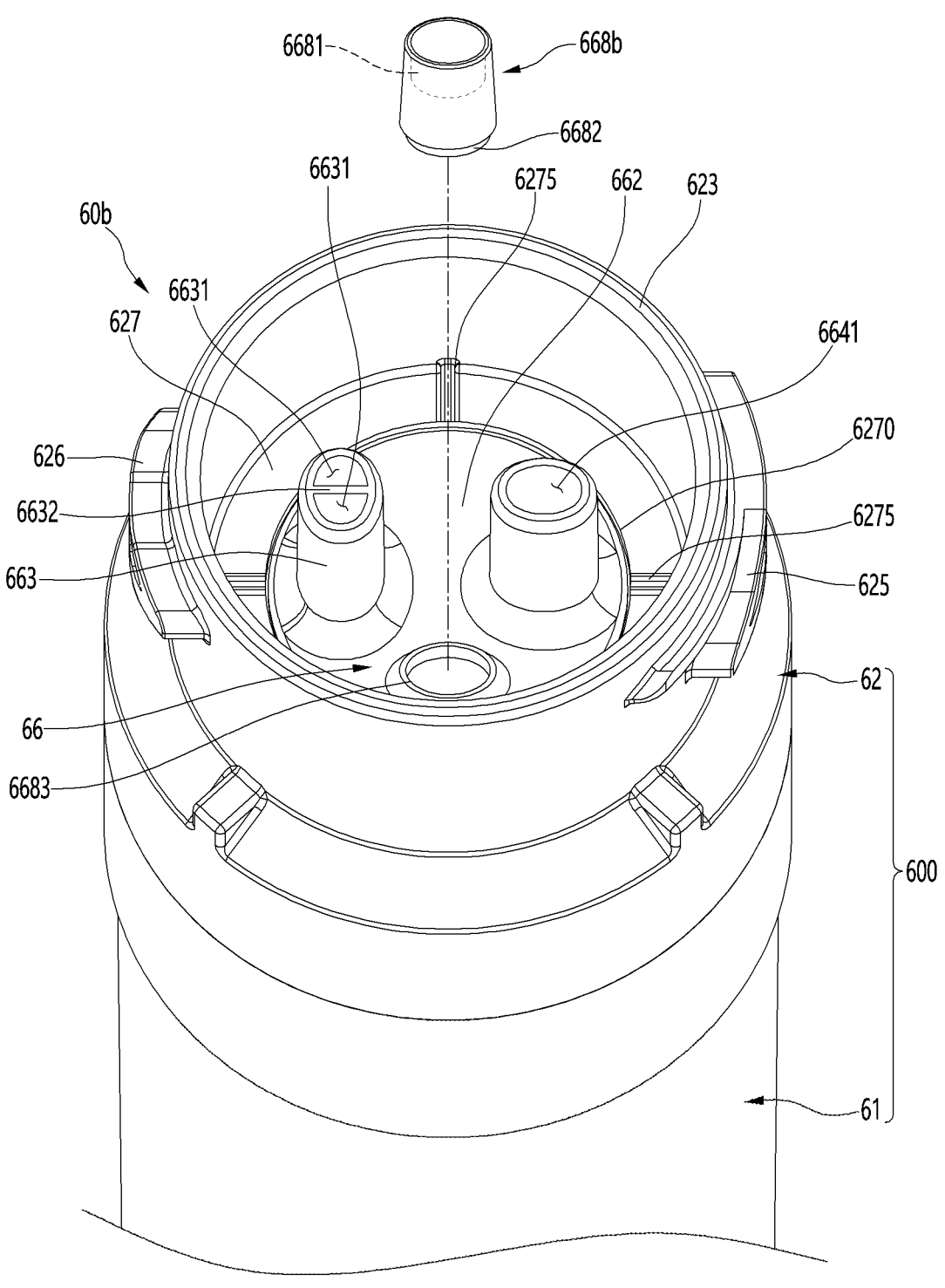
FIG. 40 is a perspective view illustrating a filter of a filter assembly according to a third embodiment of the present disclosure.

FIG. 40 is a perspective view illustrating a filter of a filter assembly according to a third embodiment of the present disclosure.

As described above, the filter assembly 40 according to the third embodiment of the present disclosure may be configured to include a head 50 and a filter 60b. The filter 60b may be configured to be capable of being attached to and detached from the head 50. In addition, compared to the first embodiment described above, the filter cover 66 has a difference in that the rotation protrusion 669 of the first embodiment described above is not formed and the sensing member 668b is detachable, and the remaining configuration may be configured in the same manner.

The filter 60b may have an outer shape formed by a lower housing 61 and an upper housing 62, and the upper housing 62 may be provided with a filter cover 66. The filter cover 66 shields an upper opening 6270 of the upper housing 62, and an upper surface may be exposed through the upper opening 6270. In addition, a water inlet part 663 and a water outlet part 664 may be formed on the upper surface of the filter cover 66.

The water inlet part 663 and water outlet part 664 may have an elliptical cross-sectional structure. In addition, the water inlet part 663 and water outlet part 664 may have the same cross-sectional size. In addition, the water inlet part 663 and water outlet part 664 may be disposed so that their major axes face different directions. For example, the mounting of the water inlet part 663 and the water outlet part 664 may be disposed so that their cross-sectional shapes intersect each other. For example, the water inlet part 663 may have its cross-sectional minor axis disposed in the left and right direction, and the water outlet part 664 may have its cross-sectional major axis disposed in the left and right direction. In addition, the interior of the water inlet part 663 may be divided by an inlet contact part 6632. The inlet contact part 6632 may extend along the minor axis of the filter cover 66.

In addition, a sensing member 668b may be formed on the upper surface of the filter cover 66. A magnet 6681 may be provided on at least a part of the sensing member 668b. The sensing member 668b may be separately molded and mounted on the filter cover 66. For example, a fastening part 6682 may be formed on the lower end of the sensing member 668b, and the fastening part 6682 may be inserted into a fastening hole 6683 formed on the inner upper surface 662 of the filter cover 666. For example, the fastening part 6682 and the fastening hole 6683 may have corresponding screw structures, and thus, the sensing member 668b may be mounted on the fastening hole 6683 by rotation.

The sensing member 668b may be inserted into a sensing hole 5327 formed in the head 50 while protruding upward while mounted on the filter cover 66. The filter sensing device 55 provided in the sensing hole 5327 may sense the sensing member 668b to determine whether the filter 60 is mounted. Then, when it is determined that the filter 60 is mounted, the water supply valve 102 may be opened.

The sensing member 668b may be provided between the water inlet part 663 and the water outlet part 664, and may be positioned forward with respect to the center of the filter cover 66. In addition, the sensing member 668b may be inserted into the inside of the sensing hole 5327 and may be in close contact with the inner surface of the sensing hole 5327. Therefore, even if the rotation protrusion 669 is omitted from the filter cover 666, the water inlet part 663 and the water outlet part 664 may be prevented from moving by the firm coupling of the sensing member 668b and the sensing hole 5327 when the housing 600 rotates.

A marker 6275 may be formed on the upper surface of the first protrusion part 627 where the upper opening 6270 is formed. A pair of the markers 6275 may be formed on the left and right sides, and may be positioned on the same extension line as the water inlet part 663 and the water outlet part 664. Therefore, the user can visually check the alignment status of the filter cover 66 through the disposition of the marker 6275 and the water inlet part 663 and the water outlet part 664.

In addition, a first guide protrusion 625 and a second guide protrusion 626 may be formed on the circumferential surface of the upper housing 62. The first guide protrusion 625 and the second guide protrusion 626 may be positioned facing each other. In addition, before the filter 60b is mounted, the water inlet part 663 and the water outlet part 664 may be aligned on the same extension line between the first guide protrusion 625 and the second guide protrusion 626. In addition, when the filter 60b is mounted on the head 50, the filter cover 66 may be maintained in a fixed state, and the housing 600 may be rotated so that the first guide 523 and the second guide 524 may be positioned to intersect the disposition of the water inlet part 663 and the water outlet part 664.

Figure 41:
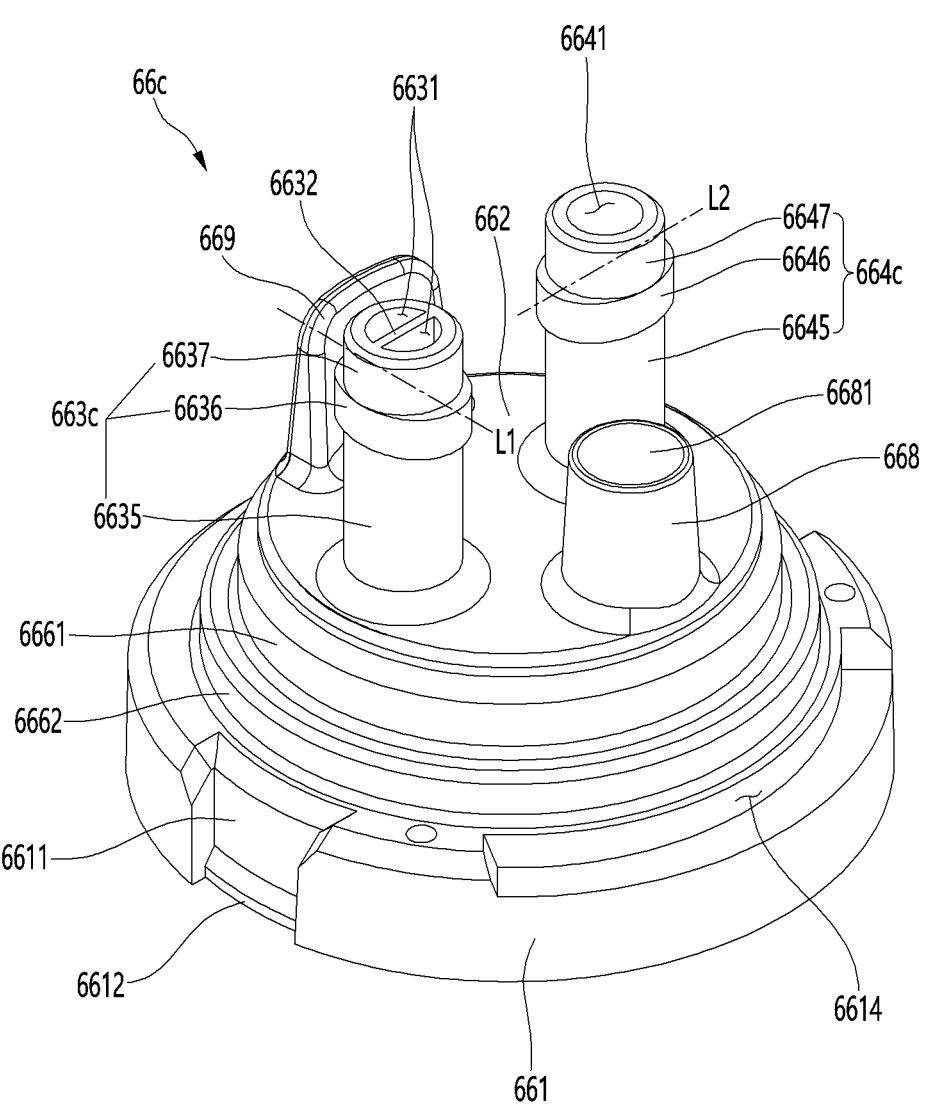
FIG. 41 is a perspective view illustrating a filter cover of a filter assembly according to a fourth embodiment of the present disclosure.
Figure 42:
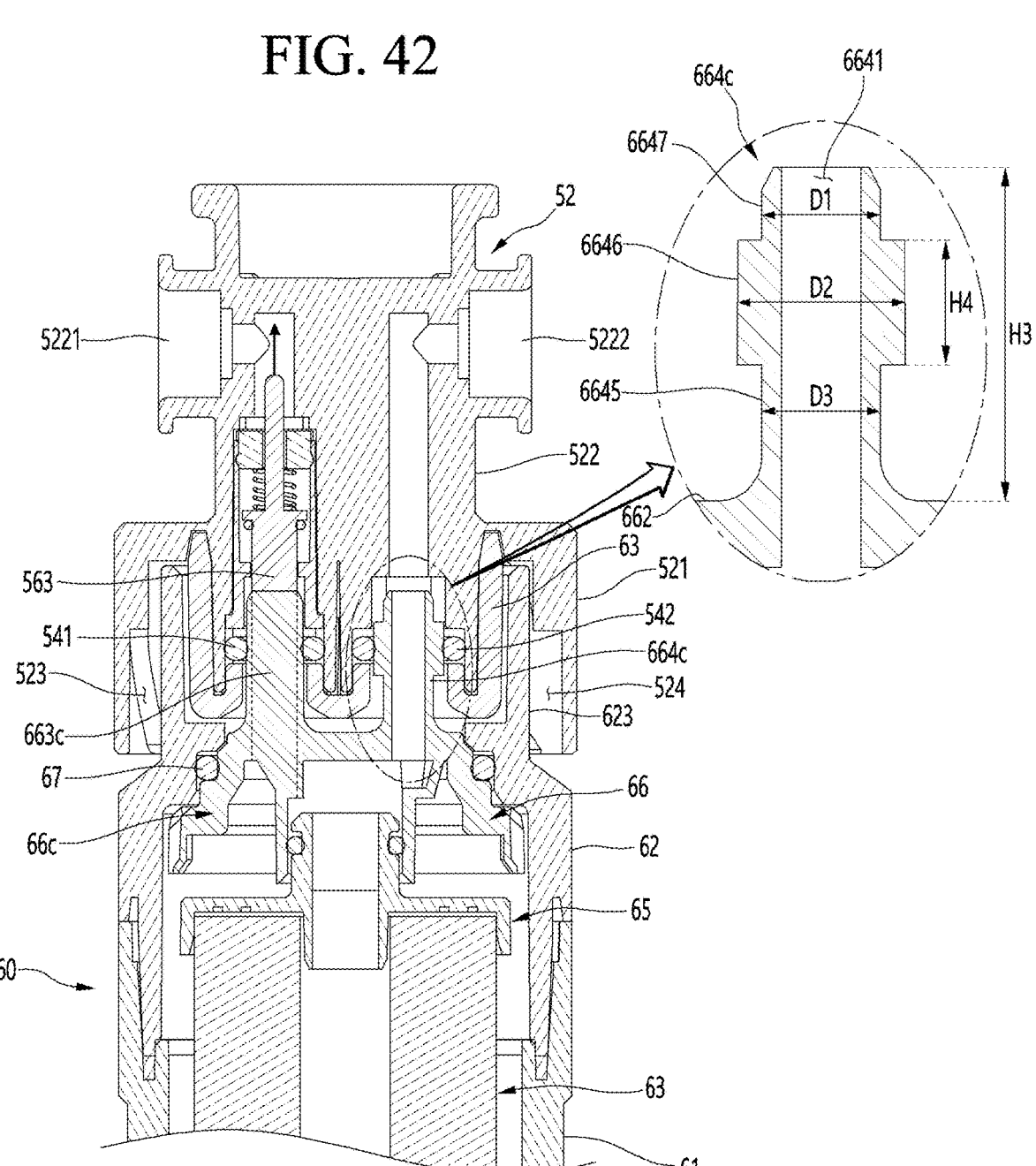
FIG. 42 is a cross-sectional view illustrating a state where the water inlet part and the water outlet part of the filter assembly are connected.

FIG. 41 is a perspective view illustrating a filter cover of a filter assembly according to a fourth embodiment of the present disclosure, and FIG. 42 is a cross-sectional view illustrating a state where the water inlet part and the water outlet part of the filter assembly are connected.

As illustrated, the filter assembly 40 according to the fourth embodiment of the present disclosure may be configured to include a head 50 and a filter 60. The filter 60 may be configured to be capable of being attached to and detached from the head 50. In addition, compared to the first embodiment described above, there is only a difference in the shape of the water inlet part 663c and the water outlet part 664c formed on the filter cover 66c, and the remaining configuration may be the same as the embodiment described above.

The filter 60 includes an upper housing 62 that is detachably coupled to the head 50, and an upper opening 6270 may be formed in the upper housing 62. In addition, a filter cover 66c that shields the upper opening 6270 may be provided in the upper housing 62. The filter cover 66c is maintained in a fixed state when coupled with the head 50, and the upper housing 62 may be provided to be rotatable with respect to the filter cover 66c.

A water inlet part 663c and a water outlet part 664c may be formed on the upper surface of the filter cover 66c. The water inlet part 663c and the water outlet part may be formed in a hollow tube shape and may be inserted into the inlet hole 5321 and the outlet hole 5323 of the head 50. The interior of the water inlet part 663c may be divided at least partially by the inlet contact part 6632. In addition, the water inlet part 663c and the water outlet part 664c may be sealed by the inlet ring 541 and the outlet ring 542 while being inserted into the inlet hole 5321 and the outlet hole 5323.

Meanwhile, the water inlet part 663c and the water outlet part 664c may be formed with different cross-sectional shapes in some sections of the entire section. In detail, the water inlet part 663c and the water outlet part 664c may form a seal ring part 6636, 6646 having an elliptical cross-section in some section of the height H4 of the entire upper and lower height H3. In addition, the remaining portions of the water inlet part 663c and the water outlet part 664c excluding the seal ring parts 6636, 6646 may have a circular cross-section.

The seal ring part 6636, 6646 may protrude outwardly and may be sealed by coming into contact with the inlet ring 541 and the outlet ring 542. For example, the seal ring part 6636 may be spaced apart from the upper and lower ends of the water inlet part 663c and the water outlet part 664c, and may be formed to include at least a part coming into contact with the inlet ring 541 and the outlet ring 542.

The upper and lower heights of the seal ring parts 6636, 6646 may be formed to be greater than the thicknesses of the inlet ring 541 and the outlet ring 542, and may be formed to extend from the inlet ring 541 and the outlet ring 542 by a set distance in the vertical direction. For example, the upper and lower heights H4 of the seal ring parts 6636 may be formed to have a width that is at least ⅓ of the overall upper and lower heights H3 of the water inlet part 663c and the water outlet part 664c.

For example, the water inlet part 663c may include an inlet lower part 6635, an inlet upper part 6637, and an inlet seal ring part 6636. The inlet lower part 6635 may extend from the inner upper surface 662 and may extend to the lower end of the inlet seal ring part 6636. In addition, the inlet upper part 6637 may extend from the upper end of the inlet seal ring part 6636 to the upper end of the water inlet part 663c. In addition, the inlet seal ring part 6636 may be positioned between the inlet upper part 6637 and the inlet lower part 6635. In this case, the inlet seal ring part 6636 may be positioned at a height corresponding to the inlet ring 541.

In addition, the inlet upper part 6637 and the inlet lower part 6635 may be formed with a circular cross-section. In addition, the inlet seal ring part 6636 may protrude further outward than the inlet upper part 6637 and the inlet lower part 6635. For example, the diameters D1, D3 of the inlet upper part 6637 and the inlet lower part 6635 may be equal to or smaller than the minor axis of the inlet seal ring part 6636. In addition, the distance D2 of the major axis of the inlet seal ring part 6636 may be formed to be larger than the diameters D1, D3 of the inlet upper part 6637 and the inlet lower part 6635.

In addition, the water outlet part 664c may include an outlet lower part 6645, an outlet upper part 6647, and an outlet seal ring part 6646. The outlet lower part 6645 may extend from the inner upper surface 662 and may extend to the lower end of the outlet seal ring part 6646. In addition, the outlet upper part 6647 may extend from the upper end of the outlet seal ring part 6646 to the upper end of the water outlet part 664c. In addition, the outlet seal ring part 6646 may be positioned between the outlet upper part 6647 and the outlet lower part 6645. At this time, the outlet seal ring part 6646 may be positioned at a height corresponding to the outlet ring 452.

In addition, the outlet upper part 6647 and the outlet lower part 6645 may be formed with a circular cross-section. In addition, the outlet seal ring part 6646 may protrude further outward than the outlet upper part 6647 and the outlet lower part 6645. For example, the diameters D1, D3 of the outlet upper part 6647 and the outlet lower part 6645 may be equal to or smaller than the minor axis of the outlet seal ring part 6646. In addition, the length D2 of the major axis of the outlet seal ring part 6646 may be formed to be larger than the diameters D1, D3 of the outlet upper part 6647 and the outlet lower part 6645.

Meanwhile, the seal ring part 6636, 6646 may be formed integrally with the water inlet part 663c and outlet part 664c, and may be molded together when the filter cover 66c is molded.

In addition, the major axes L1, L2 of the seal ring parts 6636, 6646 formed in the water inlet part 663c and the water outlet part 664c may be formed to face different directions. In addition, the inlet ring 541 and the outlet ring 542 may be formed in an elliptical shape corresponding to the seal ring part 6636. In addition, the major axes of the inlet ring 541 and the outlet ring 542 may also be disposed to face different directions, like the disposition of the seal ring parts 6636, 6646. Therefore, when the filter 60 is mounted on the head 50, the seal ring parts 6636, 6646 may be in a state where they come into contact with the corresponding inlet ring 541 and outlet ring 542, respectively. In addition, the inlet hole 5321 and the outlet hole 5323 may also be formed in an elliptical shape corresponding to the seal ring part 6636, 6646 to prevent incorrect mounting of the filter 60.

In other words, the water inlet part 663c and the water outlet part 664c can be formed to have directionality by the seal ring part 6636, 6646. In addition, the alignment state of the filter 60 can be checked through the positions of the water inlet part 663c and the water outlet part 664c, and the coupling with the head 50 can be made easier.

Figure 43:
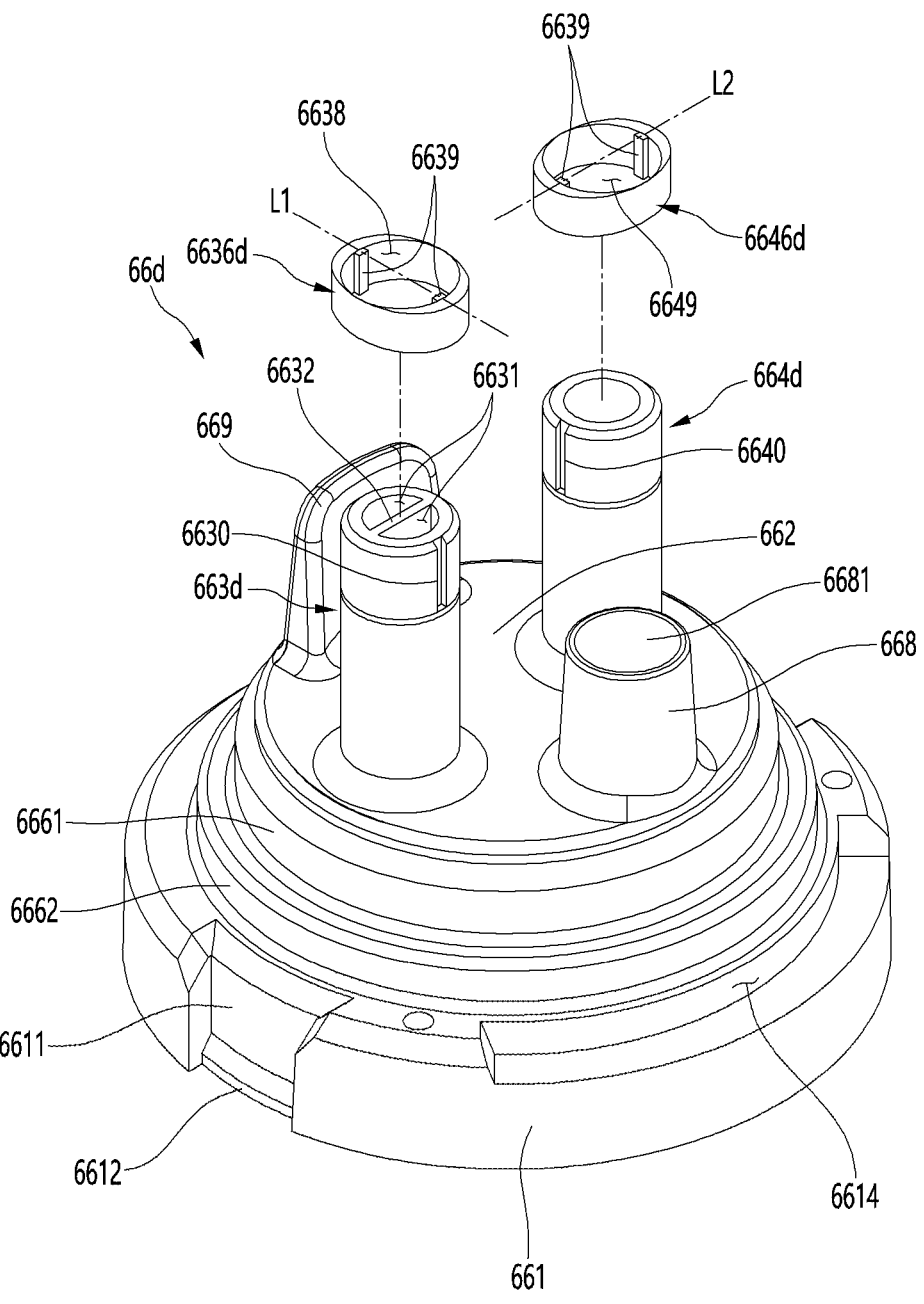
FIG. 43 is an exploded perspective view illustrating a state where a seal ring part of a filter assembly according to a fifth embodiment of the present disclosure is separated.
Figure 44:
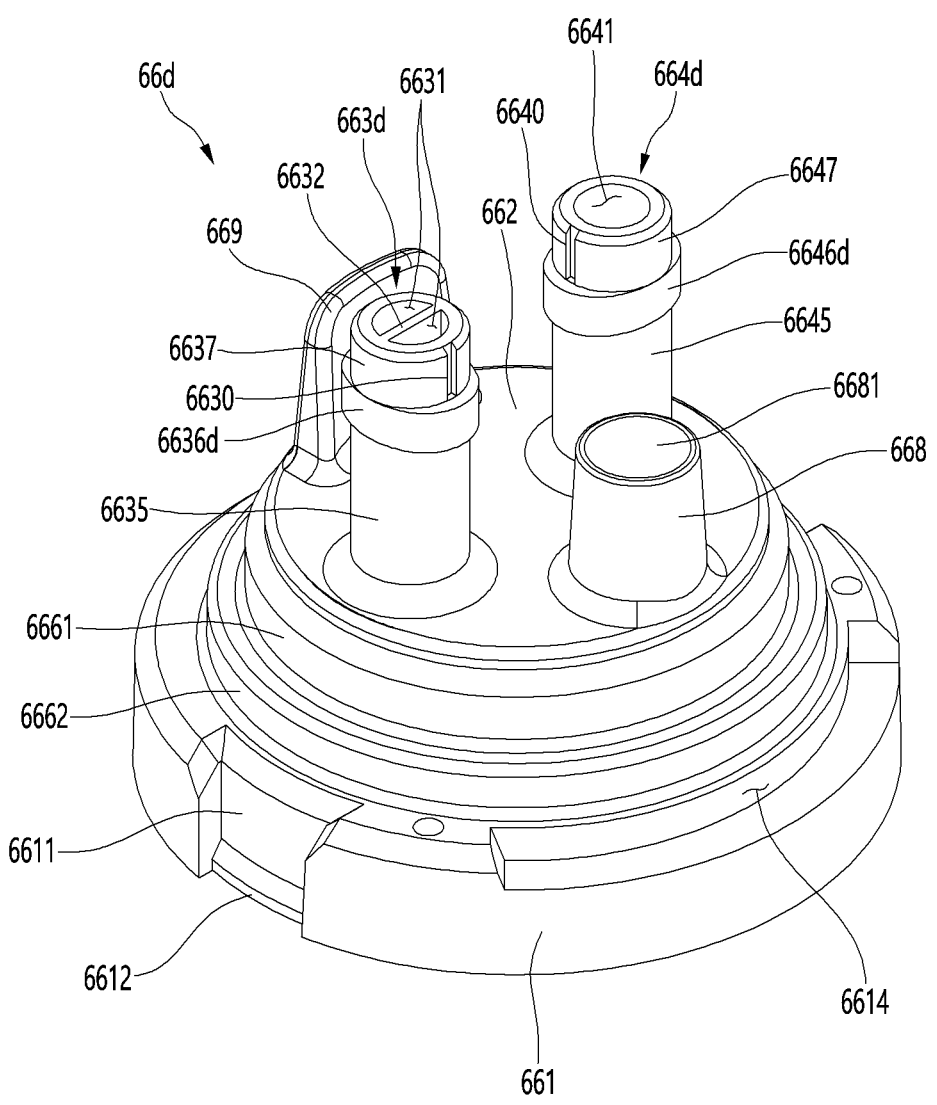
FIG. 44 is a perspective view illustrating the filter cover.
Figure 45:
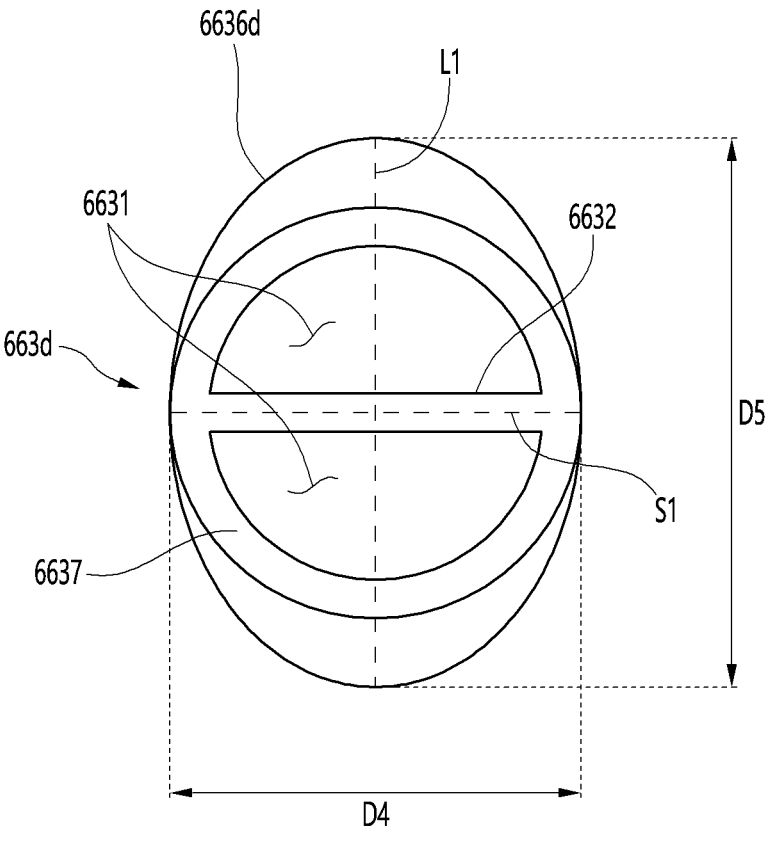
FIG. 45 is a plan view illustrating the water inlet part of the filter cover.

FIG. 43 is an exploded perspective view illustrating a state where a seal ring part of a filter assembly according to a fifth embodiment of the present disclosure is separated, FIG. 44 is a perspective view illustrating the filter cover, and FIG. 45 is a plan view illustrating the water inlet part of the filter cover.

As illustrated, the filter assembly 40 according to the fifth embodiment of the present disclosure may be configured to include a head 50 and a filter 60. The filter 60 may be configured to be capable of being attached to and detached from the head 50. In addition, compared to the fourth embodiment described above, there is only a difference in the shape of the water inlet part 663d and water outlet part 664d formed on the filter cover 66d, and the remaining configuration may be the same as the fourth embodiment described above.

The filter 60 includes an upper housing 62 that is detachably coupled to the head 50, and an upper opening 6270 may be formed in the upper housing 62. In addition, a filter cover 66d that shields the upper opening 6270 may be provided in the upper housing 62. The filter cover 66d is maintained in a fixed state when coupled with the head 50, and the upper housing 62 may be provided so as to be rotatable with respect to the filter cover 66d.

A water inlet part 663d and a water outlet part 664d may be formed on the upper surface of the filter cover 66d. The water inlet part 663d and the water outlet part 664d may be formed in a hollow tube shape and may be inserted into the inlet hole 5321 and the outlet hole 5323 of the head 50. The interior of the water inlet part 663d may be divided at least in part by the inlet contact part 6632.

In addition, the water inlet part 663d and the water outlet part 664d can be sealed by the inlet ring 541 and the outlet ring 542 while inserted into the inlet hole 5321 and the outlet hole 5323.

The water inlet part 663d and the water outlet part 664d can be formed in the same shape as the fourth embodiment described above, and the seal ring part 6636d, 6646d can be configured to be capable of being attached and detached.

For example, the water inlet part 663d may be composed of an inlet upper part 6637, an inlet lower part 6635, and an inlet seal ring part 6636d, and the water outlet part 664d may be composed of an outlet upper part 6647, an outlet lower part 6645, and an outlet seal ring part 6646d. At this time, the inlet seal ring part 6636d and the outlet seal ring part 6646d may be formed in an elliptical shape that contacts the inlet ring 541 and the outlet ring 542.

In addition, the inlet upper part 6637 and the inlet lower part 6635 excluding the inlet seal ring part 6636d may have a circular cross-section. In addition, the outlet upper part 6647 and the outlet lower part 6645 excluding the outlet seal ring part 6646d may also have a circular cross-section.

Accordingly, the inlet upper part 6637 has a circular cross-section with a predetermined diameter D4, which may be the same as the length of the minor axis S1 of the seal ring part 6636d, 6646d. In addition, the major axis of the inlet seal ring part 6636d may be formed to have a longer length D5 than the diameter D4 of the inlet upper part 6637. Accordingly, when the water inlet part 663d is viewed from above, the end part of the minor axis S1 of the inlet seal ring part 6636d may be positioned at the same position as the outer surface of the inlet upper part 6637, and the end part of the major axis L1 of the inlet seal ring part 6636d may protrude further than the outer surface of the inlet upper part 6637. The outlet seal ring part 6646d of the water outlet part 664d may also have the same structure.

Meanwhile, the seal ring part 6636d, 6646d may be molded separately from the water inlet part 663d and the water outlet part 664d. In addition, the seal ring part 6636d, 6646d may be mounted on the water inlet part 663d and the water outlet part 664d. At this time, the seal ring part 6636d, 6646d may be mounted so as to be disposed with directionality.

For example, the water inlet part 663d and the water outlet part 664d may be provided with mounting grooves 6630, 6640 extending downward from the upper ends of the water inlet part 663d and the water outlet part 664d. At this time, the mounting grooves 630, 6640 formed in the water inlet part 663d and the water outlet part 664d may be positioned at different positions so that the major axes of the seal ring parts 6636d, 6646d face different directions when the seal ring parts 6636d, 6646d are mounted. In addition, the mounting grooves 630, 6640 may be extended from the upper ends of the water inlet part 6635 and the water outlet part 664d to the upper end of the inlet lower part 6635 and the upper end of the outlet lower part 6645, respectively.

In addition, a through-hole 6638, 6648 through which the water inlet part 663d and the water outlet part 664d pass through may be formed in the seal ring part 6636d, 6646d. In addition, a mounting protrusion 6639, 6649 inserted into the mounting groove 630, 6640 may be formed on the inner surface of the through-hole 6638, 6648. When the mounting protrusion 6639, 6649 is slidably inserted and mounted in the corresponding mounting groove 630, 6640, the seal ring part 6636d, 6646d may be positioned in a predetermined position and direction.

In detail, the major axes of the seal ring parts 6636d, 6646d mounted on the water inlet part 663d and the water outlet part 664d may be disposed to face different directions. For example, the seal ring parts 6636d, 6646d of the water inlet part 663d and the seal ring parts 6636d, 6646d of the water outlet part 664d may extend in a direction in which their major axes intersect each other.

Meanwhile, the inlet ring 541 and the outlet ring 542 may be formed in an elliptical shape corresponding to the seal ring part 6636d, 6646d. In addition, the major axes of the inlet ring 541 and the outlet ring 542 may also be disposed to face different directions, similar to the disposition of the seal ring parts 6636d, 6646d.

Figure 46:
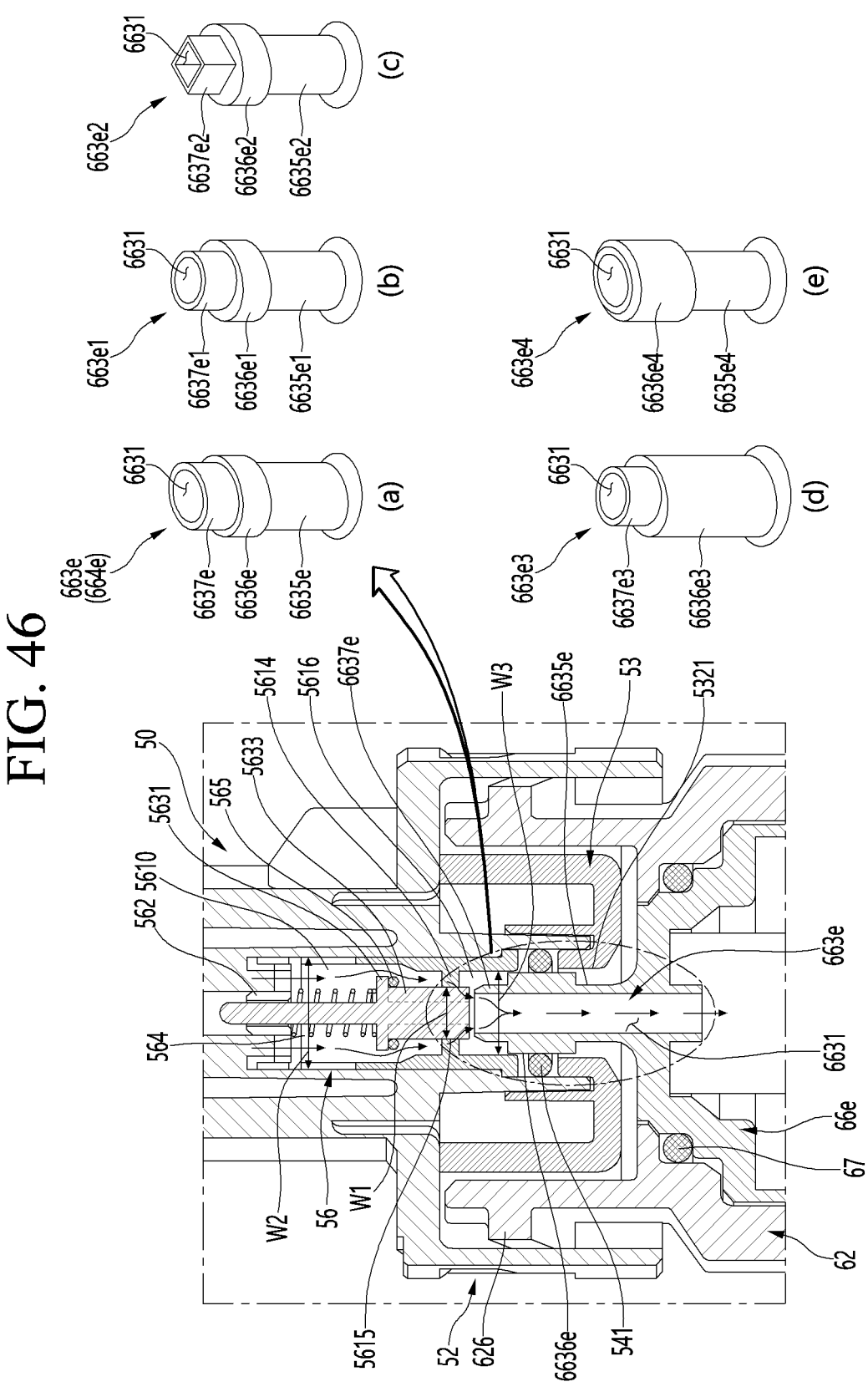
FIG. 46 (a) to (e) are views illustrating various examples of the water inlet part, which is one component of a filter assembly according to the sixth embodiment of the present disclosure.

FIG. 46 is a view illustrating various examples of the water inlet part, which is one component of a filter assembly according to the sixth embodiment of the present disclosure.

As illustrated, the filter assembly 40 according to the sixth embodiment of the present disclosure may have various shapes of the water inlet part and the water outlet part inserted into the head 50.

The head 50 may be formed with the inlet flow path 5241 and the outlet flow path 5251. In addition, the head 50 may be coupled with an inner head 50, and the inner head 50 may be formed with an inlet hole 5321 and an outlet hole 5323.

In addition, the filter 60 includes an upper housing 62 coupled to the head 50, and a filter cover 66e can be rotatably coupled to the upper housing 62. In addition, the filter cover 66e is exposed through the opened upper surface of the upper housing 62, and a water inlet part 663e and a water outlet part 664e can be formed to protrude upward on the upper surface of the filter cover 66e. The water inlet part 663e and the water outlet part 664e are formed in an elliptical shape in cross section, and the major axes of the cross sections of the water inlet part 663e and the water outlet part 664e can be disposed to face different directions.

The inlet hole 5321 and outlet hole 5323 can communicate with the inlet flow path 5241 and the outlet flow path 5251. In addition, the inlet hole 5321 and the outlet hole 5323 can be opened in the same elliptical shape as the seal ring part 6636e of the water inlet part 663e and the water outlet part 664e. In addition, an inlet ring 541 and an outlet ring 542 that come into contact with the seal ring part 6636e are provided inside the inlet hole 5321 and the outlet hole 5323 to prevent water leakage.

The inlet flow path 5241 may be equipped with a valve 56. The valve 56 may include a valve case 561 mounted on the inlet flow path 5241, a piston 563 that moves up and down inside the valve case 561, an elastic member that provides elasticity to the piston 563, a piston ring 565 that comes into contact with the piston 563 to form a seal, and a valve cap 562 that guides the movement of the piston 563 and forms a water inlet passage.

The valve 56 can move the piston 563 upward by making contact with the upper end of the water inlet part 663e when the filter 60 is coupled, and the flow path inside the valve 56 can be opened by the movement of the piston 563. In addition, when the filter 60 is not mounted, the piston 563 can keep the flow path inside the valve 56 closed by the elastic force of the spring 564.

Meanwhile, the valve case 561 may be formed with a support part 5614 that divides the inside of the valve case 561 in the vertical direction, and a circular case passage 5615 that is opened and closed by the piston 563 may be formed in the support part 5614. The diameter W1 of the case passage 5615 may be formed as a circle smaller than the diameter of the piston 563. In addition, the diameter W1 of the case passage 5615 may be formed smaller than the lengths W2, W3 of the major axes of the piston accommodation part 5610 and the inlet accommodation part 5616.

In addition, an inlet receiving part into which the water inlet part 663e is inserted may be formed at the lower part of the support part 5614. The inlet accommodation part 5616 may be formed with an elliptical cross-section corresponding to the water inlet part 663e. In addition, a piston accommodation part 5610 in which the piston 563 and the spring 564 are disposed may be formed at the upper part of the support part 5614. The piston accommodation part 5610 may be formed in an elliptical shape having a length W3 of the major axis corresponding to the inlet accommodation part 5616. The length W2 of the major axis of the piston accommodation part 5610 may be formed to be larger than the length W3 of the major axis of the inlet accommodation part 5616.

Meanwhile, the shape of the water inlet part 663e formed in the filter 60 may be of various shapes in consideration of the shape of the inside of the head 50. In addition, although not illustrated, one of the examples of a plurality of inlet contact parts illustrated in FIG. 48 may be formed on the upper end of the water inlet part 663e.

In addition, since the water outlet part 664e is also formed in the same outer appearance with only a difference in the cross-sectional disposition direction of the elliptical shape, the following description will be based on various shapes of the water inlet part 663e. In other words, although not illustrated, the water outlet part 664e may have the same outer appearance as various shapes of the water inlet part 663e described below.

In detail, as illustrated in (a) of FIG. 46, the water inlet part 663e may include an inlet lower part 6635e, a seal ring part 6636e, and an inlet upper part 6637e. The inlet lower part 6635e may extend from the lower part of the water inlet part 663e to the seal ring part 6636e, and the inlet upper part 6637e may extend from the upper part of the seal ring part 6636e to the upper part of the water inlet part 663e. The seal ring part 6636e may be positioned between the inlet upper part 6637e and the inlet lower part 6635e. In addition, the seal ring part 6636e may be molded integrally with the water inlet part 663e as in the fourth or fifth embodiment described above, or may be formed separately and then coupled.

The inlet upper part 6637e, the inlet lower part 6635e, and the seal ring part 6636e may all have an elliptical cross-section. In addition, the cross-sections of the inlet upper part 6637e, the inlet lower part 6635e, and the seal ring part 6636e may all be disposed so that their major axes extend in the same direction.

At this time, the inlet upper part 6637e and the inlet lower part 6635e may be formed such that the length of the major axis is smaller than the length of the major axis of the seal ring part 6636e. In addition, the inlet upper part 6637e and the inlet lower part 6635e may have the same size and shape. Accordingly, at least a part of the seal ring part 6636e may be formed to protrude further outward than the inlet upper part 6637e and the inlet lower part 6635e.

Accordingly, when the water inlet part 663e is inserted into the inlet hole 5321, the seal ring part 6636e can be in contact with the inlet ring 541 to create a seal, and the upper end of the inlet upper part 6637e can press the contact part 5633 of the piston 563 to move the piston 563 upward.

In addition, as illustrated in (b) of FIG. 46, the water inlet part 663e1 may include an inlet lower part 6635e1, a seal ring part 6636e1, and an inlet upper part 6637e1. The inlet lower part 6635e1 may extend from the lower end of the water inlet part 663e1 to the seal ring part 6636e1, and the inlet upper part 6637e1 may extend from the upper end of the seal ring part 6636e1 to the upper end of the water inlet part 663e1. The seal ring part 6636e1 may be located between the inlet upper part 6637e1 and the inlet lower part 6635e1. In addition, the seal ring part 6636e1 may be molded integrally with the water inlet part 663e1 as in the fourth or fifth embodiment described above, or may be molded separately and then coupled.

The inlet upper part 6637e1 and the inlet lower part 6635e1 may have circular cross sections. In addition, the seal ring part 6636e1 may have an elliptical cross-section. At this time, the diameters of the inlet upper part 6637e1 and the inlet lower part 6635e1 may be formed smaller than the length of the major axis of the seal ring part 6636e1. For example, the diameters of the inlet upper part 6637e1 and the inlet lower part 6635e1 may be equal to the length of the minor axis of the seal ring part 6636e1. In addition, the inlet upper part 6637e1 and the inlet lower part 6635e1 may have the same size and shape. Accordingly, at least a part of the seal ring part 6636e1 may be formed to protrude further outward than the inlet upper part 6637e1 and the inlet lower part 6635e1.

Accordingly, when the water inlet part 663e1 is inserted into the inlet hole 5321, the seal ring part 6636e1 can be in contact with the inlet ring 541 to create a seal, and the upper end of the inlet upper part 6637e1 can press the contact part 5633 of the piston 563 to move the piston 563 upward.

In addition, as illustrated in (c) of FIG. 46, the water inlet part 663e2 may include an inlet lower part 6635e2, a seal ring part 6636e2, and an inlet upper part 6637e2. The inlet lower part 6635e2 may extend from the lower part of the water inlet part 663e2 to the seal ring part 6636e2, and the inlet upper part 6637e2 may extend from the upper end of the seal ring part 6636e2 to the upper end of the water inlet part 663e2. The seal ring part 6636e2 may be located between the inlet upper part 6637e2 and the inlet lower part 6635e2. In addition, the seal ring part 6636e2 may be molded integrally with the water inlet part 663e2 as in the fourth or fifth embodiment described above, or may be molded separately and then coupled.

The inlet upper part 6637e2 may have a polygonal cross-section. For example, the size of the inlet upper part 6637e2 may be formed smaller than the cross-sectional size of the seal ring part 6636e2, so that it may be positioned in an inner region of the upper surface of the seal ring part 6636e2 when viewed from above.

The inlet lower part 6635e2 may have a cross-section of a different shape from the inlet upper part 6637e2. For example, the inlet lower part 6635e2 may have a cross-section of a circular or elliptical shape, and may be formed to have a diameter smaller than the diameter of the seal ring part 6636e2.

The seal ring part 6636e2 may have an elliptical cross-section. At this time, both the inlet upper part 6637e2 and the inlet lower part 6635e2 may be formed smaller than the cross-sectional size of the seal ring part 6636e2. For example, the inlet upper part 6637e2 and the inlet lower part 6635e2 may be positioned in the inner area of the seal ring part 6636e2 when viewed from above. Accordingly, at least a part of the seal ring part 6636e2 may be formed to protrude further outward than the inlet upper part 6637e2 and the inlet lower part 6635e2.

Accordingly, when the water inlet part 663e2 is inserted into the inlet hole 5321, the seal ring part 6636e2 can be sealed by coming into contact with the inlet ring 541, and the upper end of the inlet upper part 6637e2 can press the contact part 5633 of the piston 563 to move the piston 563 upward.

In addition, as illustrated in (d) of FIG. 46, the water inlet part 663e3 may include an inlet upper part 6637e3 and a seal ring part 6636e3. The seal ring part 6636e3 may extend from the lower end of the water inlet part 663e3 to the inlet upper part 6637e3. At this time, the upper end of the seal ring part 6636e3 may extend at least past the inlet ring 541. The inlet upper part 6637e3 may extend from the upper end of the seal ring part 6636e3 to the upper end of the water inlet part 663e3.

In addition, the seal ring part 6636e3 may be molded integrally with the water inlet part 663e3 as in the fourth or fifth embodiment described above, or may be molded separately and then coupled.

The inlet upper part 6637e3 and the seal ring part 6636e3 may both have an elliptical cross-section. In addition, the cross-sections of the inlet upper part 6637e3 and the seal ring part 6636e3 may be disposed so that their major axes extend in the same direction.

At this time, the inlet upper part 6637e3 may be formed so that the length of the major axis is smaller than the length of the major axis of the seal ring part 6636e3. Accordingly, at least a part of the seal ring part 6636e3 may be formed to protrude further outward than the inlet upper part 6637e3.

Of course, if the inlet upper part 6637e has a smaller cross-sectional size than the seal ring part 6636e3, it may be formed into a circular or polygonal cross-sectional shape, as illustrated in (b) and (c) of FIG. 45.

Accordingly, when the water inlet part 663e3 is inserted into the inlet hole 5321, the seal ring part 6636e3 can be in contact with the inlet ring 541 to create a seal, and the inlet upper part 6637e3 can press the contact part 5633 of the piston 563 to move the piston 563 upward.

In addition, as illustrated in (e) of FIG. 46, the water inlet part 663e4 may include an inlet lower part 6635e4 and a seal ring part 6636e4. The inlet lower part 6635e4 may extend from the lower end of the water inlet part 663e4 to the lower end of the seal ring part 6636e4. At this time, the inlet lower part 6635e4 may extend at least lower than the inlet ring 541. The seal ring part 6636e4 may extend from the inlet lower part to the upper end of the water inlet part 663e4.

In addition, the seal ring part 6636e4 may be molded integrally with the water inlet part 663e4 as in the fourth or fifth embodiment described above, or may be molded separately and then coupled.

Both the inlet lower part 6635e4 and the seal ring part 6636e4 may have an elliptical cross-section. In addition, the cross-sections of the inlet lower part 6635e4 and the seal ring part 6636e4 may be disposed so that their major axes extend in the same direction.

At this time, the length of the major axis of the inlet lower part 6635e4 may be formed to be smaller than the length of the major axis of the seal ring part 6636e4. Accordingly, at least a part of the seal ring part 6636e4 may be formed to protrude further outward than the inlet lower part 6635e4.

Of course, if the inlet lower part 6635e4 has a smaller cross-sectional size than the seal ring part 6636e4, it may be formed into a circular or polygonal cross-sectional shape, as illustrated in (b) and (c) of FIG. 45.

Accordingly, when the water inlet part 663e4 is inserted into the inlet hole 5321, the seal ring part 6636e4 can be in contact with the inlet ring 541 to create a seal, and the inlet upper part 6637e4 can press the contact part 5633 of the piston 563 to move the piston 563 upward.

Figure 47:
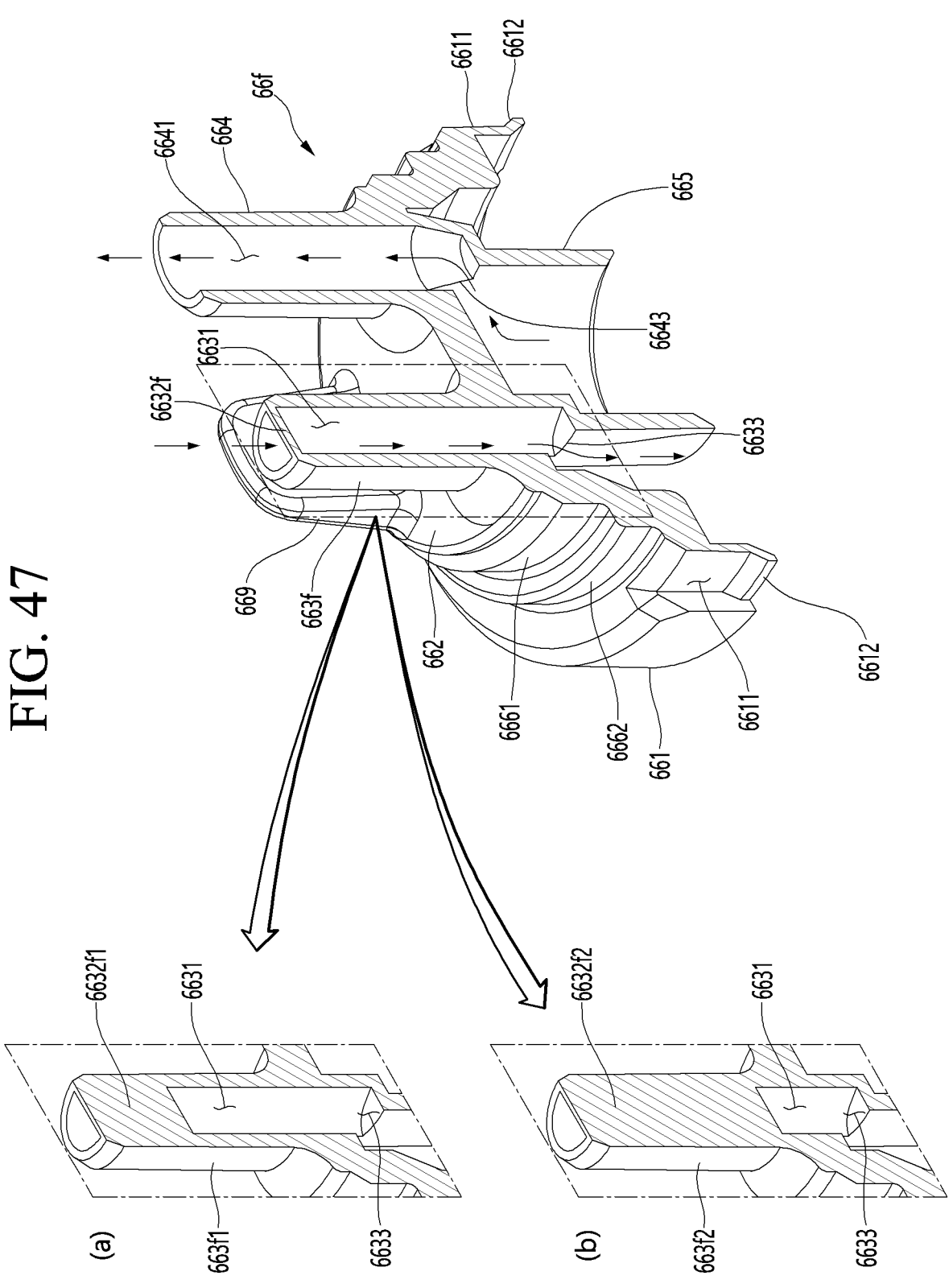
FIGS. 47 (a) and (b) are views illustrating various examples of an inlet contact part of a filter assembly according to the seventh embodiment of the present disclosure.

FIG. 47 is a view illustrating various examples of an inlet contact part of a filter assembly according to the seventh embodiment of the present disclosure.

As illustrated, the filter assembly 40 according to the seventh embodiment may have the same structure as the above-described embodiment except that the only difference is the inlet contact part 5633f of the water inlet part 663.

In detail, the filter cover 66f may have an inner edge 661 forming a circumference, and a stepped part 6661, 662 having a smaller diameter than the inner edge 661 on the upper surface of the inner edge 661. In addition, an inner upper surface 662 may be formed on the upper end of the stepped part 6661, 6662.

An edge groove 6611 and an edge hook 6612 are formed on the outer surface of the inner edge 661 so that the filter cover 66f can be mounted inside the housing 600.

A nipple accommodation part 665 extending downward can be formed at the center of the lower surface of the inner upper surface 662, and the flow path inside the filter can be divided into a first space 6610 and a second space 6651 by the nipple accommodation part 665.

On the inner upper surface 662, a water inlet part 663 and a water outlet part 664 may protrude upward. In addition, a rotation protrusion 669 may be further formed on the inner upper surface 662. In addition, a sensing member 668 may be further formed on the inner upper surface 662.

A water inlet flow path 6631 may be formed inside the water inlet part 6633, and an inlet exit 6633 communicating with the first space 6610 may be formed at the lower end of the water inlet flow path 6631. In addition, an inlet contact part 6633f may be formed inside the water inlet part 663.

The inlet contact part 6633f may be formed to divide water inlet flow path 6631. For example, the inlet contact part 6633f may extend along the minor axis of the water inlet part 663 having an elliptical cross-section. In addition, the inlet contact part 6633f may press the contact part 5633 of the valve 56 to open the valve 56 when the filter 60 is mounted on the head 50. For this purpose, the inlet contact part 6633f may be provided at the upper end of the water inlet part 663.

For example, the inlet contact part 6633f may be formed only at the upper end of the water inlet part 663, and thus, water inlet flow path 6631 below the inlet contact part 5633f may form a single, undivided space.

As another example, as in (a) of FIG. 47, the inlet contact part 6633f1 may extend downward from the upper end of the water inlet part 663 to the midpoint of the upper and lower heights of the water inlet part 663. Accordingly, the inlet contact part 6633f1 may reinforce the strength of the water inlet part 663 and ensure reliable contact with the contact part 5633.

As another example, as in (b) of FIG. 47, the inlet contact part 6632f2 may extend downward from the upper end of the water inlet part 663, but may extend to a position that is lower than the midpoint of the upper and lower heights of the water inlet part 663 and higher than the inlet exit 6633. In other words, the inlet contact part 6632f2 does not divide the entire water inlet flow path 6631, but secures a space on the side of the inlet exit 6633, thereby facilitating the discharge of water into the first space 6610.

Meanwhile, a water outlet flow path 6641 may be formed inside the water outlet part 664, and an outlet entrance 6643 communicating with the second space 6651 may be formed at the lower end of the water outlet part 664.

Figure 48:
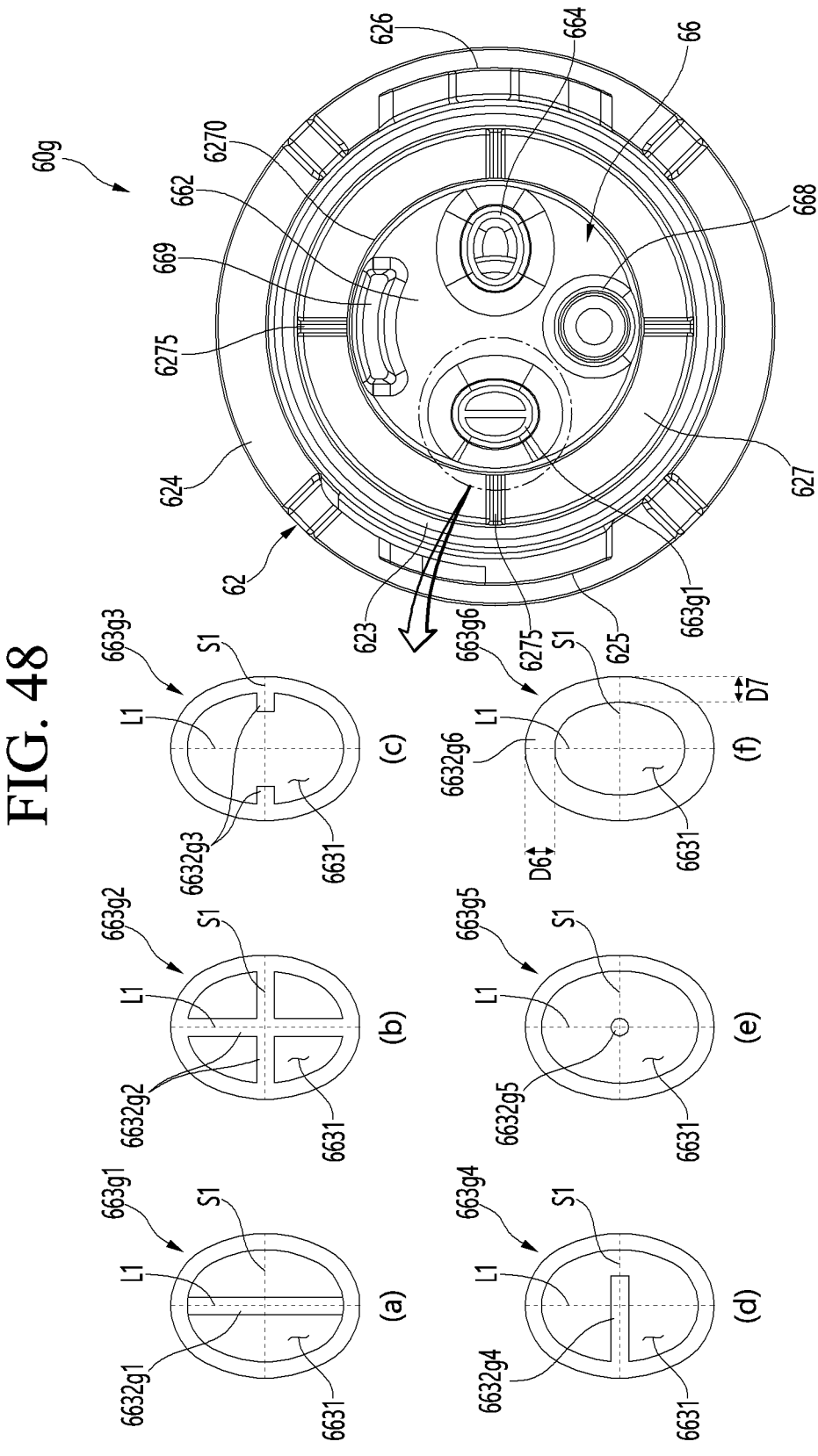
FIG. 48 (a) to (f) are views illustrating various examples of an inlet contact part of a filter assembly according to the eighth embodiment of the present disclosure.

FIG. 48 is a view illustrating various examples of an inlet contact part of a filter assembly according to the eighth embodiment of the present disclosure.

As illustrated, the filter assembly 40 according to the eighth embodiment of the present disclosure may have the upper end of the water inlet part 663g for opening the valve 56 of the head 50 formed in various shapes.

The filter 60 detachable from the head 50 may include a housing 600 and a filter cover 66. In addition, the inlet contact parts formed in the water inlet part 663g are disposed at least at the upper end of the water inlet part 663g, and may extend in various lengths in the vertical direction along the water inlet part 663g as in the first embodiment described above.

In detail, as illustrated in (a) of FIG. 48, the water inlet part 663g1 may be formed in an elliptical shape having a major axis L1 and a minor axis S1 when viewed from above. In addition, a water inlet flow path 6631 extending in the vertical direction may be formed in the water inlet part 663g1.

In addition, an inlet contact part 6632g1 that contacts the contact part 5633 of the valve 56 to open the valve 56 may be formed in the water inlet part 663g1. The inlet contact part 6632g1 may be provided at the upper end of the water inlet part 663g1 and may be formed to divide the water inlet flow path 6631. The inlet contact part 6632g1 may be formed to extend along the major axis L1 of the cross-section of the water inlet part 663g1.

Due to this structure, the water inlet flow path 6631 can be divided in the left and right direction to induce the direction of water flow, thereby enabling smooth water flow.

In addition, as in (b) of FIG. 48, the water inlet part 663g may be formed in an elliptical shape having a major axis L1 and a minor axis S1 when viewed from above. In addition, a water inlet flow path 6631 penetrating in the vertical direction may be formed in the water inlet part 663g2.

In addition, an inlet contact part 6632g2 that contacts the contact part 5633 of the valve 56 to open the valve 56 may be formed in the water inlet part 663g2. The inlet contact part 6632g2 may be provided at the upper end of the water inlet part 663g2 and may be formed to divide the water inlet flow path 6631.

The inlet contact part 6632g2 may be formed to extend along the major axis L1 and minor axis S1 of the cross section of the water inlet part 663g2. Accordingly, when viewed from above, the inlet contact part 6632g2 may be formed in a cross shape.

Due to this structure, the inlet contact part 6632g2 can have a solid structure and has the advantage of being able to maintain its shape and path even when the filter 60 is repeatedly inserted or subjected to strong impact with other components.

In addition, as in (c) of FIG. 48, the water inlet part 663g3 may be formed in an elliptical shape having a major axis L1 and a minor axis S1 when viewed from above. In addition, a water inlet flow path 6631 extending in the vertical direction may be formed in the water inlet part 663g3.

In addition, an inlet contact part 6632g3 that contacts the contact part 5633 of the valve 56 to open the valve may be formed in the water inlet part 663g3. The inlet contact part 6632g3 is provided at the upper end of the water inlet part 663g3 and may protrude toward the center of the water inlet part 663g3.

The inlet contact part 6632g3 may be formed along the minor axis S1 of the cross-section of the water inlet part 663g3. In addition, the inlet contact part 6632g3 may be formed to extend from both ends of the minor axis S1 of the water inlet part 663g3 toward the center of the water inlet part 663g3 but be spaced apart from each other. At this time, the extension length of the inlet contact part 6632g3 may be formed to at least a length that can make contact with the contact part 5633.

Due to this structure, even when the inlet contact part 6632g3 is formed, the central part of the water inlet flow path 6631 can be secured, and the water flow passing through the water inlet part 663g3 can be guided to the center to enable smooth flow.

In addition, as in (d) of FIG. 48, the water inlet part 663g4 may be formed in an elliptical shape having a major axis L1 and a minor axis S1 when viewed from above. In addition, a water inlet flow path 6631 penetrating in the vertical direction may be formed in the water inlet part 663g4.

In addition, an inlet contact part 6632g4 that contacts the contact part 5633 of the valve 56 to open the valve 56 may be formed in the water inlet part 663g4. The inlet contact part 6632g4 is provided at the upper end of the water inlet part 663g4 and may protrude toward the center of the water inlet part 663g4.

The inlet contact part 6632g4 may be formed along the minor axis S1 of the cross-section of the water inlet part 663g4. In addition, it may be formed to extend from one end of the minor axis S1 of the water inlet part 663g4 to pass through the center of the water inlet part 663g4, but to be spaced apart from the other end of the minor axis S1 of the water inlet part 663g4. At this time, the extension length of the inlet contact part 6632g4 may be formed to be at least a length that passes through the center of the contact part 5633.

Due to this structure, even when the inlet contact part 6632g4 is formed, the central part of the water inlet flow path 6631 can be secured, and at the same time, stable contact with the contact part 5633 can be guaranteed, thereby ensuring the operability of the valve 56.

In addition, as in (e) of FIG. 48, the water inlet part 663g5 may be formed in an elliptical shape having a major axis L1 and a minor axis S1 when viewed from above. In addition, a water inlet flow path penetrating in the vertical direction may be formed in the water inlet part 663g5.

In addition, an inlet contact part 6632g5 that contacts the contact part 5633 of the valve 56 to open the valve 56 may be formed in the water inlet part 663g5. The inlet contact part 6632g5 is provided at the upper end of the water inlet part 663g5 and may be formed in the center of the water inlet part 663g5.

The inlet contact part 6632g5 may be positioned at the center of the cross-section of the water inlet part 663g5 and may be formed to extend in the extension direction of the water inlet part 663g5. The inlet contact part 6632g5 may be molded integrally with the water inlet part 663g5. The inlet contact part 6632g5 may be inserted and mounted into the water inlet part 663g5 as a separate member. In addition, the contact part 5633 may be positioned at a position corresponding to the center of the contact part 5633.

Due to this structure, it is possible to minimize flow path loss within the water inlet flow path 6631 and, at the same time, ensure stable contact with the contact part 5633, thereby ensuring the operability of the valve 56.

In addition, as in (f) of FIG. 48, the water inlet part 663g6 may be formed in an elliptical shape having a major axis L1 and a minor axis S1 when viewed from above. In addition, a water inlet flow path 6631 penetrating in the vertical direction may be formed in the water inlet part 663g6.

In addition, an inlet contact part 6632g6 may be formed at the upper end of the water inlet part 663g6 to contact the contact part 5633 of the valve 56 to open the valve 56. Since the inlet contact part 6632g6 is identical to the upper end of the water inlet part 663g6, it may also be referred to as the upper end of the water inlet part.

The inlet contact part 6632g6 may be formed to have a thickness set such that at least one of the thicknesses D6, D7 of the part formed along the major axis L1 or the part formed along the minor axis S1 can be brought into contact with the contact part 5633. For example, at least a part of the thickness D6 of inlet contact part 6632g6 formed along the major axis L1 of the cross-section of the water inlet part 663g6 may be formed to a thickness which can come into contact with the contact part 5633. In addition, at least a part of the thickness D7 of inlet contact part 6632g6 formed along the minor axis S1 of the cross-section of the water inlet part 663g6 may be formed to a thickness which can come into contact with the contact part 5633.

Accordingly, a separate configuration that generates flow resistance may not be provided inside the water inlet part 663g6. Due to this structure, flow path loss inside the flow inlet flow path 6631 can be minimized.

Figure 49:
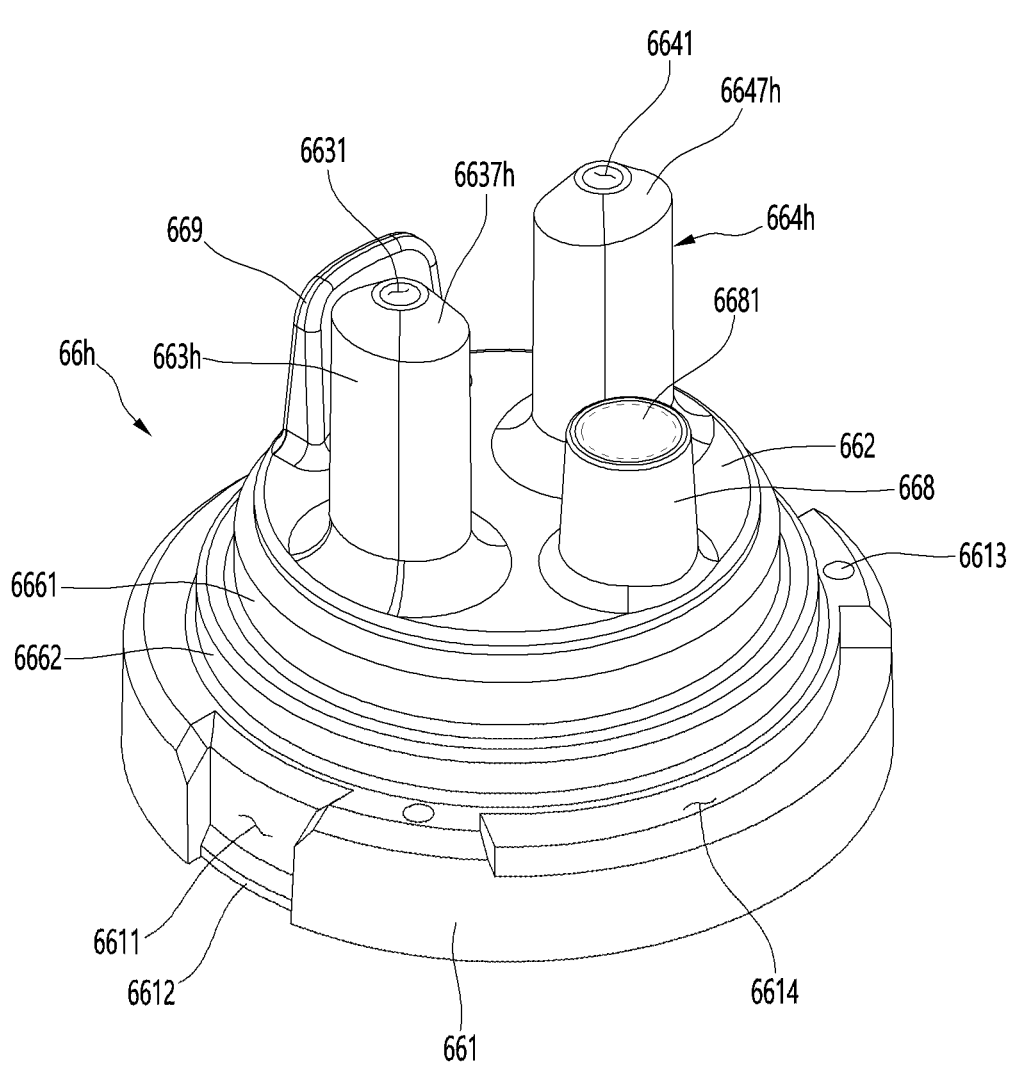
FIG. 49 is a perspective view illustrating a filter cover of a filter assembly according to the ninth embodiment of the present disclosure.

FIG. 49 is a perspective view illustrating a filter cover of a filter assembly according to the ninth embodiment of the present disclosure.

As illustrated, the filter assembly 40 according to the ninth embodiment of the present disclosure may have the upper end of the water inlet part 663h for opening the valve 56 of the head 50 formed in a more diverse shape.

The inlet contact parts of the above-described embodiments are not formed inside the water inlet flow path 6631 formed inside the water inlet part 663h, and the valve 56 can be opened and closed by the upper shape of the water inlet part 663h.

In detail, the filter cover 66h may have an inner edge 661 forming a circumference, and a stepped part 6661, 662 having a smaller diameter than the inner edge 661 may be formed on the upper surface of the inner edge 661. In addition, an inner upper surface 662 may be formed on the upper end of the stepped part 6661, 6662.

An edge groove 6611 and an edge hook 6612 are formed on the outer circumferential surface of the inner edge 661 so that the filter cover 66f can be mounted inside the housing 600.

On the inner upper surface 662, a water inlet part 663h and a water outlet part 664h may protrude upward. In addition, a rotation protrusion 669 may be further formed on the inner upper surface 662. In addition, a sensing member 668 may be further formed on the inner upper surface 662.

The water inlet part 663h may be formed with a water inlet flow path 6631 penetrating the water inlet part 663h. In addition, the water inlet part 663h may have an elliptical cross-sectional shape. At this time, the water inlet part 663h may be disposed so that the major axis of the cross-section faces the front and rear direction.

In addition, the inlet upper part 6637h forming the upper part of the water inlet part 663h may be formed. The inlet upper part 6637h may be formed so that the inner diameter becomes narrower as it extends upward. In other words, the inlet upper part 6637h may be formed to be inclined or rounded toward the center of the water inlet part 663h as it extends upward.

At this time, the upper end of the inlet upper part 6637h can be formed to a size that can come into contact with the contact part 5633 of the valve 56. Therefore, when the filter 40 is inserted, the inlet upper part 6637h can come into contact with the contact part 5633 to push the contact part 5633 and open the valve 56.

The water outlet part 664h may be formed with a water outlet flow path 6641 penetrating the water outlet part 664h.

In addition, the water outlet part 664h may have an elliptical cross-sectional shape. At this time, the water outlet part 664h may be disposed so that the major axis of the cross-section faces the left and right direction, and may be disposed in a direction intersecting the major axis of the water inlet part 663h.

In addition, the outlet upper part 6647h of the same shape as the water inlet part 663h may also be formed in the water outlet part 664h. In addition, a water outlet flow path 6641 may be formed inside the water outlet part 664h. Of course, since the water outlet part 664h does not open or close the valve 56, the outlet upper part 6647h may not be formed.

Figure 50:
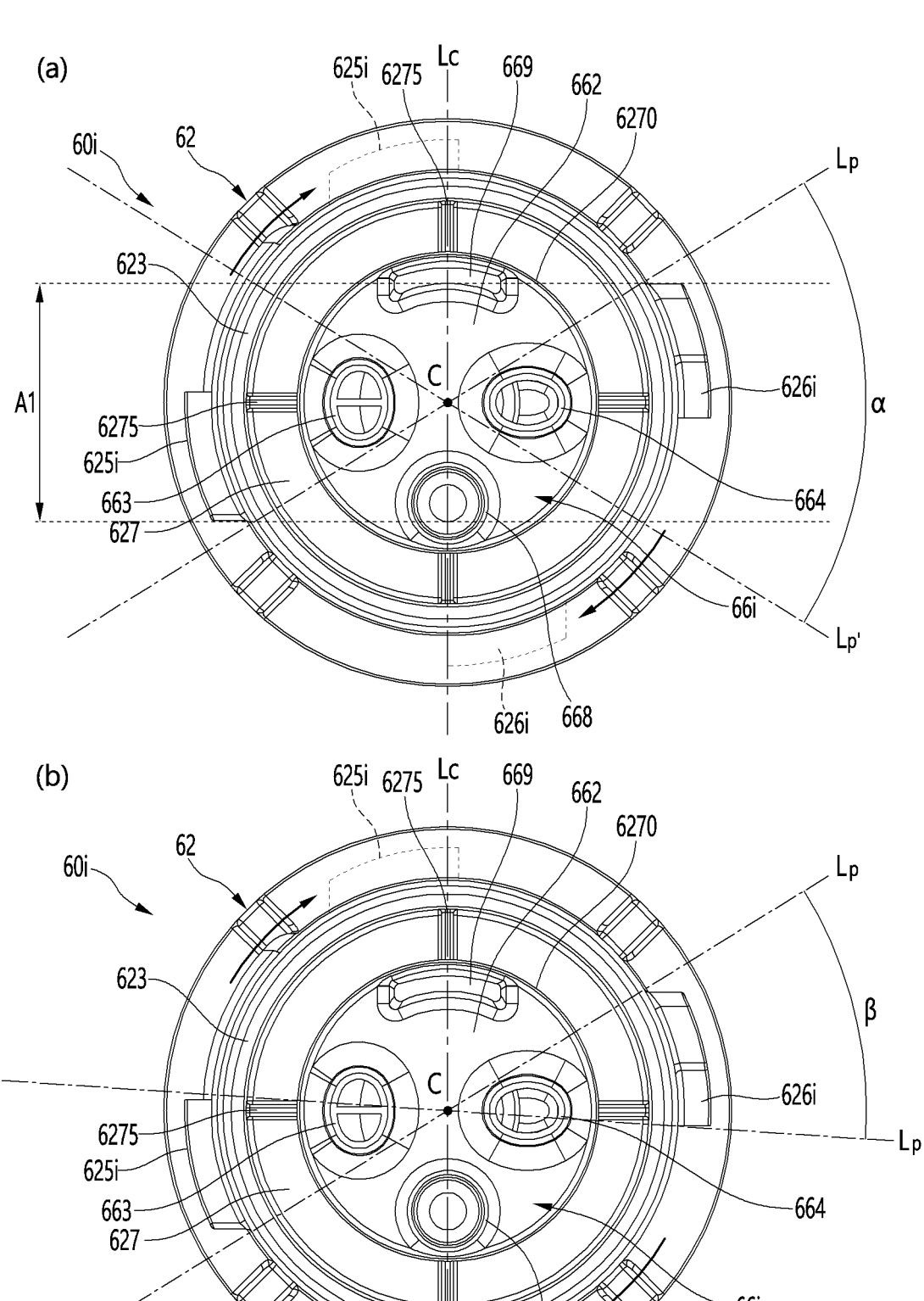
FIGS. 50 (a) and (b) are plan views illustrating a filter according to the tenth embodiment of the present disclosure.

FIG. 50 is a plan view illustrating a filter according to the tenth embodiment of the present disclosure.

As illustrated, the filter assembly 40 according to the tenth embodiment of the present disclosure may be configured to include a head 50 and a filter 60i. The filter 60i may be configured to be capable of being attached to and detached from the head 50. In addition, compared to the above-described embodiment, there is only a difference in the disposition of the guide protrusions 625i 626i of the filter 60i, and the remaining configuration may be the same.

The filter 60a includes an upper housing 62, and the filter cover 66 can be rotatably mounted on the upper housing 62. The filter cover 66 shields the upper opening 6270 of the upper housing 62, and the upper surface can be exposed through the upper opening 6270. In addition, a water inlet part 663 and a water outlet part 664 can be formed on the upper surface of the filter cover 66. In addition, a rotation protrusion 669 and a sensing member 668 can be further formed on the upper surface of the filter cover 66.

The water inlet part 663 and water outlet part 664 may have an elliptical cross-sectional structure. In addition, the water inlet part 663 and water outlet part 664 may be disposed so that their major axes face in different directions. For example, the water inlet part 663 may have its minor axis of the cross-section disposed in the left and right direction, and the water outlet part 664 may have its major axis of the cross-section disposed in the left and right direction. In addition, the interior of the water inlet part 663 may be divided by the inlet contact part 6632.

A marker 6275 may be formed on the upper surface of the first protrusion part 627 where the upper opening 6270 is formed. A pair of markers 6275 may be formed at least on the left and right sides, and may be positioned on the same extension line as the water inlet part 663 and the water outlet part 664. Therefore, the user can visually check the alignment state of the filter cover 66 through the disposition of the marker 6275 and the water inlet part 663 and the water outlet part 664.

In addition, a first guide protrusion 625i and a second guide protrusion 626i may be formed on the circumferential surface of the upper housing 62. The first guide protrusion 625i and the second guide protrusion 626i may be positioned facing each other.

When the filter 60i is mounted on the head 50, the filter cover 66 is inserted into the inlet hole 5321 and the outlet hole 5323 of the head 50 while maintaining a fixed state, and the housing 600 can rotate. At this time, the first guide protrusion 625i and the second guide protrusion 626i can rotate and move upward while moving along the first guide 523 and the second guide 524 of the head.

Meanwhile, the housing 600 can be rotated at a set angle from a state before the filter 60i is mounted to a state where the filter 60i is mounted on the head 50. At this time, the set angle can be approximately 90°.

As illustrated in (a) of FIG. 50, before the filter 60*i* is mounted, the housing 600 is not rotated, and the first guide 625*i* and the second guide 626*i* can be positioned on the left and right sides based on the center line Lc passing through the center of the filter 60*i* in the front and rear direction. In addition, the water inlet part 663 and the water inlet part 663 can also be positioned on the left and right sides based on the center line Lc of the filter 60*i*. In other words, the water inlet part 663 and the first guide 625*i* can be positioned on the left side, and the water outlet part 664 and the second guide 626*i* can be positioned on the right side based on the center line Lc of the filter 60*i*.

In addition, before the filter 60*i* is mounted, the first guide 625*i* and the second guide 626*i* may not be positioned on the same extension line as the water inlet part 663 and the water outlet part 664. In other words, the first guide 625*i* and the second guide 626*i* may be positioned on the left and right sides with respect to the center line Lc, but may have a structure in which they are disposed vertically staggered from each other. At this time, the water inlet part 663 and the water outlet part 664 may be positioned in the area A1 between the lower end of the first guide 625*i* and the upper end of the second guide 626*i*. Of course, a part of the first guide 625*i* and the second guide 626*i* may be positioned on the same extension line as the water inlet part 663 and the water outlet part 664.

In addition, the first guide 625*i* and the second guide 626*i* may be disposed between the first extension line Lp and the second extension line Lp'. The first extension line Lp may be extended to pass through the center of the filter cover 66 and the end parts of the first guide 625*i* and the second guide 626*i*. In addition, the second extension line Lp' may be extended to pass through the center c of the filter cover 66 and may be extended symmetrically with respect to the first extension line Lp based on the center line Lc. The first extension line Lp and the second extension line Lp' form a set angle α, and the first guide 625*i* and the second guide 626*i* may be positioned within the set angle α. For example, the set angle α can be an acute angle.

As another example, as illustrated in (b) of FIG. 50, the first guide 625*i* and the second guide 626*i* may be disposed between two extension lines Lp passing through the center c of the filter cover 66. The extension lines Lp may be extended to connect the end parts of the first guide 625*i* and the second guide 626*i* which are symmetrical with respect to the center c of the filter cover 66. Accordingly, the first guide 625*i* and the second guide 626*i* may be disposed at positions symmetrical with respect to the center c of the filter cover 66. In addition, the angle between the extension lines Lp may form a set angle β, and the first guide 625*i* and the second guide 626*i* may be positioned within the set angle β. At this time, the setting angle β may be smaller than the setting angle α in (a) of FIG. 50.

In addition, when the housing 600 is rotated and the filter 60*i* is mounted, the filter cover 66 is maintained in a fixed state, and the first guide 625*i* and the second guide 626*i* are rotated and moved. For example, when the filter 60*i* is mounted, the first guide 625*i* is rotated and positioned upward, and the second guide 626*i* can be rotated. In addition, when the first guide 625*i* and the second guide 626*i* are rotated, at least a part of them can overlap the center line Lc or the upper and lowerly disposed markers 6275.

The first guide 625*i* and second guide 626*i* may be formed with different sizes and shapes. Accordingly, incorrect mounting can be prevented when coupled with the head 50.

Figure 51:
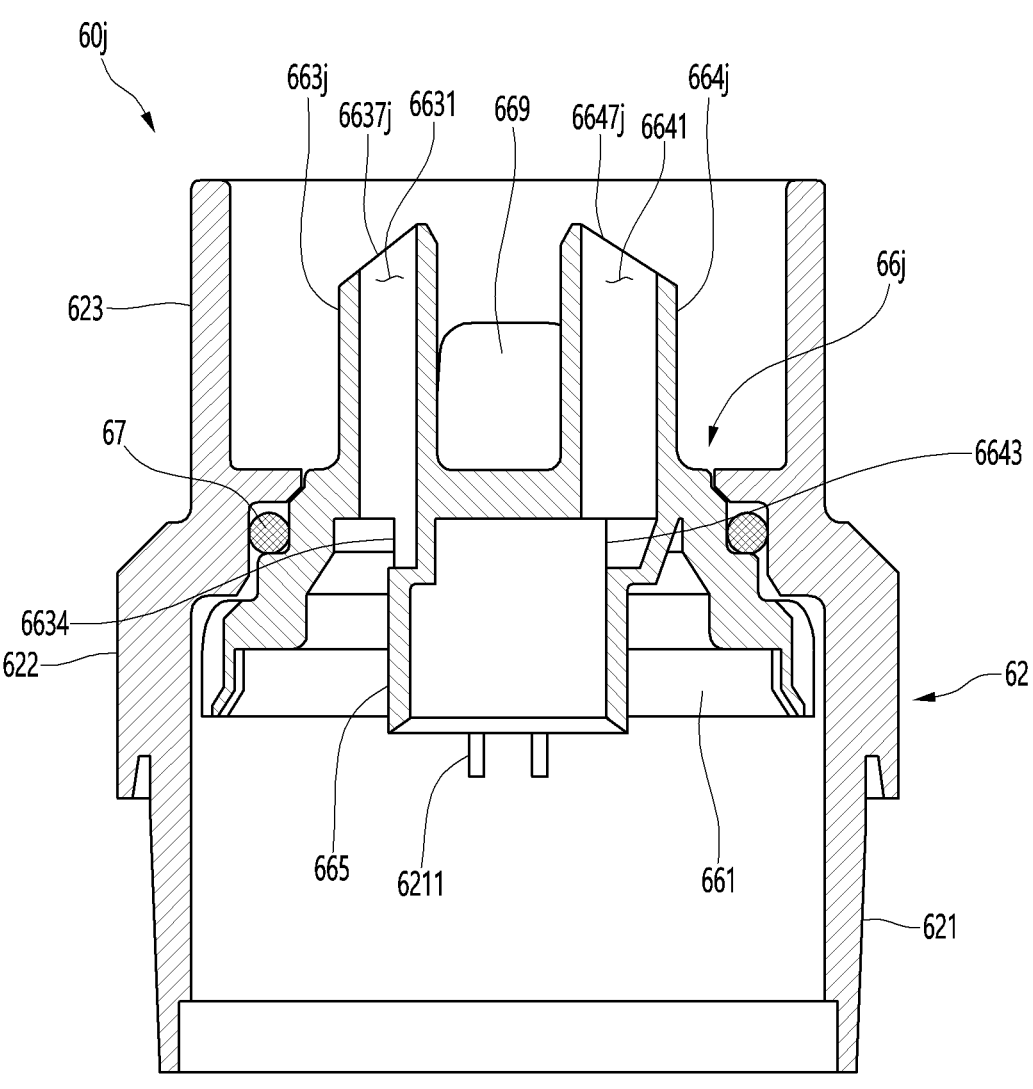
FIG. 51 is a cross-sectional view illustrating a state where the upper housing and the filter cover of the filter assembly according to the 11th embodiment of the present disclosure are coupled.

FIG. 51 is a cross-sectional view illustrating a state where the upper housing and the filter cover of the filter assembly according to the 11th embodiment of the present disclosure are coupled.

As illustrated, the filter assembly according to the 11th embodiment of the present disclosure can have the upper end of the nipple provided on the filter cover 66*j* of the filter 60*j* formed in a more diverse shape. Compared to the embodiments described above, only the upper end shape of the nipple is different, and the other configurations can be formed in the same manner.

In detail, the filter 60*j* may be detachably provided on the head 50. In addition, the filter 60*j* may include an upper housing 62. The upper housing 62 may include an upper part 623 inserted into the head 50, a lower part 623 coupled with the lower housing 61, and a housing coupling part 621. In addition, an inwardly protruding division part 627 may be formed inside the upper housing 62, and an upper opening 6270 shielded by a filter cover 66*j* may be formed in the division part 627.

The filter cover 66*j* may have an inner edge 661 forming a circumference, and a stepped part 6661, 662 having a smaller diameter than the inner edge 661 may be formed on the upper surface of the inner edge 661. In addition, a seal ring 67 may be formed between the stepped part 6661, 6662 and the division part. Accordingly, the housing 600 may be rotated relative to the fixed filter cover 66*j*, and the space between the housing 600 and the filter cover 66*j* may be sealed.

The filter cover 66*j* may have a water inlet part 663*j* and a water outlet part 664*j* protruding upward. In addition, a rotation protrusion 669 may be further formed on the inner upper surface 662. In addition, a sensing member 668 may be further formed on the inner upper surface 662.

The water inlet part 663*j* may have a water inlet flow path 6631 formed through the water inlet part 663*j*. In addition, the water inlet part 663*j* may have an elliptical cross-sectional shape. At this time, the water inlet part 663*j* may be disposed so that the major axis of the cross-section faces the front and rear direction.

In addition, the inlet upper part 6637*j* may be formed at the upper part of the water inlet part 663*j*. The inlet upper part 6637*j* may be formed to be inclined. For example, it may have an incline that increases from the outer side of the filter 60*j* toward the center. Of course, the inlet upper part 6637*j* may be formed to be round, and one end may be formed higher than the other end.

The most protruding upper end of the inlet upper part 6637*j* may be formed to be inclined to a position where it can come into contact with the contact part 5633 of the valve 56. Accordingly, when the filter 40 is inserted, the inlet upper part 6637*j* can come into contact with the contact part 5633, thereby pushing the contact part 5633 and opening the valve 56.

The water outlet part 664*j* may be formed with a water outlet flow path 6641 penetrating the water outlet part 664*j*. In addition, the water outlet part 664*j* may have an elliptical cross-sectional shape. At this time, the water outlet part 664*j* may be disposed so that the major axis of the cross-section faces the left and right direction, and may be disposed in a direction intersecting the major axis of the water inlet part 663*j*.

In addition, the outlet upper part 6647*j* of the same shape as the water inlet part 663*j* may also be formed in the water outlet part 664*j*. In addition, a water outlet flow path 6641 may be formed inside the water outlet part 664*j*. Of course, since the water outlet part 664*j* does not open or close the valve 56, the outlet upper part 6647*j* may not be formed.

Figure 52:
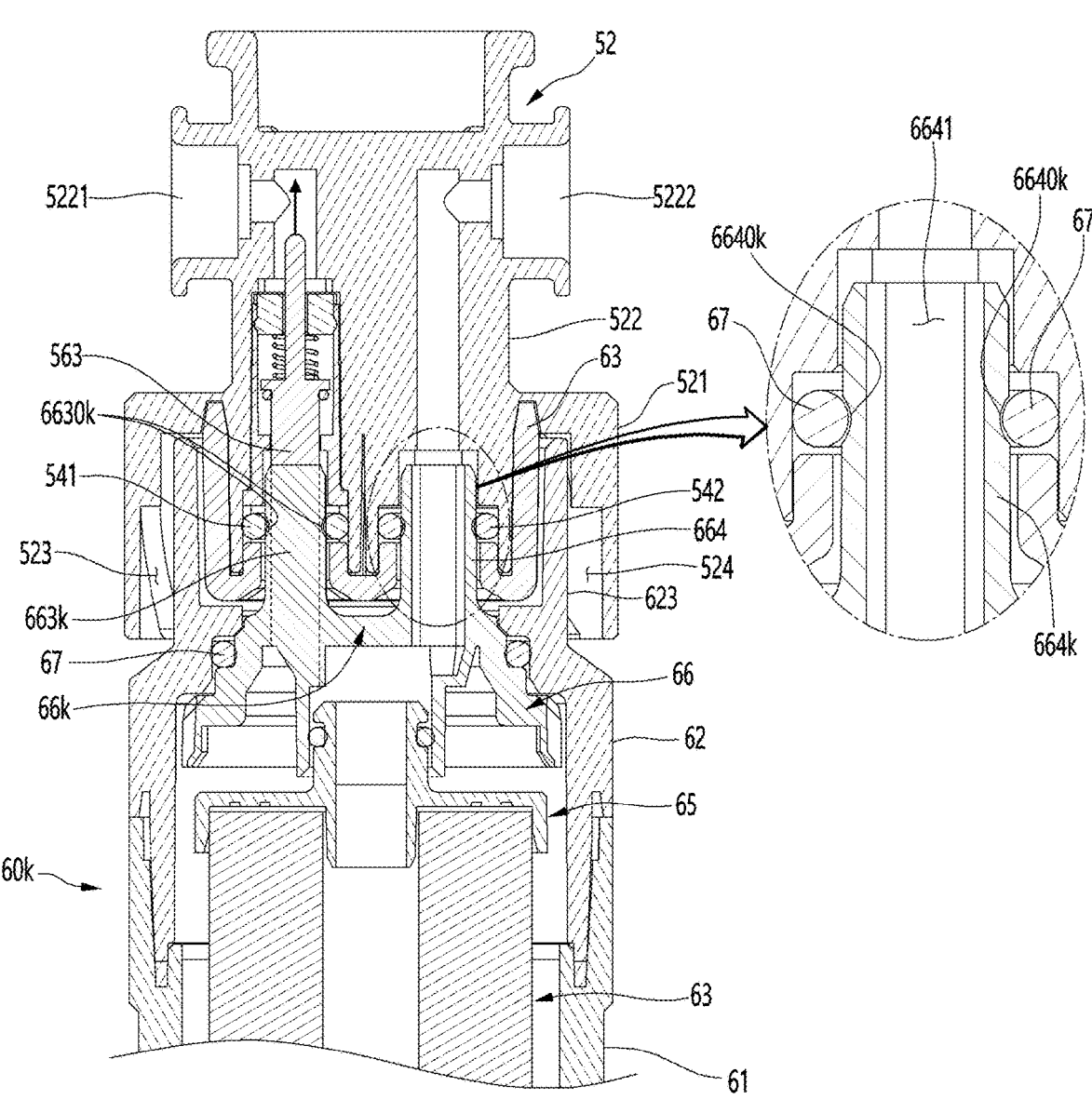
FIG. 52 is a cross-sectional view illustrating a state where the water inlet part and the water outlet part according to the 12th embodiment of the present disclosure are connected.

FIG. 52 is a cross-sectional view illustrating a state where the water inlet part and the water outlet part according to the 12th embodiment of the present disclosure are connected.

As illustrated, the filter assembly according to the 12th embodiment of the present disclosure can have the nipple provided on the filter cover 66*k* of the filter 60*k* formed in a more diverse shape. Compared to the embodiments described above, only the upper shape of the nipple is different, and the other configurations can be formed in the same manner.

In detail, the filter 60*k* may be detachably provided on the head 50. In addition, the filter 60*k* may include an upper housing 62, a lower housing 61, and a filter member 63. In addition, the upper housing 62 is detachably coupled to the head 50, and a filter cover 66*k* may be rotatably disposed inside the upper housing 62.

The filter cover 66*k* is provided with a water inlet part 663*k* and a water outlet part 664*k* extending upward, and the water inlet part 663*k* and water outlet part 664*k* can be inserted into the inlet hole 5321 and the outlet hole 5323 of the head.

The head 50 may include a head body 52 and a head inner 53 inside the head body 52. In addition, an inlet flow path 5241 and an outlet flow path 5251 may be formed inside the head body 52. A valve 56 may be provided in the inlet flow path 5241, and the valve 56 may be opened by coming into contact with the upper end of the water inlet part 663*k* when the water inlet part 663*k* is inserted into the inlet hole 5321.

The head inner 53 may be formed with the inlet hole 5321 and the outlet hole 5323. In addition, an inlet ring 541 and an outlet ring 542 may be provided above the inlet hole 5321 and the outlet hole 5323. The water inlet part 663*k* and the water outlet part 664*k* may be formed in an elliptical shape in cross section and may be disposed in different directions. In addition, the inlet ring 541 and the outlet ring 542 are formed in an elliptical shape corresponding to the water inlet part 663*k* and the water outlet part 664*k*, and may prevent water leakage by coming into contact with the outer surfaces of the water inlet part 663*k* and the water outlet part 664*k*.

Meanwhile, an inlet groove 6630*k* and an outlet groove 6640*k* may be formed around the water inlet part 663*k* and the water outlet part 664*k*. The inlet groove 6630*k* and the outlet groove 6640*k* are formed so that the inlet ring 541 and the outlet ring 542 can be seated therein. In addition, the inlet groove 6630*k* and the outlet groove 6640*k* may be formed at positions corresponding to the heights of the inlet ring 541 and the outlet ring 542 when the filter 60*k* is mounted. Accordingly, when the filter 60*k* is mounted, the water inlet part 663*k* and the water outlet part 664*k* penetrate the inlet ring 541 and the outlet ring 542, and the inlet ring 541 and the outlet ring 542 can be inserted into the inlet groove 6630*k* and the outlet groove 6640*k*. Accordingly, the seal ring of the water inlet part 663*k* and the water outlet part 664*k* can be further improved, the water inlet part 663*k* and the water outlet part 664*k* can also be prevented from falling out.

Figure 53:
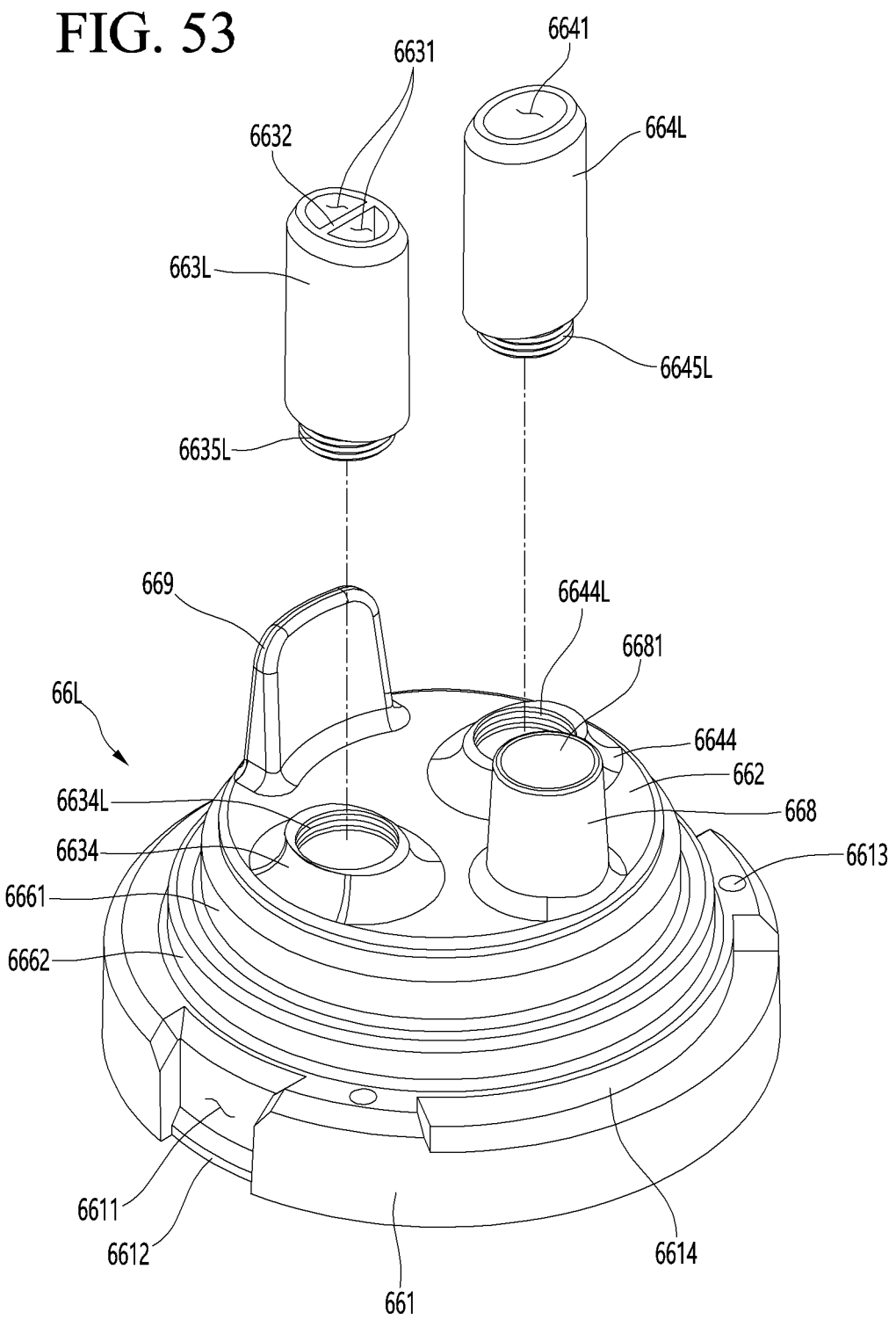
FIG. 53 is an exploded perspective view illustrating a filter cover of a filter assembly according to the 13th embodiment of the present disclosure.

FIG. 53 is an exploded perspective view illustrating a filter cover of a filter assembly according to the 13th embodiment of the present disclosure.

As illustrated, the filter assembly 40 according to the 13th embodiment of the present disclosure may have a structure in which the nipple inserted into the head 50 is detachable. Compared to the embodiments described above, only the mounting structure of the nipple may be different, and the other configurations may be the same.

In detail, the filter cover 66*l* may have an inner edge 661 forming a circumference, and a stepped part 6661, 662 having a smaller diameter than the inner edge 661 may be formed on the upper surface of the inner edge 661. In addition, an inner upper surface 662 may be formed on the upper end of the stepped part 6661, 6662.

An edge groove 6611 and an edge hook 6612 are formed on the outer circumferential surface of the inner edge 661 so that the filter cover 66*l* can be rotatably mounted inside the housing 600.

The inner upper surface 662 may be provided with a water inlet part 663L and a water outlet part 664L. In addition, a rotation protrusion 669 may be further formed on the inner upper surface 662. In addition, a sensing member 668 may be further formed on the inner upper surface 662.

The water inlet part 663L and the water outlet part 664L may be molded separately and mounted on the filter cover 66*l*. To this end, an inlet mounting part 6634*l* and an outlet mounting part 6644*l* may be recessedly formed on the inner upper surface 662. The inlet mounting part 6634*l* and the outlet mounting part 6644*l* may be opened in a corresponding shape so that the lower ends of the water inlet part 663L and the water outlet part 664L may be inserted into them. In addition, an inlet inclined part 6634 and an outlet inclined part 6644 formed to be inclined or rounded may be protrudingly formed on the opened circumference of the inlet mounting part 6634*l* and the outlet mounting part 6644*l*.

The water inlet part 663L may be formed with a water inlet flow path 6631 penetrating the water inlet part 663L. In addition, the water inlet part 663L may have an elliptical cross-sectional shape. At this time, the water inlet part 663L may be disposed so that the major axis of the cross-section faces the front and rear direction.

The water inlet part 663L may be formed with an inlet contact part 6632 that divides the water inlet flow path 6631. The inlet contact part 6632 may extend from the upper end to the lower end of water inlet part 663L. Then, when the filter 60*l* is mounted, the inlet contact part 6632 may come into contact with the contact part 5633 of the valve 56 to open the valve 65.

In addition, an inlet fastening part 6635*l* may be formed at the lower end of the water inlet part 663L. The inlet fastening part 6635*l* may protrude downward to be inserted into the inlet mounting part 6634*l* and may be coupled to the inlet mounting part 6634*l*. For example, the inlet mounting part 6634*l* and the inlet fastening part 6635*l* may be screw-coupled. Accordingly, the water inlet part 663L may be coupled with directionality by the spiral formed in the inlet mounting part 6634*l* and the inlet fastening part 6635*l*. In other words, when the inlet mounting part 6634*l* and the inlet fastening part 6635*l* are coupled to be completely fastened to each other, the major axis of the cross section of the water inlet part 663L may be disposed to face the front and rear direction.

The water outlet part 664*l* may have a water outlet flow path 664*l* formed through the water outlet part 664*l*. In addition, the water outlet part 664*l* may have an elliptical cross-sectional shape. At this time, the water outlet part 664*l* may be disposed so that the major axis of the cross-section faces the left and right direction.

In addition, an outlet fastening part 6645*l* may be formed at the bottom of the water outlet part 664*l*. The outlet fastening part 6645*l* may protrude downward to be inserted into the outlet mounting part 6644*l* and may be coupled to the outlet mounting part 6644*l*. For example, the outlet mounting part 6644*l* and the outlet fastening part 6645*l* may be screw-coupled. Accordingly, the water outlet part 664*l* may be coupled with directionality by a spiral formed in the outlet mounting part 6644l and the outlet fastening part 6645l. In other words, when the outlet mounting part 6644l and the outlet fastening part 6645l are coupled to be completely fastened to each other, the major axis of the cross-section of the water outlet part 664L may be disposed to face the left and right direction.

Figure 54:
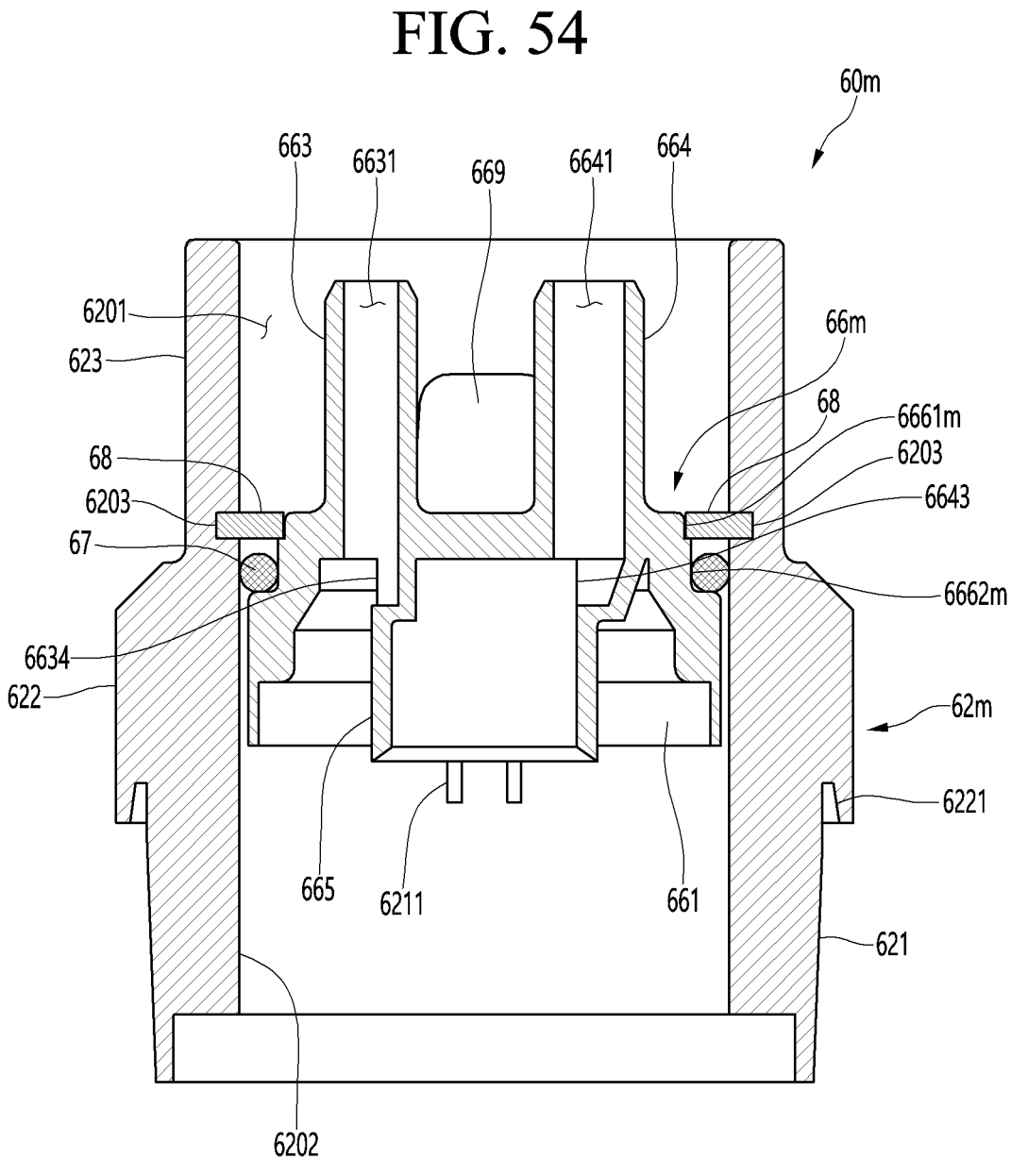
FIG. 54 is a cross-sectional view illustrating a state where the upper housing and the filter cover of the filter assembly according to the 14th embodiment of the present disclosure are coupled.

FIG. 54 is a cross-sectional view illustrating a state where the upper housing and the filter cover of the filter assembly according to the 14th embodiment of the present disclosure are coupled.

As illustrated, the filter assembly according to the 14th embodiment of the present disclosure has a structure in which a filter cover 66m is coupled through the opened upper surface of the housing 600 of the filter 60m. Compared to the above-described embodiments, only the interior of the housing 600 and the circumferential shape of the filter cover 66m are different, and other configurations can be formed in the same manner.

In detail, the filter 60m may be detachably provided on the head 50. In addition, the filter 60m may include an upper housing 62m. The upper housing 62m may include an upper part 623 inserted into the head 50, a lower part 623 coupled with a lower housing 61, and a housing coupling part 621. In addition, the upper housing 62m may have an open upper surface and an open lower surface, and a hollow 6201 passing through in the vertical direction may be formed. In addition, the inner surface 6202 of the upper housing 62m may be formed to have the same diameter from the upper end to the lower end.

In addition, a support protrusion 6211 for supporting the filter cover 66m may be formed on the inner surface 6202 of the upper housing 62m. A plurality of support protrusions 6211 may be formed and may support the lower end of the filter cover 66m.

In addition, a fixing groove 6203 in which a restraint member 68 is restrained may be formed on the inner surface 6202 of the upper housing 62m. The fixing groove 6203 may be recessed outward at a position corresponding to the restraint member 68 and may be formed along the inner surface 6202. The fixing groove 6203 may be formed above the support protrusion 6211 and may be positioned higher than the seal ring 67 to be described below. In addition, the fixing groove 6203 may be formed at a height corresponding to the second stepped part 6661m to be described below.

The filter cover 66m may have an inner edge 661 forming a circumference, and a stepped part 6661, 662 having a smaller diameter than the inner edge 661 on the upper surface of the inner edge 661.

The inner edge 661 may be adjacent to the inner surface 6202 of the upper housing 62m. In addition, the lower end of the inner edge 661 may be supported by the support protrusion 6211. In addition, the stepped part may include a first stepped part 6661m on which the seal ring 67 is seated. In addition, the stepped part may further include a second stepped part 6661m formed above the first stepped part 6661m and on which the restraint member 68 is seated.

The restraint member 68 may be formed in a circular or ring shape, and the circumference thereof may be inserted into the fixing groove 6203. The restraint member 68 may be pressed into the fixing groove 6203 by elastic deformation. For example, the restraint member 68 may be formed in a ring shape with a part cut off, and when inserted into the fixing groove 6203, the restraint member may be elastically deformed and inserted into the fixing groove 6203, and the filter cover 66m may be fixed from above by pressing the second stepped part 6661m.

The filter cover 66m is inserted through the opened upper surface of the upper housing 62m, and at this time, the lower end of the inner edge 661 can be supported by the support protrusion 6211. With the filter cover 66m inserted, the seal ring 67 is seated on the first stepped part 6661m, and the restraint member 68 is inserted through the opened upper surface of the upper housing 62m. The restraint member 68 is fixed by being inserted into the fixing groove 6203 with the circumference thereof, and can restrain the filter cover 66m from above by coming into contact with the second stepped part 6661m.

Accordingly, the filter cover 66m can be mounted on the upper housing 62m. Accordingly, the upper housing 62m can rotate relative to the filter cover 66m, and the space between the upper housing 62m and the filter cover 66m can be sealed.

Meanwhile, a water inlet part 663 and a water outlet part 664 may protrude upwardly on the upper surface of the filter cover 66m. A water inlet flow path 6631 and a water outlet flow path 6641 for water flow may be formed in the water inlet part 663 and the water outlet part 664, respectively. In addition, the water inlet part 663 and the water outlet part 664 may have an elliptical cross-section with major axes disposed in different directions. In addition, a rotation protrusion 669 may be further formed on the inner upper surface 662. In addition, a sensing member 668 may be further formed on the inner upper surface 662.

Figure 55:
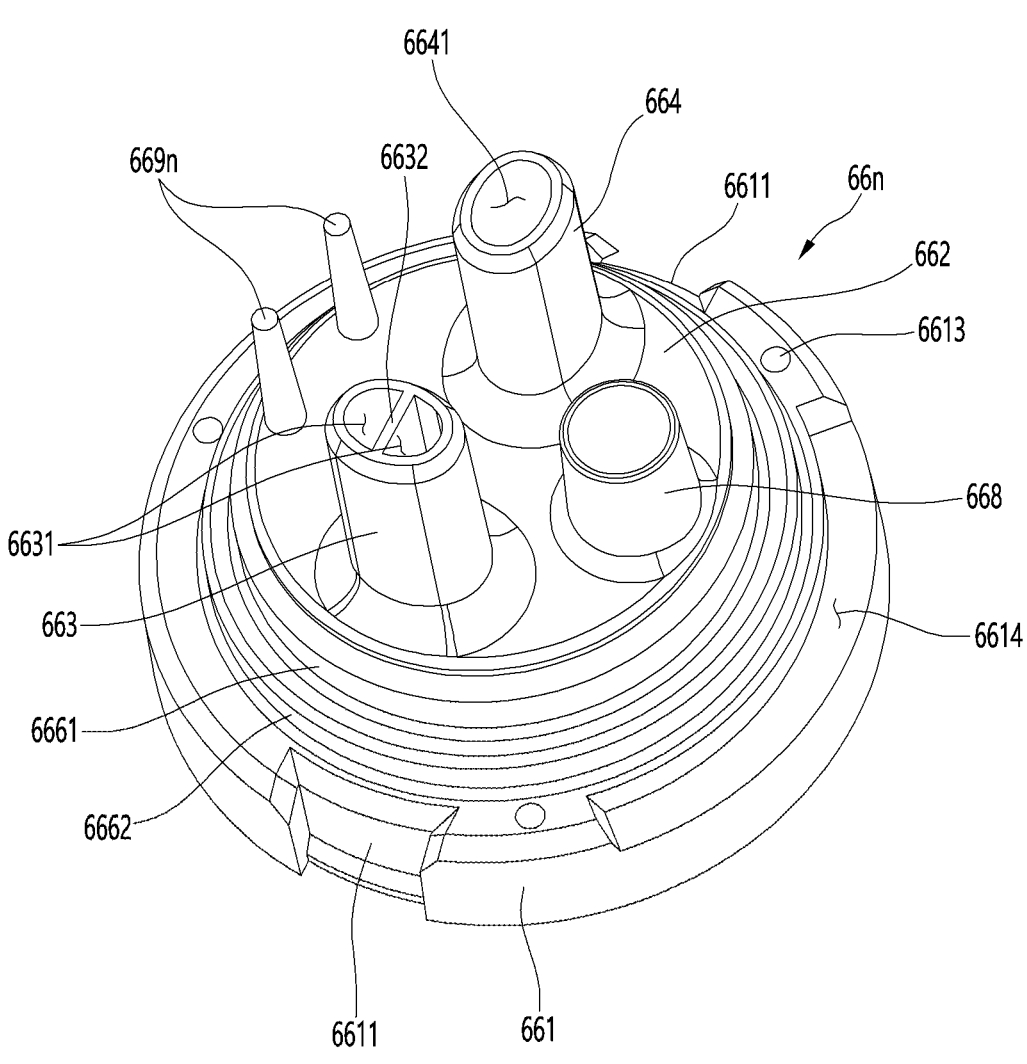
FIG. 55 is a perspective view illustrating a filter cover of a filter assembly according to the 15th embodiment of the present disclosure.

FIG. 55 is a perspective view illustrating a filter cover of a filter assembly according to the 15th embodiment of the present disclosure.

As illustrated, the filter assembly 40 according to the 15th embodiment of the present disclosure may be configured to include a head 50 and a filter 60. The filter 60 may be configured to be capable of being attached to and detached from the head 50. In addition, compared to the above-described embodiment, there is only a difference in the shape of the rotation protrusion 669n formed on the filter cover 66n, and the remaining configuration may be the same.

The filter 60 may be provided with a rotatably provided filter cover 66n in the housing 600. The filter cover 66n shields the upper opening 6270 of the upper housing 62, and the upper surface may be exposed through the upper opening 6270.

The filter cover 66n may have an inner edge 661 forming a circumference, and a stepped part 6661, 662 having a smaller diameter than the inner edge 661 may be formed on the upper surface of the inner edge 661. In addition, an inner upper surface 662 may be formed on the upper end of the stepped part 6661, 6662.

An edge groove 6611 and an edge hook 6612 are formed on the outer circumferential surface of the inner edge 661 so that the filter cover 66l can be rotatably mounted inside the housing 600.

A water inlet part 663 and a water outlet part 664 may be formed on the upper surface of the filter cover 66n. The water inlet part 663 and the water outlet part 664 may have an elliptical cross-sectional structure. In addition, the water inlet part 663 and the water outlet part 664 may be disposed so that their major axes face different directions. For example, the water inlet part 663 may have a minor axis of the cross-section disposed in the left and right direction, and the water outlet part 664 may have a major axis of the cross-section disposed in the left and right direction. In addition, the interior of the water inlet part 663n may be divided by an inlet contact part 6632.

In addition, a sensing member 668 may be formed on the upper surface of the filter cover 66$n$. The sensing member 668 may protrude upward and be inserted into a sensing hole 5327 formed in the head 50.

The upper surface of the filter cover 66$n$ may further be provided with a rotation protrusion 669$n$. The rotation protrusion 669$n$ may protrude upward and be inserted into a rotation groove 5329 formed in the head 50.

The rotation protrusion 669$n$ may be composed of a pair of protrusions spaced apart from each other. At this time, the pair of rotation protrusions 669$n$ may be formed at positions corresponding to both ends of the rotation groove 5329. Accordingly, when the rotation protrusion 669$n$ is inserted into the rotation groove 5329, the pair of protrusions may support both ends of the rotation groove 5329.

If necessary, the pair of rotation protrusions 669$n$ may be connected to each other. In addition, the rotation protrusion 669$n$ may be composed of a single protrusion. At this time, the rotation protrusion 669$n$ may be disposed to contact one end of the rotation groove 5329 in the direction in which the filter 60 rotates when mounted.

The rotation protrusion 669$n$ can be inserted into the rotation groove 5329 when the filter 60 is inserted. The rotation protrusion 669$n$ can be positioned between the water inlet part 663 and the water outlet part 664. For example, the rotation protrusion 669$n$ can be positioned on the rear side of the filter cover 66$n$.

Accordingly, when the housing 600 is rotated for attachment and detachment of the filter 60, the filter cover 66$n$ can be maintained in a fixed state by the rotation protrusion 669$n$ and the rotation groove 5329 which are coupled to each other, and only the housing 600 can be rotated. In addition, even when torque is generated during rotation of the housing 600, the torque is not transmitted to the water inlet part 663 and water outlet part 664, thereby preventing flow of the water inlet part 663 and water outlet part 664 and shielding the possibility of water leakage.

Figure 56:
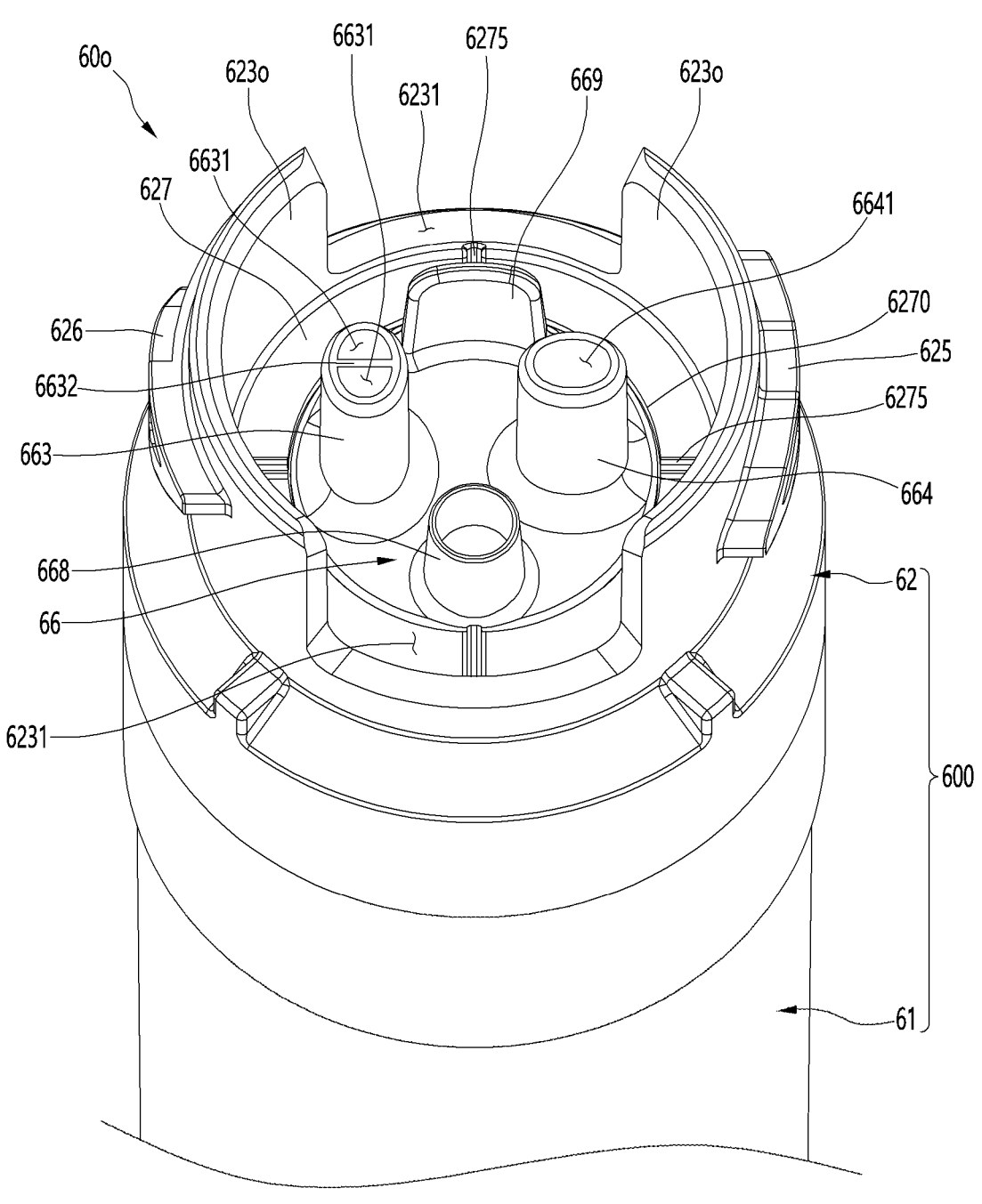
FIG. 56 is a partial perspective view illustrating a filter according to the 16th embodiment of the present disclosure.

FIG. 56 is a partial perspective view illustrating a filter according to the 16th embodiment of the present disclosure.

As illustrated, the filter assembly 40 according to the 16th embodiment of the present disclosure may be configured to include a head 50 and a filter 60$o$. The filter 60$o$ may be configured to be capable of being attached to and detached from the head 50. In addition, compared to the first embodiment described above, only the upper shape of the upper housing 62$o$ is different, and the remaining configuration may be configured in the same manner.

The filter 60$o$ can have an outer shape formed by a lower housing 61 and an upper housing 62$o$, and the upper housing 62$o$ can be provided with a filter cover 66. The filter cover 66 shields an upper opening 6270 of the upper housing 62, and an upper surface can be exposed through the upper opening 6270. In addition, a water inlet part 663 and a water outlet part 664 can be formed on the upper surface of the filter cover 66.

The water inlet part 663 and water outlet part 664 may have an elliptical cross-sectional structure. In addition, the water inlet part 663 and water outlet part 664 may be disposed so that their major axes face in different directions. For example, the water inlet part 663 may have its minor axis of the cross-section disposed in the left and right direction, and the water outlet part 664 may have its major axis of the cross-section disposed in the left and right direction. In addition, the interior of the water inlet part 663 may be divided by the inlet contact part 6632.

In addition, a sensing member 668 may be formed on the upper surface of the filter cover 66. At least a part of the sensing member 668 may be provided with a magnet. The sensing member 668 may protrude upward while mounted on the filter cover 66 and may be inserted into a sensing hole 5327 formed on the head 50. The filter sensing device 55 provided in the sensing hole 5327 may sense the sensing member 668 to determine whether the filter 60 is mounted. In addition, when it is determined that the filter 60 is mounted, the water supply valve 102 may be opened.

In addition, a rotation protrusion 338 may be formed protruding on the upper surface of the filter cover 66. When the filter 60$o$ is mounted on the head 50, the rotation protrusion 338 may be inserted into the rotation groove 5239 of the filter 60$o$. In addition, by the rotation protrusion 338, the filter cover 66 is inserted into the head 50 and is maintained in a fixed state, and only the housing 600 can rotate relative to it. In addition, by the coupling of the rotation protrusion 338 and the rotation groove 5239, torque can be easily generated when the housing 600 rotates, and the rotation of the housing 600 can be performed more effectively.

The sensing member 668 and the rotation protrusion 39 may be provided between the water inlet part 663 and the water outlet part 664. In addition, the sensing member 339 may be positioned forward with respect to the center of the filter cover 66, and the rotation protrusion 338 may be positioned rearward with respect to the center of the filter cover 66. Accordingly, the extension line connecting the water inlet part 663 and the water outlet part 664 and the extension line connecting the sensing member 339 and the rotation protrusion 338 may intersect each other.

In addition, a marker 6275 may be formed on the upper surface of the first protrusion part 627 where the upper opening 6270 is formed. The markers 6275 may be formed in pairs on the left and right sides based on the filter cover 66, and may be positioned on the same extension line as the water inlet part 663 and the water outlet part 664. In addition, a pair of the markers 6275 may be further formed on the front and rear sides based on the filter cover 66, and may be positioned on the same extension line as the sensing member 339 and the rotation protrusion 338. Therefore, the user can visually check the alignment state of the filter cover 66 by the markers 6275.

In addition, the upper housing 62$o$ may include an upper part 623$o$ that extends upward. The upper part 623$o$ may extend upwardly further than the upper end of the filter cover 66, that is, the upper end of the water inlet part 663$o$ and the water outlet part 664.

In addition, the upper part 623$o$ may extend upward along the circumference of the upper housing 32$o$. At this time, a pair of the upper parts 623$o$ may be provided on the left and right sides of the upper housing 32$o$. A first guide protrusion 625 and a second guide protrusion 626 for coupling the filter 60$o$ and the head 50 may be formed on the upper part 623$o$. In other words, the upper part 623$o$ may be formed to have a length corresponding at least to the first guide protrusion 625 or the second guide protrusion 626.

In detail, the upper part 623$o$ may be formed on the left and right sides based on the filter cover 66, and may be disposed to face each other. In addition, a first guide protrusion 625 and a second guide protrusion 626 may be formed on the upper parts 623$o$ on both sides, respectively. The first guide protrusion 625 and the second guide protrusion 626 may be positioned to face each other. In addition, before the filter 60$o$ is mounted, the water inlet part 663 and the water outlet part 664 may be aligned on the same extension line between the first guide protrusion 625 and the second guide protrusion 626. In addition, when the filter 60$o$ is mounted on the head 50, the filter cover 66 is maintained in a fixed state and the housing 600 is rotated so that the first guide 523 and the second guide 524 can intersect with the disposition of the water inlet part 663 and the water outlet part 664.

Meanwhile, a housing cutout part 6231 may be formed in the upper housing 32o. The housing cutout part 6231 may be cut so as to open toward the front and rear of the upper housing 32o. Accordingly, the sensing member 339 and the rotation protrusion 338 may be exposed through the housing cutout part 6231.

An object of an embodiment of the present disclosure is to provide a water filter in which accurate mounting is ensured and a home appliance having the same.

An object of an embodiment of the present disclosure is to provide a water filter capable of preventing water leakage and a home appliance having the same.

An object of the present disclosure is to provide a water filter which improve the convenience of use by making it easy to check the identification and alignment status of the filter and a home appliance having the same.

As an embodiment of the present disclosure, a water filter detachably coupled to a head connected to a water supply source includes a housing having an upper opening formed therein that is open upward; a filter cover provided in the housing to shield the upper opening and having a water inlet part into which water flows and a water outlet part from which water is discharged; a filter member accommodated in the housing and for purifying water; and a seal ring provided between the housing and the filter cover and which seals the space between the housing and the filter cover when the housing rotates, in which the housing rotates relative to the filter cover and the filter member when coupled with the head.

The housing may include an upper housing forming an upper part of the housing and in which the upper opening is formed; and a lower housing coupled with an lower part of the upper housing and forming a lower part of the housing; and a guide protrusion that is rotatably coupled with the head may be formed around a circumference of the upper housing.

The upper housing may include a lower part coupled with the lower housing; and an upper part forming an upper part of the upper housing and inserted into the inside of the head, the guide protrusion may protrude from the outer surface of the upper part, and the upper opening may open upwardly into the inside of the upper part.

The water inlet part and the water outlet part may protrude at a lower height than an upper end of the upper part.

An upper supporter connecting the filter member and the filter cover may be provided on an upper side of the filter member, and the housing may rotate about the center of the filter member and the upper supporter.

A filter nipple may be formed in the upper supporter to protrude so as to be connected to the hollow space penetrating the filter member, and the filter nipple may form a flow path between the filter member and the filter cover.

The housing may be formed with a protrusion part that protrudes toward the center of the housing to form the upper opening, the filter cover may include a stepped part formed along a circumference of the filter cover and positioned below the protrusion part, and the seal ring may be positioned between the protrusion part and the stepped part.

A restriction protrusion protruding downward may be formed on the protrusion part, a restriction groove may be formed on the filter cover, which is recessed along the circumference of the filter cover and into which the restriction protrusion is inserted, and the restriction groove may be formed to come into contact with the restriction protrusion when the rotation of the housing starts and ends.

A plurality of contact protrusions may be formed on the filter cover, which protrude upward, come into contact with the lower part of the protrusion part, and partially separate the filter cover and the housing.

A support protrusion may protrude from the inner surface of the housing to support the filter cover from a lower end, and an edge groove through which the support protrusion passes may be recessed on the circumference of the filter cover.

In addition, a water filter according to an embodiment of the present disclosure may include a filter member for water purification; a housing accommodating the filter member and having an upper opening formed therein that is open upward; and a filter cover provided to be relatively rotatable to the housing and shields the upper opening, in which the filter cover may have a water inlet part into which water flows and a water outlet part from which water is discharged, and from which the water inlet part and the water outlet part protrude upward, and at least a part of the entire upper and lower lengths of the water inlet part and the water outlet part may be formed to have an elliptical cross-section, and be aligned with directionality.

The water inlet part may be disposed and rotated by a set angle based on the disposition direction of the water outlet part.

The water inlet part and the water outlet part may extend in a direction in which a major axis of the water inlet part and a major axis of the water outlet part intersect each other, when viewed from above.

The water inlet part may be disposed so that the major axis extends in the front and rear direction, and the water outlet part may be disposed so that the major axis extends in the left and right direction.

The housing may be formed with a guide protrusion that rotates when the water filter is mounted and is coupled to the head, and the guide protrusion may be disposed on both sides based on the filter cover.

The water inlet part and the water outlet part may be disposed between guide protrusions disposed on both sides.

The guide protrusion and the water inlet part and the water outlet part may be aligned on the same extension line.

Before the filter is mounted, the guide protrusion and the water inlet part and the water outlet part may be aligned on the same extension line, and after the filter is mounted, the housing may be rotated so that the guide protrusion moves in a direction intersecting the water inlet part and the water outlet part.

A marker may be formed on the inner surface of the housing in the same extension line as the water inlet part and the water outlet part, and thus the alignment of the filter cover may be capable of being checked.

An inlet contact part may be formed at an upper end of the water inlet part to divide an internal flow path of the water inlet part.

In addition, as a water filter according an embodiment of the present disclosure, a water filter detachably coupled to a head connected to a water supply source includes a housing coupled to the head by rotation and having an upper opening formed therein that is open upward, a filter member accommodated inside the housing and for water purification, a filter cover shielding the upper opening and relatively rotated inside the housing, and a seal ring which seals the space between the housing and the filter cover, in which the filter cover may have a water inlet part into which water flows and a water outlet part from which water is discharged, and from which the water inlet part and the water outlet part protrude upward to be inserted into the head, and the water inlet part and the water outlet part may be moved upward while maintaining a state of fixing when the housing is rotated so that the filter is mounted on the head.

At least a part of the water inlet part and the water outlet part may be formed in an elliptical cross-section shape in a vertical protrusion direction, and the seal ring part may come into contact with the inner surface of the head by upward movement of the water inlet part and the water outlet part.

The water inlet part and the water outlet part may be disposed so that the elliptical cross sections face in different directions.

The water inlet part and the water outlet part may be inserted into an inlet hole and an outlet hole which are opened in an elliptical shape corresponding to each other in the head.

The housing may rotate based on the filter cover in a state where the water inlet part and the water outlet part are inserted and fixed in the head.

The filter cover may be formed with a rotation protrusion protruding upward, the head may be formed with a rotation groove into which the rotation protrusion is inserted, and when the filter is mounted on the head, the rotation protrusion may move linearly upward and is inserted into the rotation groove.

The rotation protrusion may protrude between the water inlet part and the water outlet part.

A sensing member protruding upward may be formed on the filter cover, the head may include a sensing hole into which the sensing member is inserted and a filter sensing device which is disposed at a position corresponding to the sensing hole and thus senses the sensing member, and when the filter is mounted on the head, the sensing member may move linearly upward and is inserted into the sensing hole.

In addition, a home appliance according to an embodiment of the present disclosure includes a cabinet; a head provided in the cabinet and connected to a water supply source; and a water filter being capable of attaching or detaching to or from the head, in which the water filter may include a housing having an upper opening formed therein that is open upward; a filter cover provided in the housing to shield the upper opening and having a water inlet part into which water flows and a water outlet part from which water is discharged; a filter member accommodated in the housing and for purifying water; and a seal ring provided between the housing and the filter cover and which seals the space between the housing and the filter cover when the housing rotates, and in which the housing may rotate relative to the filter cover and the filter member when coupled with the head.

The water inlet part and the water outlet part may be formed to have an elliptical cross-section and be aligned with directionality, when viewed from above.

A water filter and a home appliance having the same according to an embodiment of the present disclosure have the following effects.

The first guide protrusion and the second guide protrusion, which are disposed on the left and right sides of the housing, have a structure in which they are inserted into the corresponding first and second guides. Accordingly, incorrect mounting of the filter may be prevented.

In addition, the water inlet part and the water outlet part of the elliptical cross-section exposed on the upper surface of the filter are disposed in different directions so that the mounting direction can be checked, thereby further preventing incorrect mounting of the filter.

By preventing incorrect mounting of such filters, the operability of the valve can be guaranteed and convenience of use can be improved.

In addition, by visually checking that the marker or guide protrusion and the water inlet part and the water outlet part are aligned before mounting the filter, the exact alignment of the filter cover can be checked, which has the advantage of preventing incorrect mounting of the filter.

In particular, since the alignment of the filter cover may be damaged due to the structural characteristics of the filter in which the housing rotates relative to the other, there is an advantage in that the user can easily check this with the naked eye and operate and check the alignment again, thereby further improving convenience in use.

In addition, there is an advantage in that the valve is opened when the filter is fully inserted to supply water to the filter, and the valve is closed when the filter is separated, thereby preventing water leakage.

In addition, there is an advantage in that a seal is provided between the housing and the filter cover, and the filter can be pressurized by the pressure inside the filter to make it more sealed, thereby effectively preventing water leakage in a filter having a structure in which the housing rotates relatively.

In addition, since the cross sections of the water inlet part and the water outlet part are formed in an elliptical shape and have a structure in which the major axes extend in a direction intersecting each other, the movement of the filter can be prevented from occurring even when the filter is coupled due to rotational torque.

In addition, the water inlet part and the water outlet part of the protruding structure can be made more resistant to external impact, and in particular, the directionality of the cross-sections of the water inlet part and the water outlet part can enable recognition of the mounting direction of the filter and visualization of the alignment state, so that the convenience of use can be further improved.

In addition, the head coupled with the filter has a structure in which the part connected to the water inlet part and the water outlet part of the filter does not rotate, and the housing of the filter and the filter cover rotate.

Accordingly, the interior of the head has the advantage of preventing damage to the head even when the head is used for a long period of time by simplifying the flow path structure and omitting the rotating and flowing structure, and shielding the possibility of water leakage from the head.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present disclosure.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A water filter, comprising:
a filter configured to filter water;
a housing for the filter and having an upper opening opened upwardly; and
a filter cover that covers the upper opening and connected to the filter, wherein the housing is rotatable relative to the filter cover and filter, wherein the filter cover has a water inlet into which water flows into the housing and a water outlet from which water is discharged after filtering,
wherein the water inlet and the water outlet protrude upward, and
wherein at least a portion of the water inlet and the water outlet are formed to have an elliptical cross-section, and an extension line of a major axis of the water inlet and a major axis of the water outlet intersect each other.

2. The water filter of claim 1, wherein the major axis of the water inlet and the major axis of the water outlet perpendicularly intersect.

3. The water filter of claim 1, wherein sectional areas of the water inlet and the water outlet are the same as each other.

4. The water filter of claim 1, wherein a minor axis of the water inlet and the major axis of the water outlet are arranged on a same extension line.

5. The water filter of claim 1, wherein an inlet contact portion is formed at an upper end of the water inlet to divide an internal flow path of the water inlet.

6. The water filter of claim 1, the water inlet and the water outlet are disposed on opposite sides of an extension line that passes through a center of the filter cover.

7. The water filter of claim 1, wherein the filter cover is provided between the first and second guide protrusion.

8. The walter filter of claim 7, wherein the first and second guide protrusions, the water inlet, and the water outlet are aligned along a same extension line before the housing is rotated.

9. The water filter of claim 8, wherein, after the housing is rotated relative to the filter cover, an extension line of the first and second guide protrusions intersects an extension line of the water inlet and the water outlet.

10. The water filter of claim 7, wherein when the filter is separated from the head, a center of the filter cover, the first guide protrusions, the second guide protrusions, the water inlet and the water outlet are aligned along a same extension line.

11. A home appliance, comprising:
a cabinet;
a head provided in the cabinet and configured to receive water from a water supply source; and
a water filter capable of being attached or detached from the head, wherein the water filter includes:
a filter configured to filter water;
a housing having an opening;
a filter cover to cover the opening and having a water inlet into which water flows into the housing and a water outlet from which water is discharged after filtering; and
a seal ring that is provided between the housing and the filter cover and seals a space between the housing and the filter cover when the housing rotates, wherein the filter cover and filter are connected to be rotated together, wherein the housing is configured to rotate relative to the filter cover and the filter when the housing is rotated into the head, and wherein at least a portion of the water inlet and the water outlet protruding from the filter cover are formed to have an elliptical cross-section, and an extension line of a major axis of the water inlet and a major axis of the water outlet intersect each other.

\* \* \* \* \*